(12) United States Patent
Bjornson

(10) Patent No.: US 6,561,515 B1
(45) Date of Patent: May 13, 2003

(54) MECHANICAL SPLIT SEAL

(75) Inventor: Carl C. Bjornson, Tiverton, RI (US)

(73) Assignee: Northeast Equipment, Inc., Fall River, MA (US)

( * ) Notice: Subject to any disclaimer, the term of this patent is extended or adjusted under 35 U.S.C. 154(b) by 5 days.

(21) Appl. No.: 09/648,354

(22) Filed: Aug. 25, 2000

Related U.S. Application Data

(63) Continuation-in-part of application No. 09/595,342, filed on Jun. 15, 2000, now abandoned, which is a continuation-in-part of application No. 09/362,171, filed on Jul. 27, 1999, now abandoned.

(51) Int. Cl.[7] ................................................. F16S 15/34
(52) U.S. Cl. ........................ 277/358; 277/306; 277/374
(58) Field of Search ................................. 277/306, 358, 277/359, 360, 370, 371, 374, 375, 376, 361, 368, 369, 390, 396, 397, 408

(56) References Cited

U.S. PATENT DOCUMENTS

| | | | |
|---|---|---|---|
| 2,585,154 A | * | 2/1952 | Montgomery |
| 2,756,080 A | * | 7/1956 | Andresen et al. |
| 2,839,317 A | * | 6/1958 | Haake |
| 3,023,114 A | * | 3/1962 | Andresen et al. |
| 3,101,200 A | * | 8/1963 | Tracy |
| 4,136,885 A | * | 1/1979 | Uhrner ........................ 277/372 |
| 4,746,268 A | | 5/1988 | Sugimoto et al. |
| 5,026,076 A | * | 6/1991 | Back |
| 5,199,719 A | * | 4/1993 | Heinrich et al. |
| 5,820,129 A | * | 10/1998 | Reagan |
| 5,893,564 A | * | 4/1999 | Yang |
| 5,913,521 A | * | 6/1999 | Sangren et al. |
| 5,961,122 A | * | 10/1999 | Marsi |
| 6,267,382 B1 | * | 7/2001 | Auber |

FOREIGN PATENT DOCUMENTS

| | | |
|---|---|---|
| EP | 0 619 448 A1 | 10/1994 |
| GB | 1043184 A | 9/1966 |
| GB | 1142328 | 2/1969 |
| GB | 1142328 A | 5/1969 |
| GB | 1043184 A | 3/1998 |

\* cited by examiner

Primary Examiner—Anthony Knight
Assistant Examiner—Vishal Patel
(74) Attorney, Agent, or Firm—Kenneth P. Robinson

(57) ABSTRACT

A split seal component includes two seal face segments in two holder halves and a method of assembly and installation. Each seal face segment has a primary sealing surface and a section extending axially from each primary sealing surface. The holder halves are adapted to be joined together to rigidly hold the circular seal face. The holder being constructed and arranged to mount to a shaft.

63 Claims, 58 Drawing Sheets

MECHANICAL SPLIT SEAL

RELATED APPLICATIONS

This application is a continuation-in-part of U.S. Ser. No. 09/595,342, filed Jun. 15, 2000, now abandoned, which is a continuation-in-part of U.S. patent application Ser. No. 09/362,171, filed Jul. 27, 1999 now abandoned, each of which are incorporated herein by reference in their entirety.

BACKGROUND

The present invention relates to mechanical split seals. Mechanical split seals are employed in a wide variety of equipment, such as pumps, to provide a pressure-tight and fluid-tight seal between one environment having a pressurized process fluid and an external environment containing the equipment. The split seal assembly is usually positioned about a rotating shaft that is mounted in and protruding from a stationary part of the equipment.

Conventional split seal assemblies include face type mechanical seals, which have a pair of seal faces that are concentrically mounted about the shaft. The seal faces each have smooth radial primary sealing surfaces that are in contact with each other. Usually one seal face remains stationary while the other seal face rotates with the shaft. The split seal assembly prevents leakage of the pressurized process fluid to the external environment by biasing the seal faces in contact with each other. For example, a split seal assembly may include one or more springs, which urge the seal faces together.

The rotary seal component includes a rotary seal face which is usually mounted in a rotary holder. The rotary holder includes a pair of holder halves, each having a pair of mating surfaces, that are fastened together. A set screw is generally used to secure the rotary seal component to the shaft. The stationary seal face is usually mounted in a piece called a gland. The gland also includes a pair of holder halves, usually referred to as gland halves, each having a pair of mating surfaces that are fastened together. In an assembled split seal, the rotary seal component is disposed within the gland, so that the primary sealing surfaces contact one another.

The mating surfaces of the rotary and stationary holder halves are normally manufactured to tight tolerances. Typically, each holder half has a groove formed on one of the mating surfaces for mounting a sealing gasket. When the gasket is mounted within the groove and the halves are secured together, the gasket contacts the opposite mating surface of the half. This contact forms a pressure-tight and a fluid-tight seal between the halves.

The seal faces are often divided into segments, each segment having two split surfaces. Because the seal faces are split, they can be mounted about the shaft without freeing one end of the shaft. Frequently, the split between the split surfaces is angularly offset from the junction between the mating surfaces. The split seal assembly has a distinct advantage over non-split mechanical seal designs in that the total time to install the seal is reduced because the rotating equipment does not have to be dismantled.

SUMMARY OF THE INVENTION

In one illustrative embodiment, a seal component is disclosed. The seal component includes a circular seal face including two seal face segments. Each seal face segment has a primary sealing surface, a section extending axially from each primary sealing surface and a nose extending radially from each section. The seal component further includes first and second holder halves. A nose of each seal face segment is mounted within each holder half.

In another illustrative embodiment, a seal component is disclosed. The seal component includes two seal face segments each having a primary sealing surface, a section extending from each primary sealing surface, and an outer wall. The seal component further includes first and second holder halves, each having first and second mating surfaces, and each half including a band having an inner wall. The inner wall surrounds the outer wall and secures the seal face segments rigidly and concentrically around a rotating shaft.

In yet another illustrative embodiment, a rotary seal component kit is disclosed. The kit includes two rotary seal face segments, each seal face segment having a radial primary sealing surface, a section extending from the primary sealing surface and a nose extending radially from the section. The kit further includes first and second rotary holder halves, wherein the nose of each seal face segment is mountable within each holder half.

In another illustrative embodiment, a seal component is disclosed. The seal component includes two holder halves, each half including an outer axial wall, two seal base segments mountable within the outer axial walls of each half, each segment having an outer axial wall and ridge mounted on the outer axial wall of each seal face segment. The seal component further includes a split o-ring mounted between the outer axial walls and the holder halves in the seal face segments. The outer axial walls of the holder halves maintain the segments concentric with a shaft during assembly and installation and the ridges abut against the split o-ring and prevent the seal face segments from axially separating from the holder halves.

In another illustrative embodiment, a method of assembling a seal component half includes inserting a split seal surface of a seal face segment into a channel of a holder half so that a nose extending radially from the seal face segment enters a complementary recess in the holder half and moving the seal segment along the channel until the seal face segment is fully seated in the holder half.

In yet another illustrative embodiment, a method of assembling an installation of a seal component includes assembling first and second seal component halves, wherein the first component half includes a first holder half and a second component half includes a second holder half. Each holder half has a counterbore and a seal face segment. The seal face segment has a nose extending therefrom with the nose being retained in the counterbore. The method further includes uniting the first and second seal component halves around a shaft.

In yet another illustrative embodiment, a method of assembly and installation of a seal component includes inserting seal face segments into first and second holder halves, each seal face segment having an outer peripheral surface, each holder half having a band disposed about one of the outer peripheral surfaces. The method further includes placing the holder halves around the shaft and fastening the bands to one another.

In still another illustrative embodiment, a split seal assembly is disclosed. The split seal assembly includes a first seal component including a circular seal face having two seal face segments. Each seal face segment has a nose and includes two holder halves. The nose of each seal face segment is mounted within each holder half. A second seal component includes a resiliently mounted seal face.

In still another illustrative embodiment, a seal face component is disclosed. The seal face component includes two seal face segments, each having a primary sealing surface, a section extending from each primary sealing surface, and each section having a wall. The seal face component further includes first and second holder halves for holding the two seal face components respectively, each half having first and second mating surfaces. The seal component further includes a first band attached to the first holder half and a second band attached to the second holder half. Each band has an inner wall, the inner walls surrounding the outer walls of each axially extending section of each seal segment. The seal face segments being disposed there between. The inner walls being adapted to locate the seal face segments concentrically around a shaft. The bands being adapted to be secured together to rigidly hold the seal face segments.

In still another illustrative embodiment of the invention, a seal component is disclosed. The seal component includes a circular seal face including two seal face segments, each seal face segment having a primary sealing surface, a section extending axially from each primary sealing surface, and a nose extending radially from each section. The seal component further includes first and second holder halves. The nose in each seal face segment engages a corresponding abutment surface on each holder half.

In still another illustrative embodiment, a seal component is disclosed. The seal component includes first and second holder halves, each half having first and second mating surfaces and an outer axial wall. Each axial wall of the holder halves extend from the first mating surface to the second mating surface and is suitable for supporting a first and second semicircular seal face. Each seal face has a primary sealing surface and a section extending axially from the primary sealing surface. The seal section includes an outer axial wall. At least one of the outer axial walls of the holder halves and the outer axial wall of the seal section is shaped and formed to relieve stress between the holder halves and the seal faces.

In another illustrative embodiment, a seal component is disclosed. The seal component includes a circular seal face including two seal face segments. Each seal face segment has a primary sealing surface and a section extending axially from each primary sealing surface. The seal component further includes a first and second holder half, suitable for mounting the seal face segments and a split o-ring disposed between an inner wall of the axially extending section and a shaft upon which the seal component is mountable.

In still another illustrative embodiment, a seal component for sealing a rotating shaft of a piece of equipment is disclosed. The seal component includes a circular seal face including two seal face segments, each seal face segment having a primary sealing surface and a section extending axially from each primary sealing surface. The seal component further includes first and second holder halves, each suitable for mounting a seal face segment. Each holder half is rigidly formed in the piece of equipment.

In still another illustrative embodiment, a seal component is disclosed. The seal component includes a circular seal face including two seal face segments. Each seal face segment has a primary sealing surface and a section extending axially from each primary sealing surface. The seal component further includes a holder including first and second holder halves adapted to be joined together to rigidly hold the circular seal face, the holder being constructed and arranged to mount to a shaft.

In still another embodiment of the invention a seal component is disclosed. The seal component includes a circular seal face including two seal face segments. Each seal face segment has a primary sealing surface and a section extending axially from each primary sealing surface. Each circular seal face includes a secondary sealing surface. The seal component further includes an adhesive joining the secondary sealing surfaces. The seal component further includes a holder including first and second holder halves adapted to be joined together to hold the circular seal plates. The holder is constructed and arranged to mount to a shaft.

In another embodiment of the invention a seal component is disclosed. A seal component includes a circular seal face including two seal face segments, each seal face segment having a primary sealing surface, a section extending axially from each primary sealing surface. The seal component further includes a clamp ring surrounding the circular seal face to hold the two seal face segments together. A holder includes first and second holder halves adapted to be joined together to hold a circular seal face. The holder is constructed and arranged to mount to a shaft.

In yet another illustrative embodiment of the invention, an uninstalled mechanical split seal is disclosed. The split seal includes first and second gland halves. Each gland half includes a first section having a first face seal disposed therein and a second section having a receptacle that has a flange. The split seal further includes first and second rotary seal holders. Each seal holder includes a body adapted to be disposed within the receptacle, a second seal face disposed within the body, and a shoulder disposed on the body. The shoulder abuts the flange.

In yet another illustrative embodiment, an uninstalled mechanical split seal is disclosed. The split seal includes first and second gland halves. Each gland half includes a first section having a first face seal disposed therein and a second section having a receptacle. The split seal further includes first and second rotary seal holders. Each seal holder includes a body adapted to be disposed within the receptacle and a second seal face disposed within the body. The split seal further includes a non-metallic, substantially incompressible component disposed within each receptacle. The non-metallic component is adapted to engage a portion of the body of the rotary seal holder.

In still another illustrative embodiment, a mechanical split seal is disclosed. The split seal includes first and second gland halves, each comprising a first section and a second section having a receptacle. The split seal further includes a first circular seal face including two seal face segments. The first circular seal face is disposed within the first section. A rotary holder including first and second rotary holder halves, is disposed within a corresponding receptacle of the second section. The first and second holder halves, when joined together, define a holder parting line. A second circular seal face including two seal face segments is flexibly mounted within the rotary holder. The two seal face segments of the second circular seal face, when joined together to form the second circular seal face, define a seal face parting line. The seal face parting line is substantially aligned with the holder parting line.

In yet another illustrative embodiment, an uninstalled mechanical split seal is disclosed. The seal includes first and second gland halves, each including a first section having a first seal face disposed therein. The first seal face is biased in a first direction. A second section has a receptacle. The receptacle is constructed and arranged to receive a rotary seal component therein such that the rotary seal component is biased in the first direction.

In another illustrative embodiment, a seal component is disclosed. The seal component includes a circular seal face including two seal face segments. Each seal face segment has a primary sealing surface and a section extending axially from each primary sealing surface. The seal component further includes a holder including first and second holder halves each rigidly holding a seal face segment upon installation of the seal on a shaft.

In yet another illustrative embodiment a two-piece seal component is disclosed. The two-piece seal component, exclusive of fasteners, consists of a circular seal face including two seal face segments. Each seal face segment has a primary sealing surface and a section extending axially from each primary sealing surface, and the two-piece seal component also consists of a holder including first and second holder halves, each rigidly holding a seal face segments.

In still another illustrative embodiment a seal component is disclosed. A seal component includes a circular seal face including two seal face segments. Each seal face segment has a primary sealing surface and a section extending axially from each primary sealing surface. A seal component further includes a holder including first and second holder halves each rigidly holding a seal face segment. The holder is constructed and arranged to clamp to a shaft. The two seal face segments, when joined together to form this circular seal face, defines a seal face parting line. The first and second holder halves, when joined together, define a holder parting line. The seal face parting line is substantially aligned with the holder parting line.

Various embodiments of the present invention provide certain advantages and overcome certain drawbacks of the conventional techniques. Not all embodiments of the invention share the same advantages and those that do may not share them under all circumstances. Further features and advantages of the present invention, as well as the structure and operation of various embodiments of the present invention, are described in detail below with reference to the accompanying drawings.

DETAILED DESCRIPTION

The following detailed description should be read in conjunction with the attached drawings in which similar reference numbers indicate similar structures. Further, side views of the various configurations are symmetrical about the longitudinal axis of the shaft. Therefore, for the sake of convenience, in such views, only an upper portion of the seal shown, resulting in a one-quarter view of the seal.

Figure 1A:
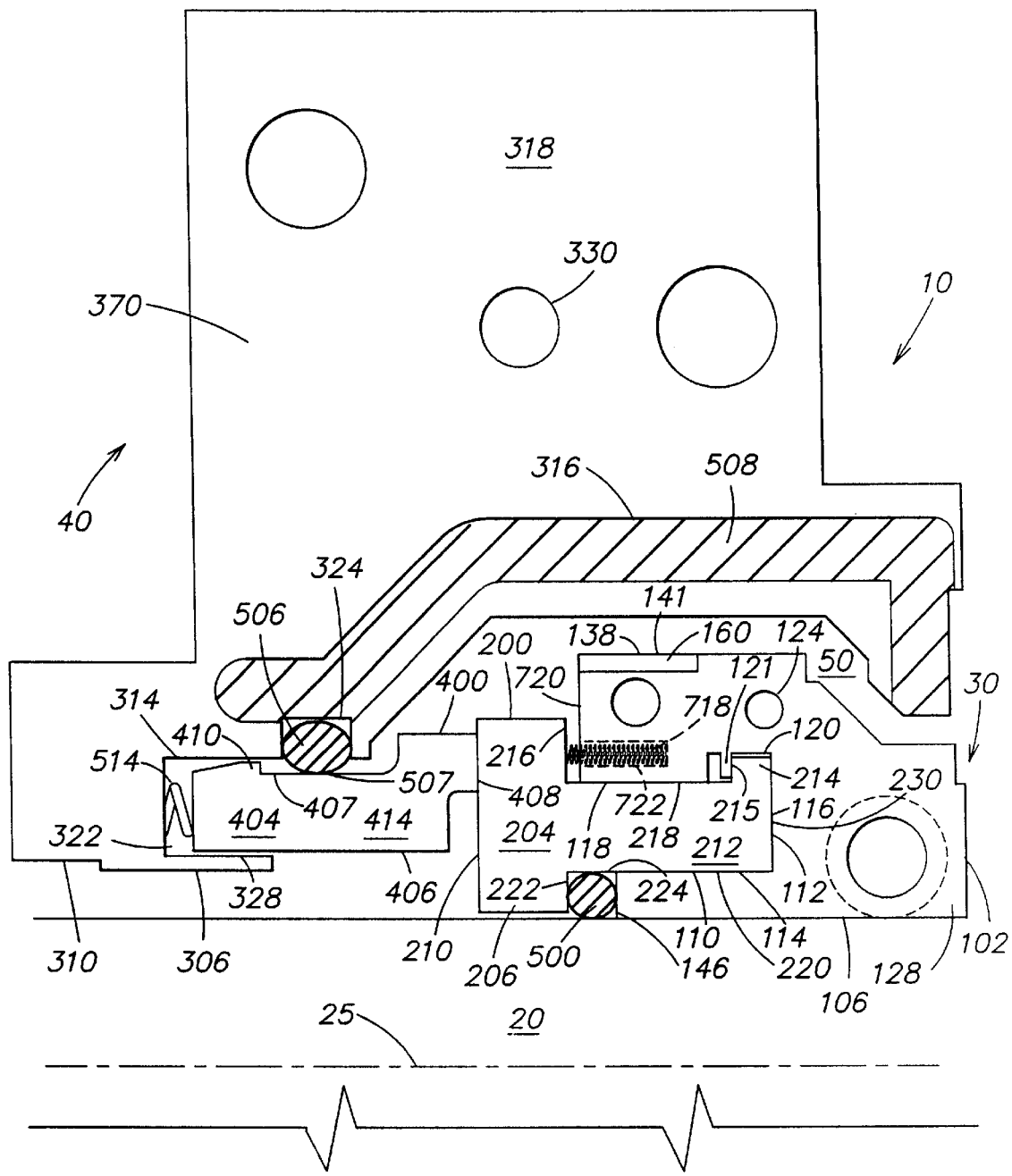
FIGS. 1A and 1B are side views of alternative embodiments of the invention showing a mechanical split seal component incorporating a rotary component with a rigidly seated seal face and a stationary seal component with a resiliently-mounted seal face.
Figure 1B:
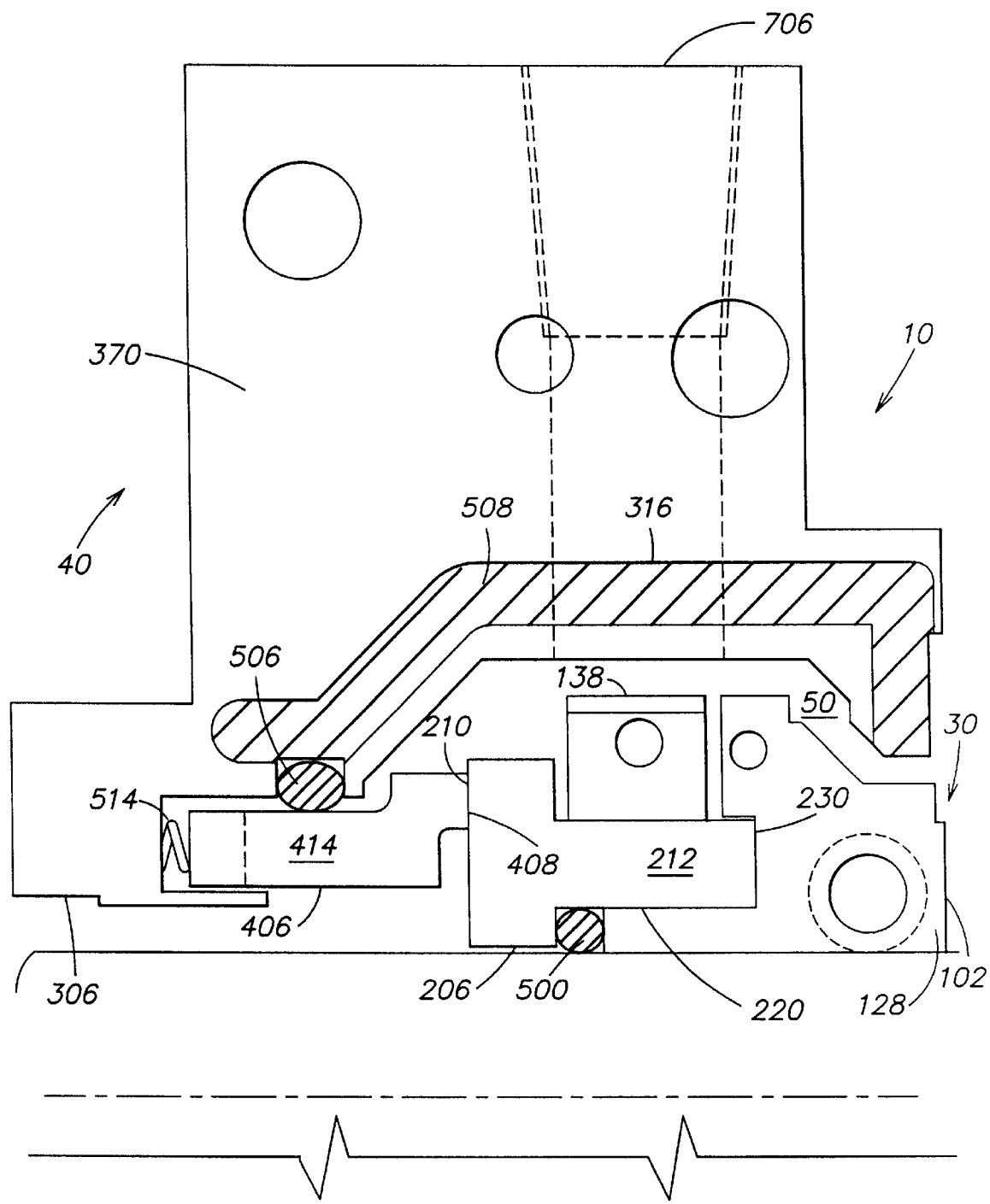
Figure 2:
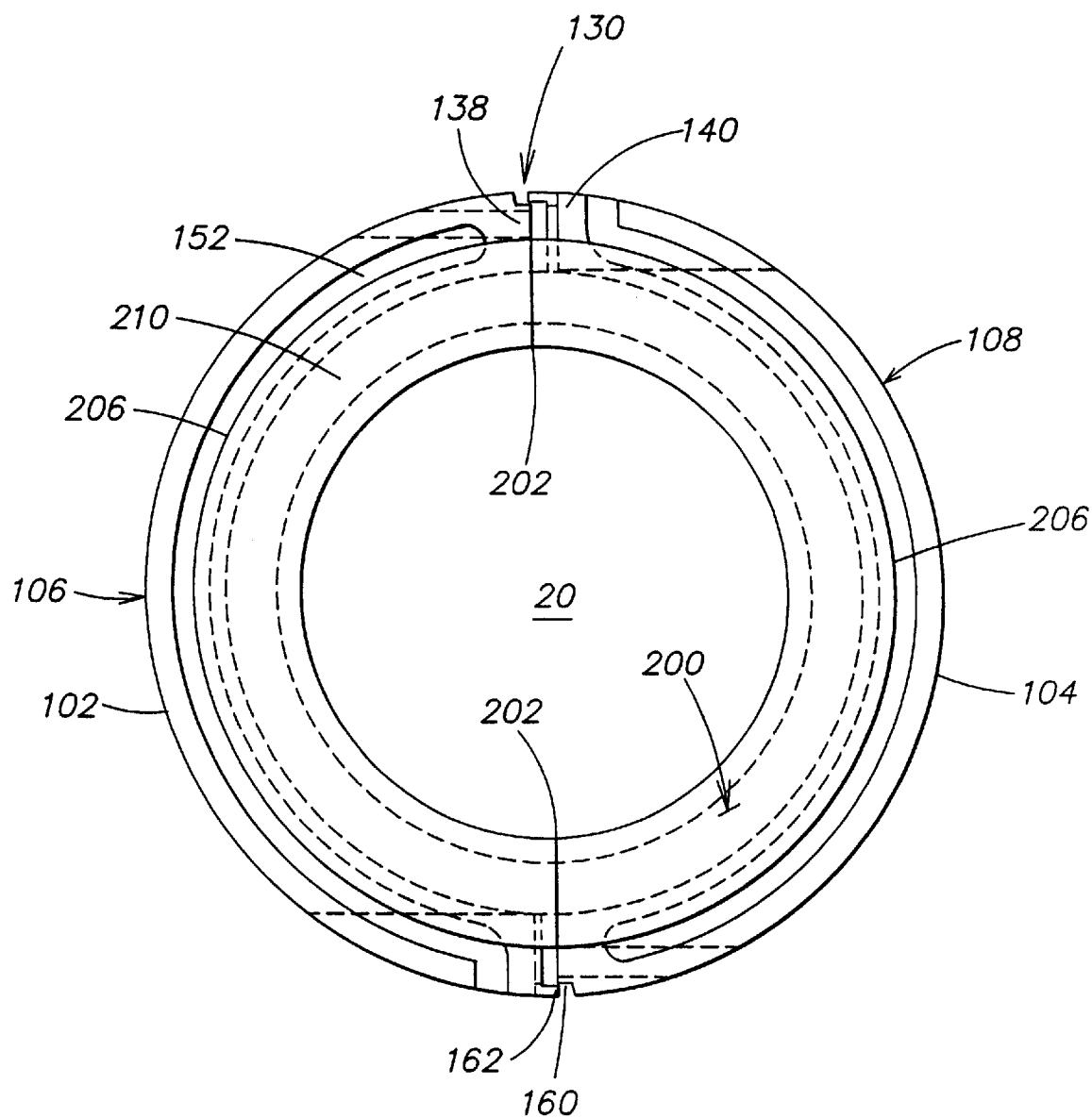
FIG. 2 is a top view of the rotary seal ring component of FIG. 1A.
Figure 15:
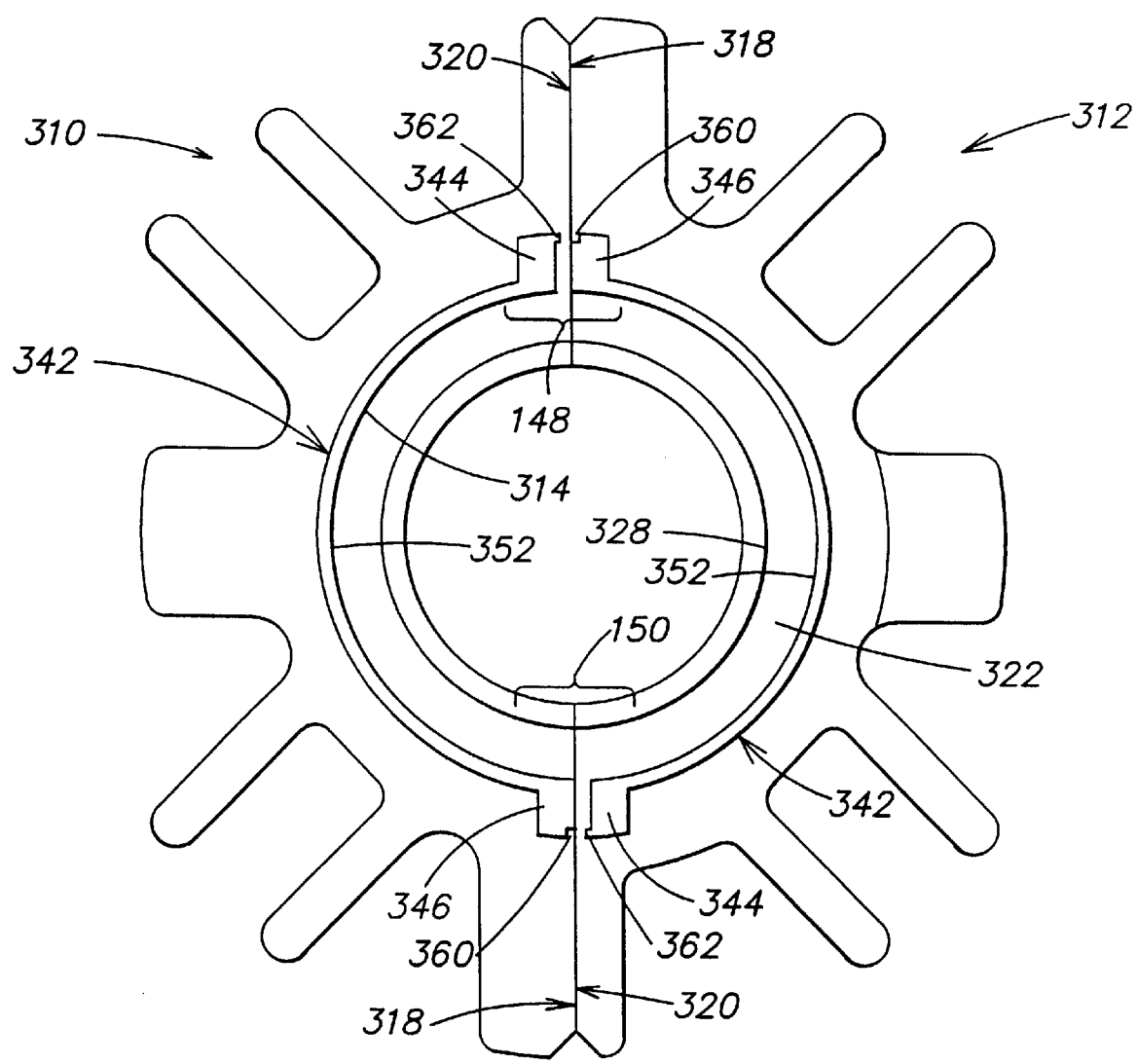
FIG. 15 is a top view of the stationary seal component of FIGS. 12A and 12B showing integral bands that clamp around the seal face.

As illustrated in FIGS. 1A, 1B, and 15, a split seal assembly 10 is formed by two seal components, a rotary component 30 that rotates with a shaft 20 about the axis of rotation 25 and a stationary component 40, that does not rotate. Each component has a seal face 200, 400. For purposes of clarity, features of the rotary and stationary seal faces have numbers from 200 to 300 and from 400 to 500, respectively. Each seal face 200, 400 may be constructed of, for example, graphite-filled silicon carbide, silicon carbide or ceramic, in annular form, and then fractured at a parting line into two or more segments, as at rotary face splits 202 shown in FIG. 2. The split surfaces 204, 404 may be coarse, so that the face segments interlock as in a puzzle, or may be smooth.

The rotary seal face segments 206 are placed in rotary holder halves, 102, 104, which includes a body that may be formed of metal and the stationary seal face segments 406, are mounted in stationary holder halves 310, 312 (shown in FIG. 15), usually referred to as gland halves, which also may be formed of metal. Again, for clarity, features of the rotary and stationary holder halves have numbers from 100 to 200 and from 300 to 400, respectively. The rotary and stationary holder halves are typically made of stainless steel and are manufactured using conventional CNC machining methods. Split o-ring 500 forms a seal between the rotary component 30 and the shaft 20. Split o-ring 506 is positioned between an outer axial wall 407 of the stationary seal face 400 and the stationary holder halves 310, 312. Gaskets 508 in grooves 316 on one of the gland mating surfaces 318 of each stationary holder half 310, 312 provide a seal between the holder halves 310, 312. Thus, assembly of the rotary and stationary components 30, 40 around the shaft 20 creates a sealed annular cavity 50.

In the split seal assembly shown in FIGS. 1A and 1B, the rotary and stationary seal are unitized components 30, 40 that may comprise two unitized halves, with no loose parts, except fasteners, (not shown) that mate of a parting line to fit around a shaft 20 and form the split seal assembly 10. Because each half of the rotary seal component 106, 108 and each half of the stationary seal component 306 may be fully assembled before mounting to the shaft 20, the installation procedure is easy. A total of two or four parts, excluding fasteners, may be manipulated during installation. The seal components create and maintain axial alignment and concentricity of the seal faces with the shaft even under high pressure operation.

Each rotary seal face segment 206 fits within and extends axially through a counterbore 110 in each rotary holder half 102, 104 to a radial primary sealing surface 210. In the configuration illustrated in FIG. 1A, the counterbore 110 of each rotary holder half 102, 104 forms a channel 112 with an inner axial wall 114, extending to a radial wall 116, which meets an outer axial wall 118 of the rotary holder halves 102, 104.

The clearance between the outer axial wall 218 of the rotary seal face segment 206 and the outer axial wall 118 of each rotary holder half 102, 104 is close before installation, and substantially zero as the holder halves 102, 104 are tightened to the seal face segments 206 and the shaft 20.

The clearance between the inner axial wall 220 of the rotary seal face segment 206 and the inner axial wall 114 (if one is present) of each rotary holder half 102, 104 is close with the exact clearance varying with the seal size, the smaller seals having less clearance. The close clearance between the inner wall 220 of the seal face and the inner axial walls 114 aids in holding the face 200 concentric with the shaft 20. If the clearance is too large, the face 200 may become eccentric to the shaft 20 possibly creating a leak point between the inner wall 220 of the face 200 and o-ring 500. It may also allow excessive movement of the face 200. If the clearance is too little, the inner axial wall 114 may bind on the face 200 and prevent face alignment during installation.

A recess 120 may be formed in the outer axial wall 118. The rotary seal face segments 206 may fit within the channel 112 and have a cylindrical section 212 extending axially from the primary sealing surface 210. The cylindrical section 212 may have a radially outwardly extending nose 214 that engages with the recess 120 in the channel 112. When the holder halves are connected around the shaft 20, the close fit between the nose 214 and the recess 120 axially aligns the primary sealing surfaces 210. If the clearance is too great, there may be excessive movement during start up, which may cause breakage of the face 200. If the clearance is too tight, the face segments 206 may not align properly with each other during installation. The appropriate clearance varies according to seal size.

Figure 3A:
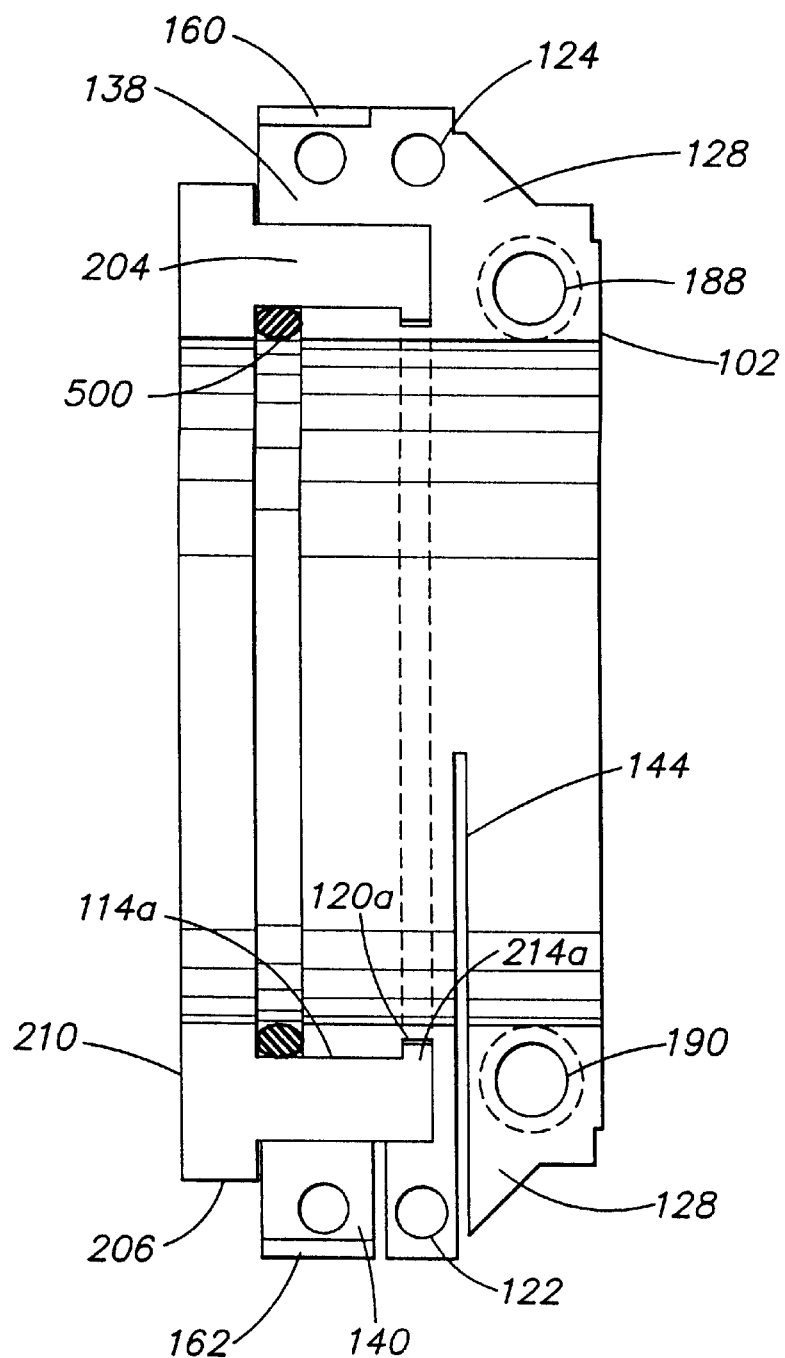
FIG. 3A is a side view of a rotary seal component half in which a nose extends radially inwardly.
Figure 3B:
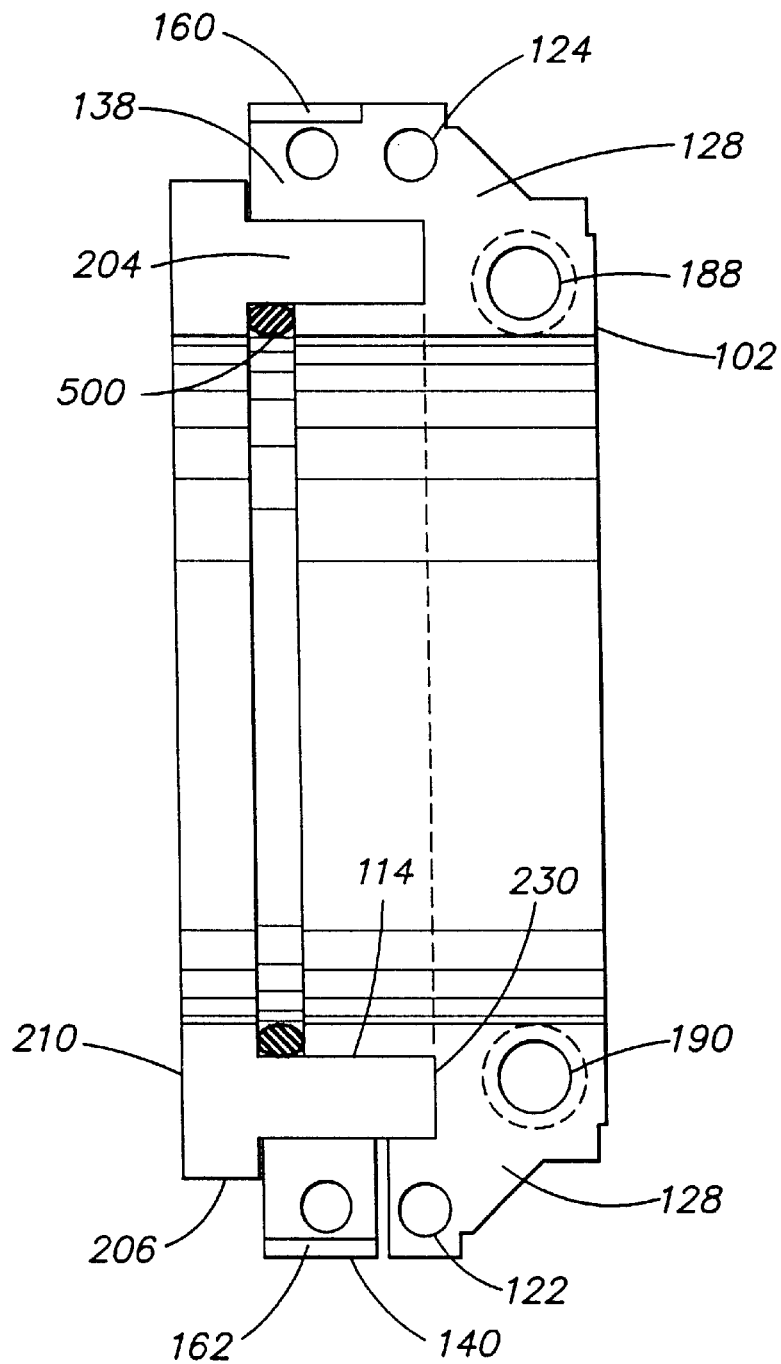
FIG. 3B is an alternative embodiment of the rotary seal component half of FIG. 3A without the radial nose.

A benefit of mounting the nose 214 in the recess 120 is that when axial force is applied to the outward radial surface 216 opposing the primary sealing surface, due to, for example, fluid pressure, the forward radial wall 215 of the nose 214 bears against the rearward radial wall of a lip 121 of the recess 120. Because the force is borne on the nose of the seal face, areas of concentrated stresses are reduced, if not eliminated, resulting in minimal distortion even at higher pressures. Any distortion that does occur is localized in and around the nose 214 and does not translate to the primary sealing surface 210 even at higher pressures. Alternatively, as shown in FIG. 3A, the nose 214a may extend radially inwardly and engage with a recess 120a in the inner axial wall 114a.

Figure 4:
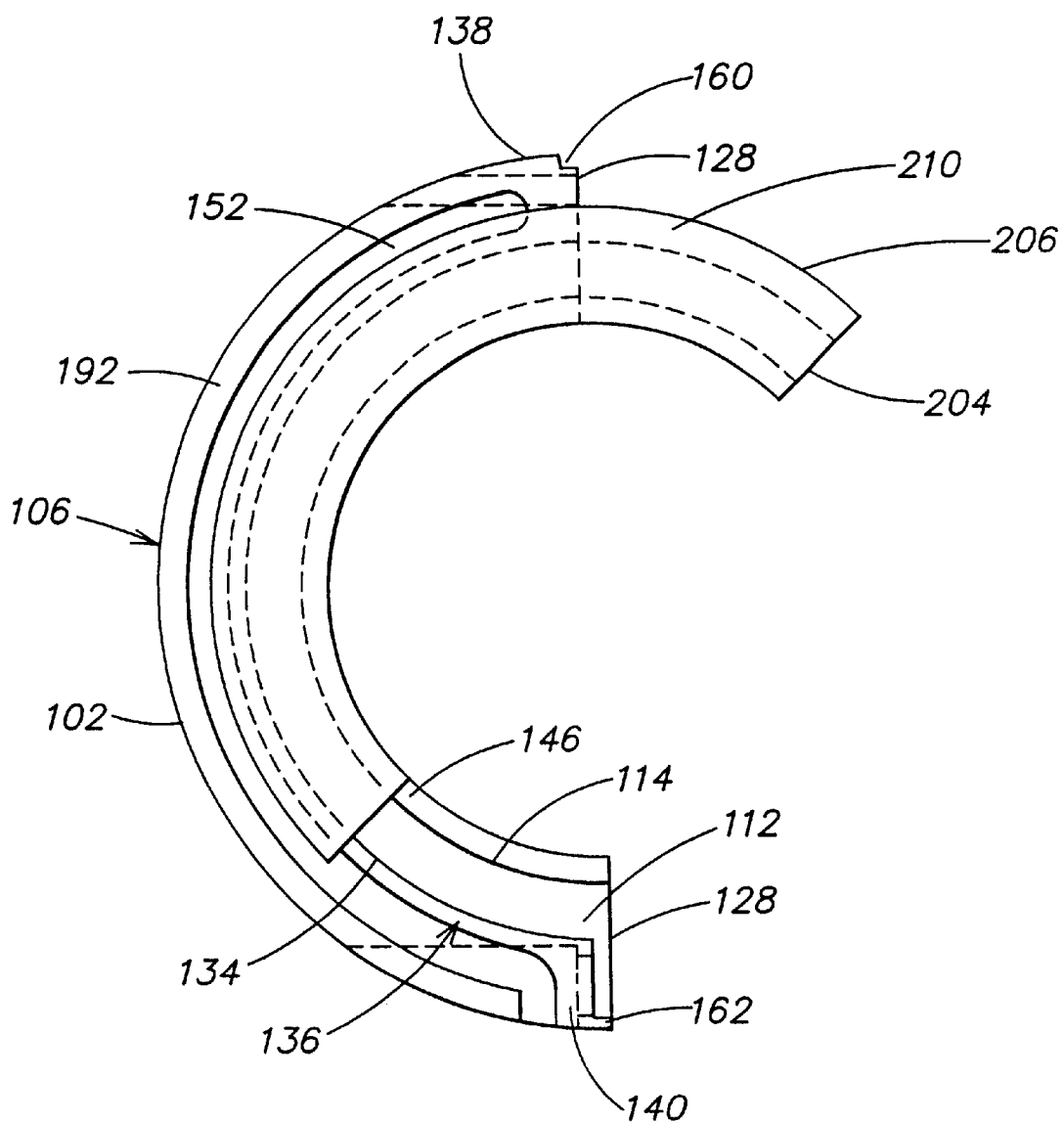
FIG. 4 is a top view of a rotary seal component half showing a rotary seal face segment partially inserted into a rotary holder half.

To fit the nose 214 within the recess 120, the seal face segments 206 are inserted into the channel 112 radially, with one split surface 204 entering the channel 112 first as shown in FIG. 4. The seal face segments 206 are then slid arcuately along the channel 112 until fully seated. The seal face segments 206, seated in the channel 112, are unlikely to be inadvertently dislodged. Thus, in such a configuration employing a channel 112 to house the face segments 206, separate handling and consequent damage of the face segments 206 during installation of the rotary seal component 30 is reduced.

Split o-ring 500 seated on the inner wall 220 of the rotary seal face 200 contributes to the face 200 being aligned concentrically with the shaft 20. Split o-ring 500 may be located at various axial locations between the seal face 200 and the shaft 20 as shown in FIGS. 1A, 1B, 5A, 5B, 6A, 6B, 8A, 8B, 9A and 9B. Although the split o-ring 500 is shown in FIGS. 1A, 3A, 5A, 6A, 8A, and 9A, in connection with the use of a radially extending nose 214 on the outer axial wall 218 on the rotary seal face 200, the present invention is not limited in this respect, and that the o-ring 500 mounted on the inner axial wall 220 of the rotary seal face and may be used in association with any one of the seal face geometries discussed or shown in the figures. Embodiments of the invention without radial nose 214 are show in FIGS. 1B, 3B, 5B, 6B, 8B, and 9B If the rotary seal component 30 is secured around the shaft 20, the split o-ring 500 seals between the seal face 200 and the shaft 20, resists rotation of the seal face 200 relative to the shaft 20, and also helps to position the seal face 200 concentrically about the shaft 20.

Figure 9A:
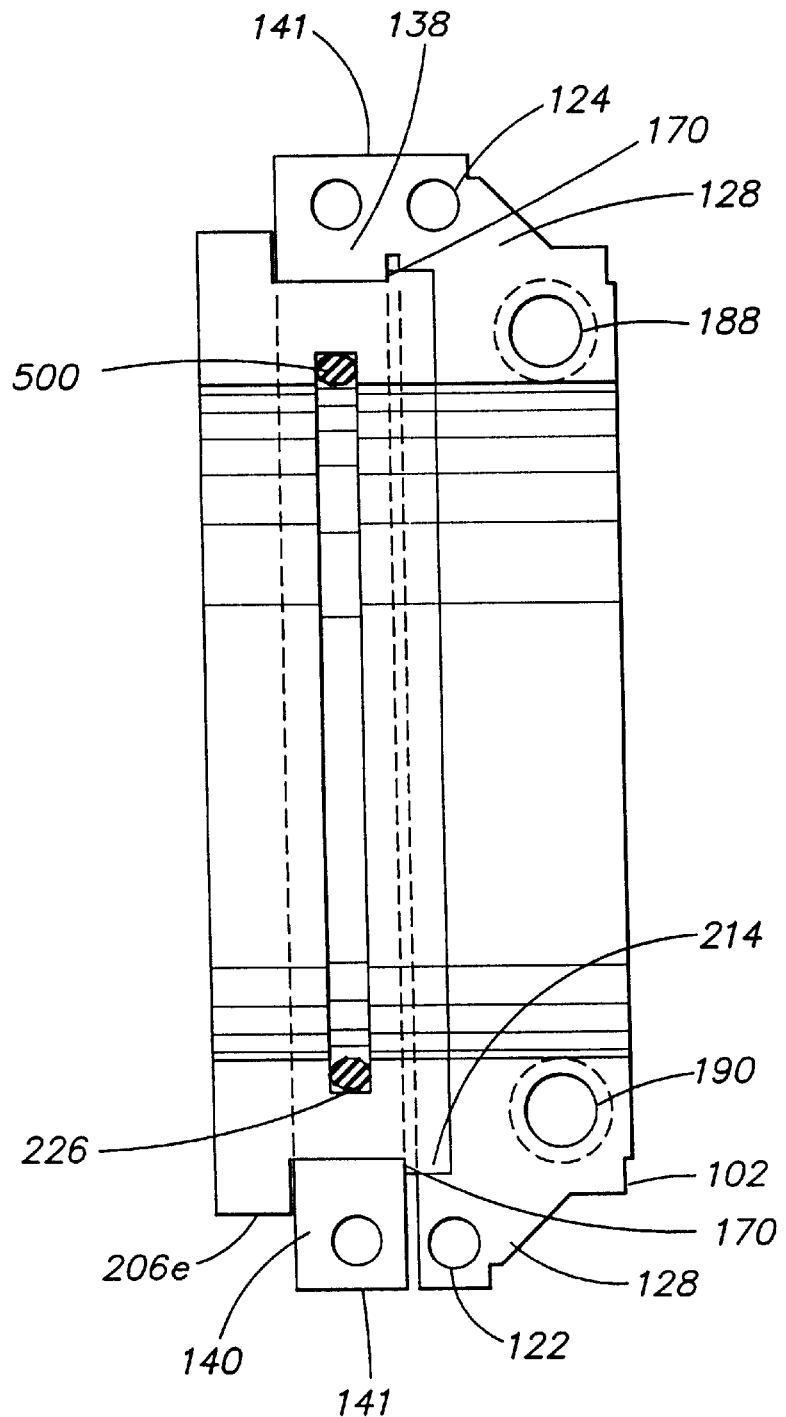
FIG. 9A is a side view of a rotary seal component half with a recess in the seal face within which a split o-ring is situated and in which a nose of the seal face bears against an integral band.
Figure 9B:
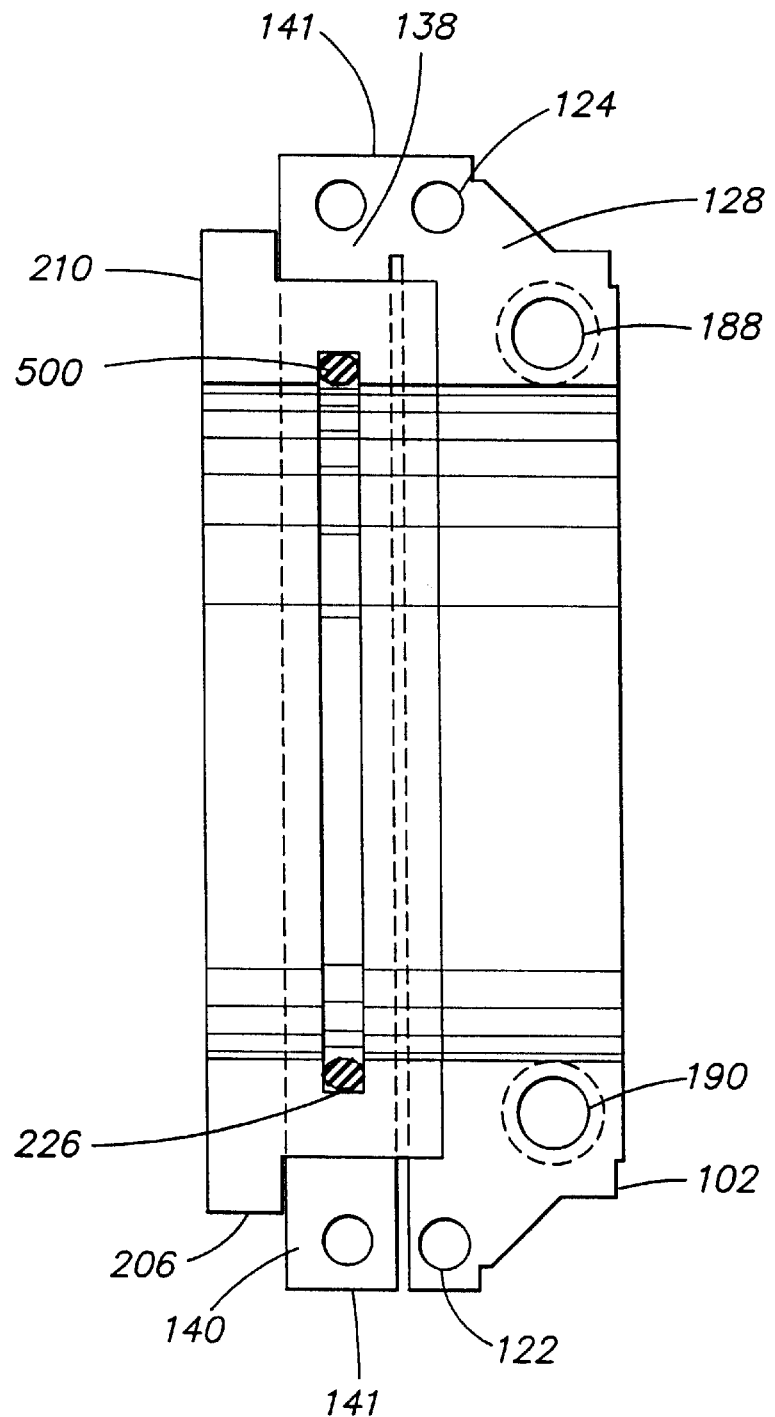
FIG. 9B is an alternative embodiment of the rotary seal component half of FIG. 9A without the nose.

O-ring 500 may be mounted on the inner axial wall 220 of the rotary seal face segment 206. The rotary seal face segment 206 may be shaped and formed to create a groove 226 in which to seat the o-ring 500 as shown in FIGS. 9A and B. Alternatively, as shown in FIGS. 1A, 1B, 3A, 3B, 5A, 5B, 6A and 6B, the seal face segment 206 may be shaped and formed to provide an abutment surface 222 to maintain the o-ring 500 abutting the seal face segment 206 and the rotary holder half 102, 104. Thus, the o-ring 500 may be surrounded by the shaft 20, the abutment surface 222, a step 224 in the inner axial wall 220 of the seal face segment, and the front edge 146 of the inner axial wall 114 of the rotary holder half 102, 104. Thus, the o-ring 500 is clamped in position between the seal face segment 206 and the shaft 20 and inhibits process fluid from leaking around the shaft 20. The use of o-ring 500 and band 136 does not require the use of a channel gasket to prevent internal pressure from causing the seal face segment 206 to separate.

Figure 16A:
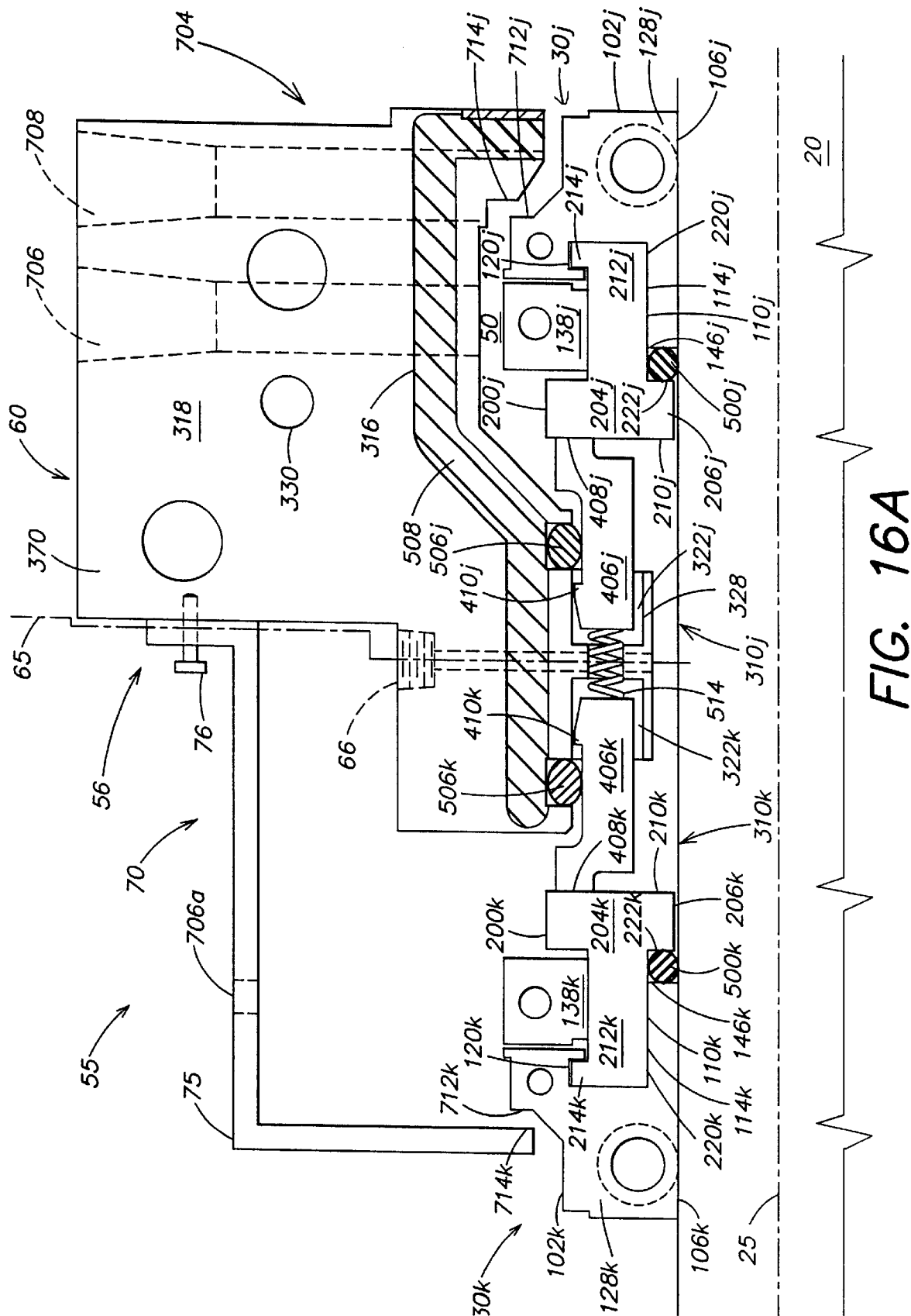
FIGS. 16A–16D are side views of the mechanical split seal according to further embodiments of the invention wherein two seal sections are employed.
Figure 16B:
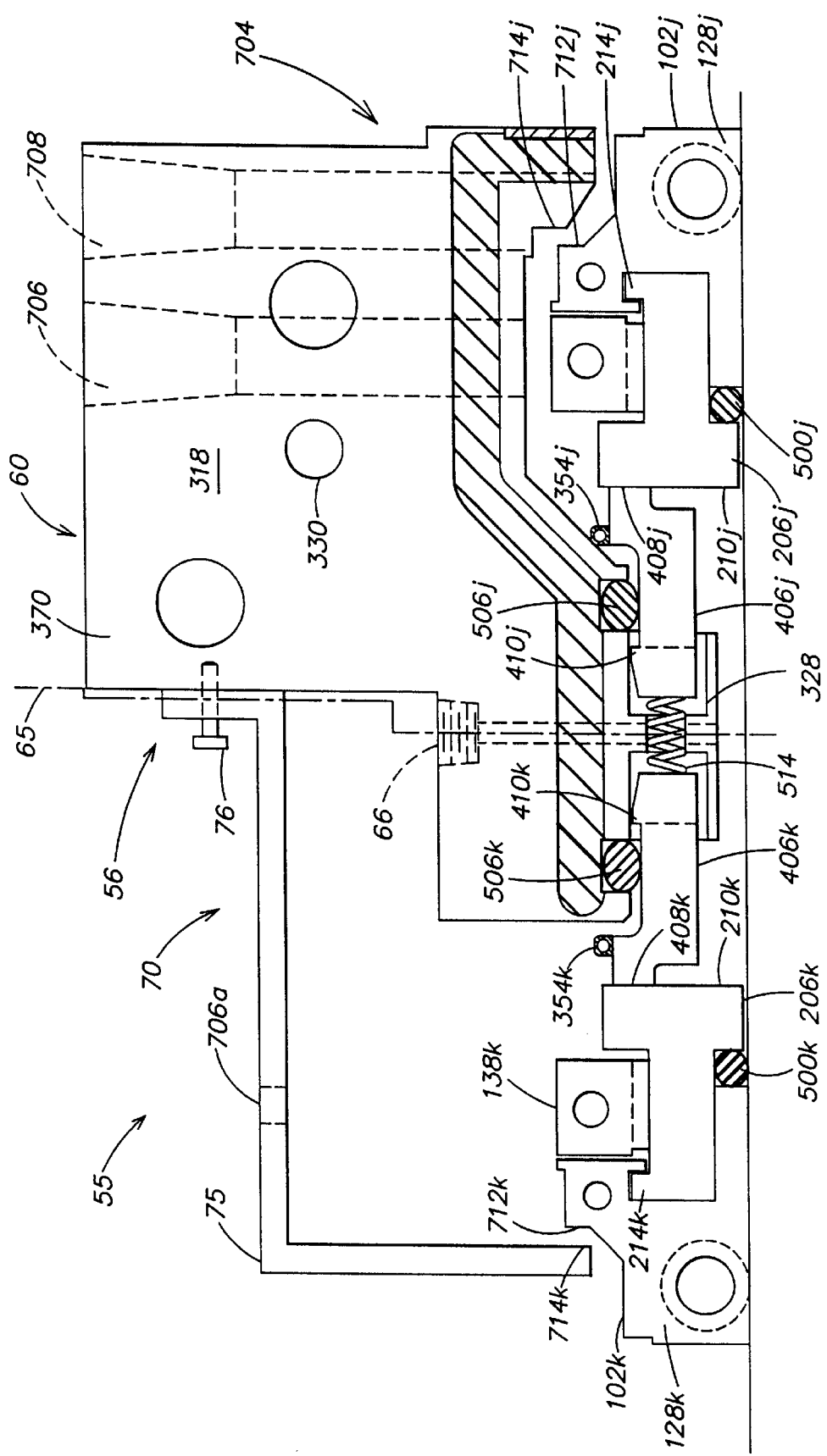
Figure 16C:
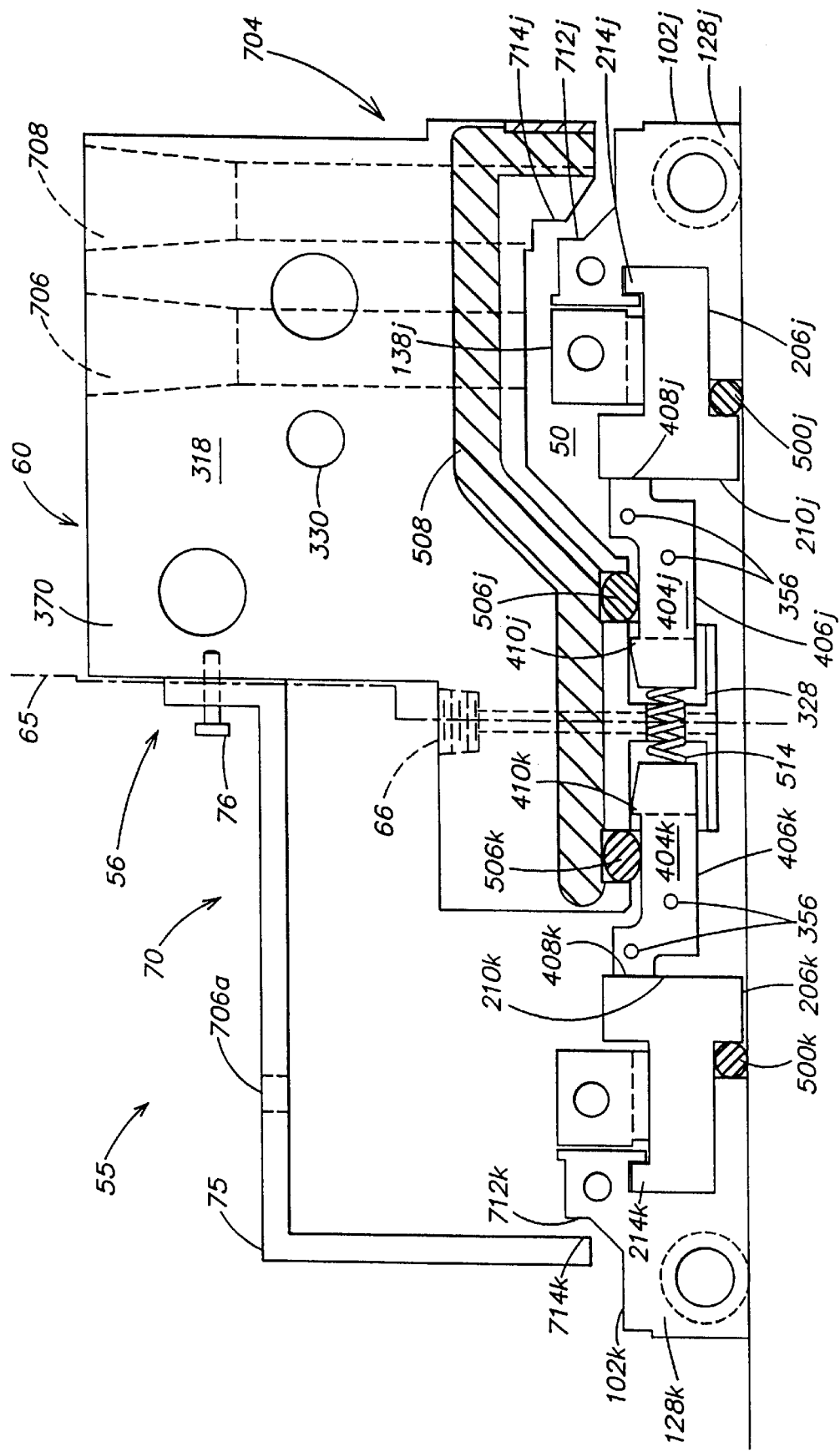

In a further embodiment of the invention, seal assembly 10 may be used in a double seal as shown in FIGS. 16A–C, which will be discussed more fully below. In a double seal, o-rings 500j, 500k not only prevent the process fluid from leaking around the shaft 20 into the seal assembly 10, but may also prevent the barrier fluid from leaking out of the seal assembly into the process fluid. Thus, use of o-ring 500j, 500k and bands 136i and 136k does not require the use of a channel gasket to prevent internal pressure from causing the seal face segments 206j, 206k to separate.

Figure 19:
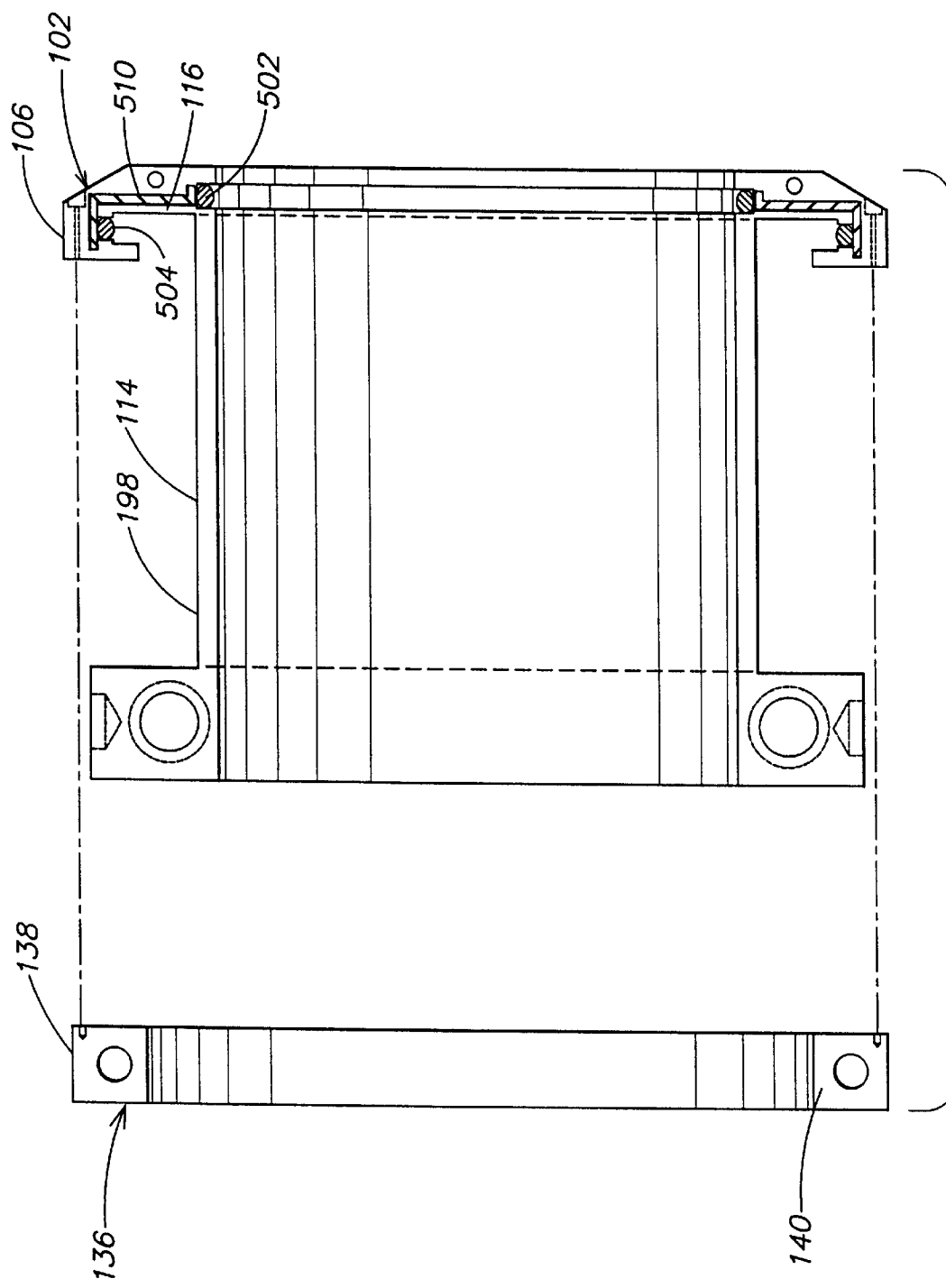
FIG. 19 is an exploded side view of a rotary seal component half showing the band of FIG. 18 being attachable to a holder of a cartridge-type seal.
Figure 37:
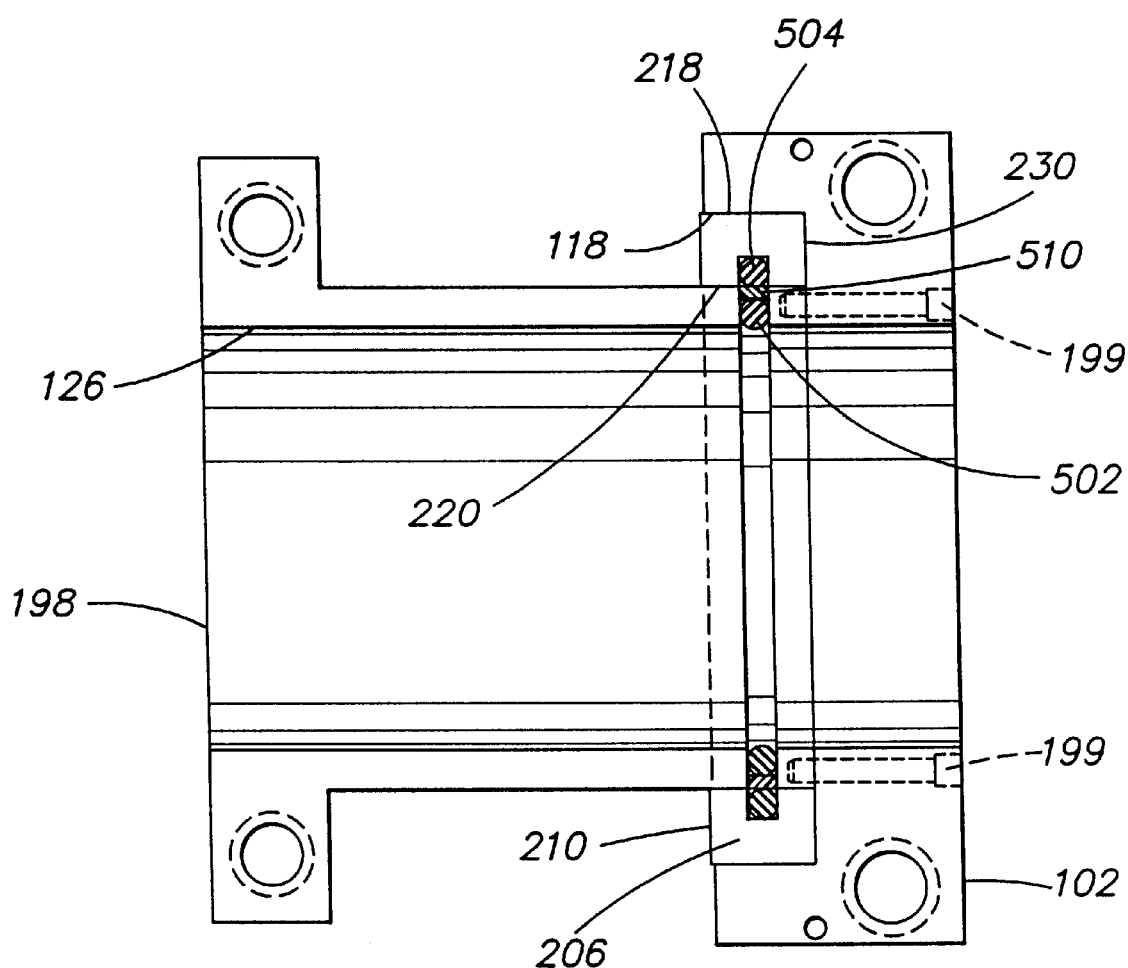
FIG. 37 shows a face seal pressed into a holder, with fasteners used to hold a sleeve.
Figure 38:
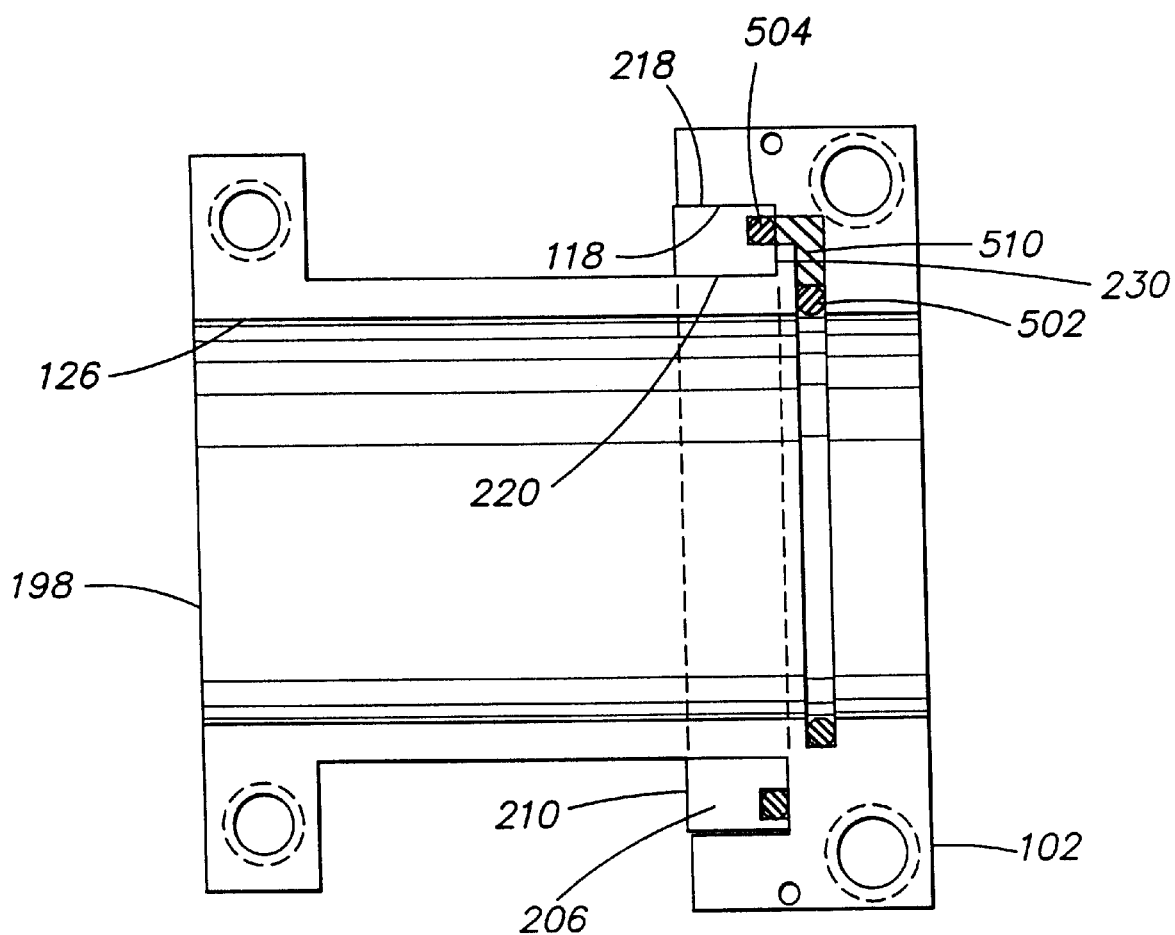
FIG. 38 is an alternative embodiment of the seal of FIG. 37, wherein the sleeve and holder are integrally formed.

Alternatively, the seal face 200 maybe used in a cartridge design seal as shown in FIGS. 19, 37–40, and 42 with a sleeve 198. In a cartridge seal, two split o-rings 502, 504 may be used to seal the seal face segments 206. A gasket 510 is positioned to form a seal between the split o-rings 502, 504. As shown in the embodiments illustrated in FIGS. 37, 39, and 40, the split o-rings 502 may be placed on the internal wall 126 of the sleeve 138 proximate the seal face segments 206. The corresponding split o-ring 504 may be placed in the inner axial wall 220 of the seal segment 206 with the gasket 510 sealing between the o-rings 502, 504. Alternatively as shown in FIGS. 19 and 38, the split o-ring 502 may be placed on the holder half 102, 104 and the corresponding o-ring 504 may be place proximate the seal face segments 206 on the outer axial wall 218 or the radial surface 230.

The o-ring 500 described above may be mounted in various ways. The figures depict only a few of the many combinations envisioned. FIGS. 1A, 1B, 3A, 3B, 5A, 5B, 6A, 6B, 8A, 8B, 9A, 9B, 10A and 10B each depict a slightly different sealing configuration. In FIG. 6, the surface 222c of the seal face segment 206c opposing the primary sealing surface 210 is a conical surface rather than radial. In another configuration, shown in FIG. 8, the seal face segment 206d is machined with a conical back wall 228 against which the split o-ring 500 is placed.

Figure 10A:
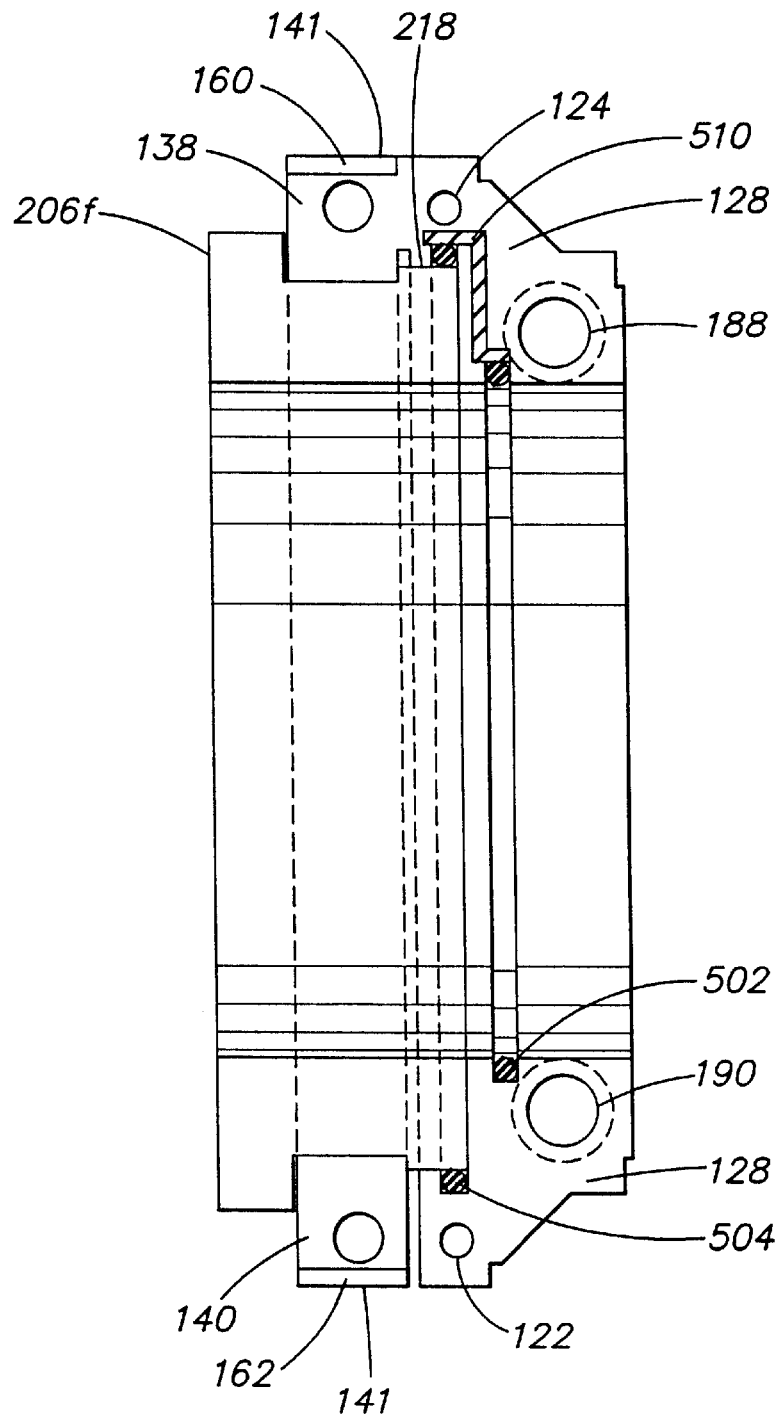
FIG. 10A is a side view of a rotary seal component half in which an inner split o-ring is seated in a recess in the rotary holder half and a second split o-ring is situated against the outer wall of the nose, with a gasket joining the two split o-rings.
Figure 10B:
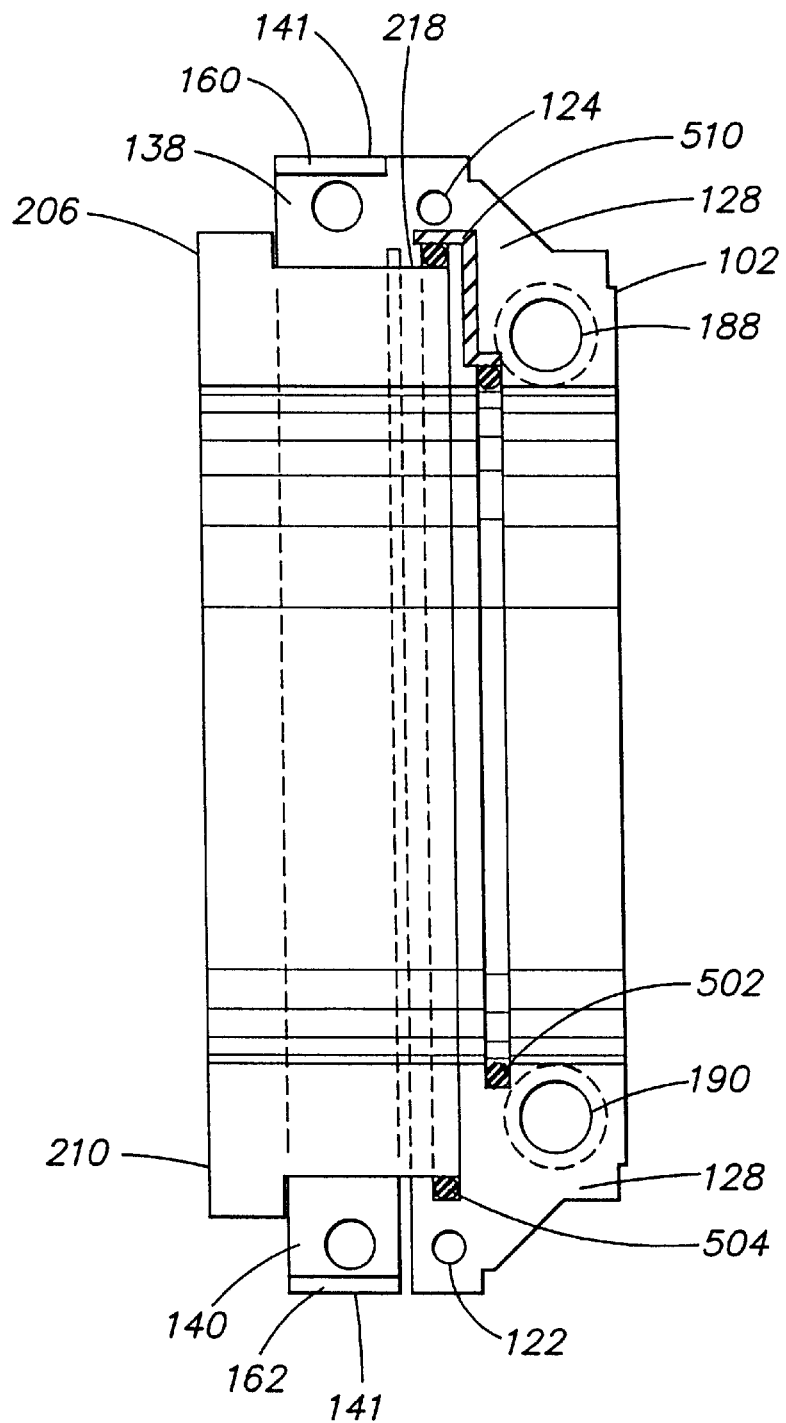
FIG. 10B is an alternative embodiment of the rotary seal component half of FIG. 10A without the radial nose.
Figure 20A:
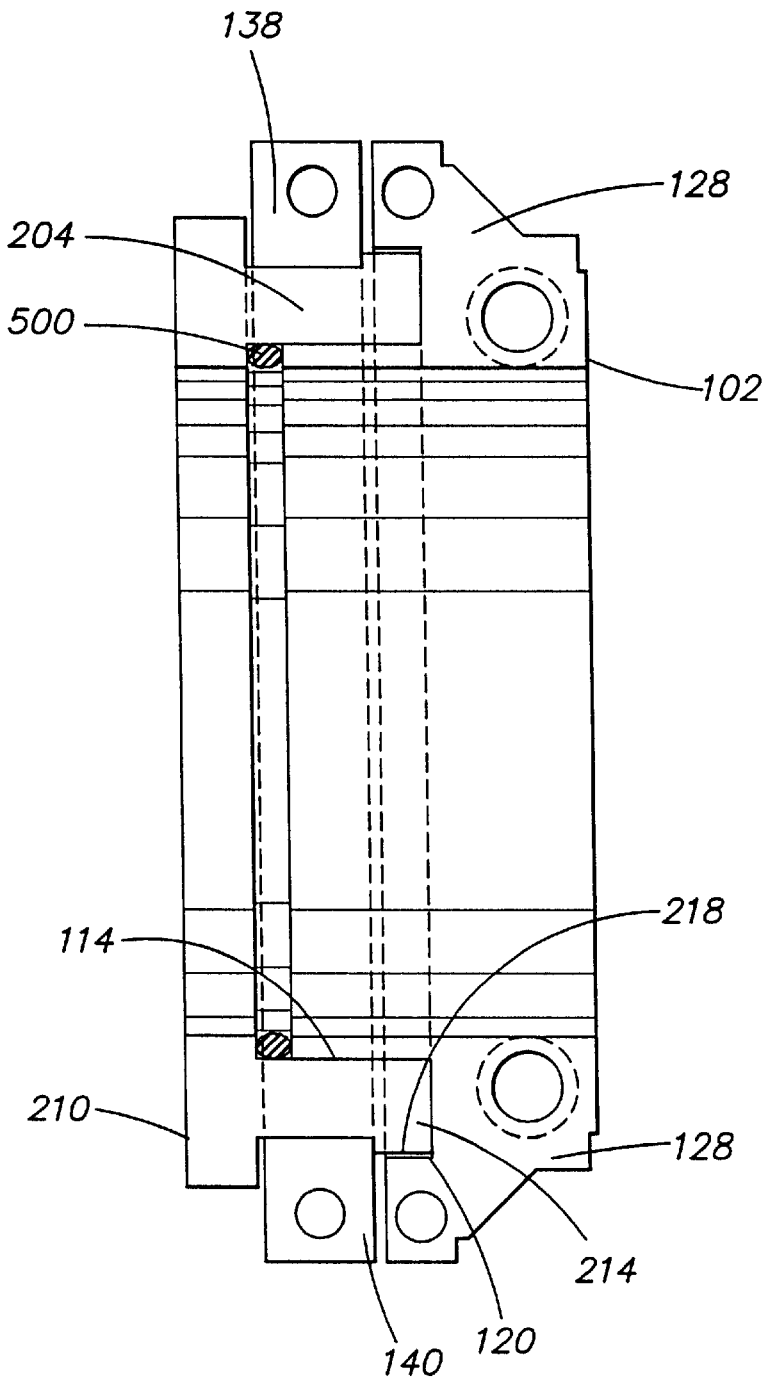
FIG. 20A is a side view of a rotary seal component half according to an alternative embodiment of the invention.
Figure 20B:
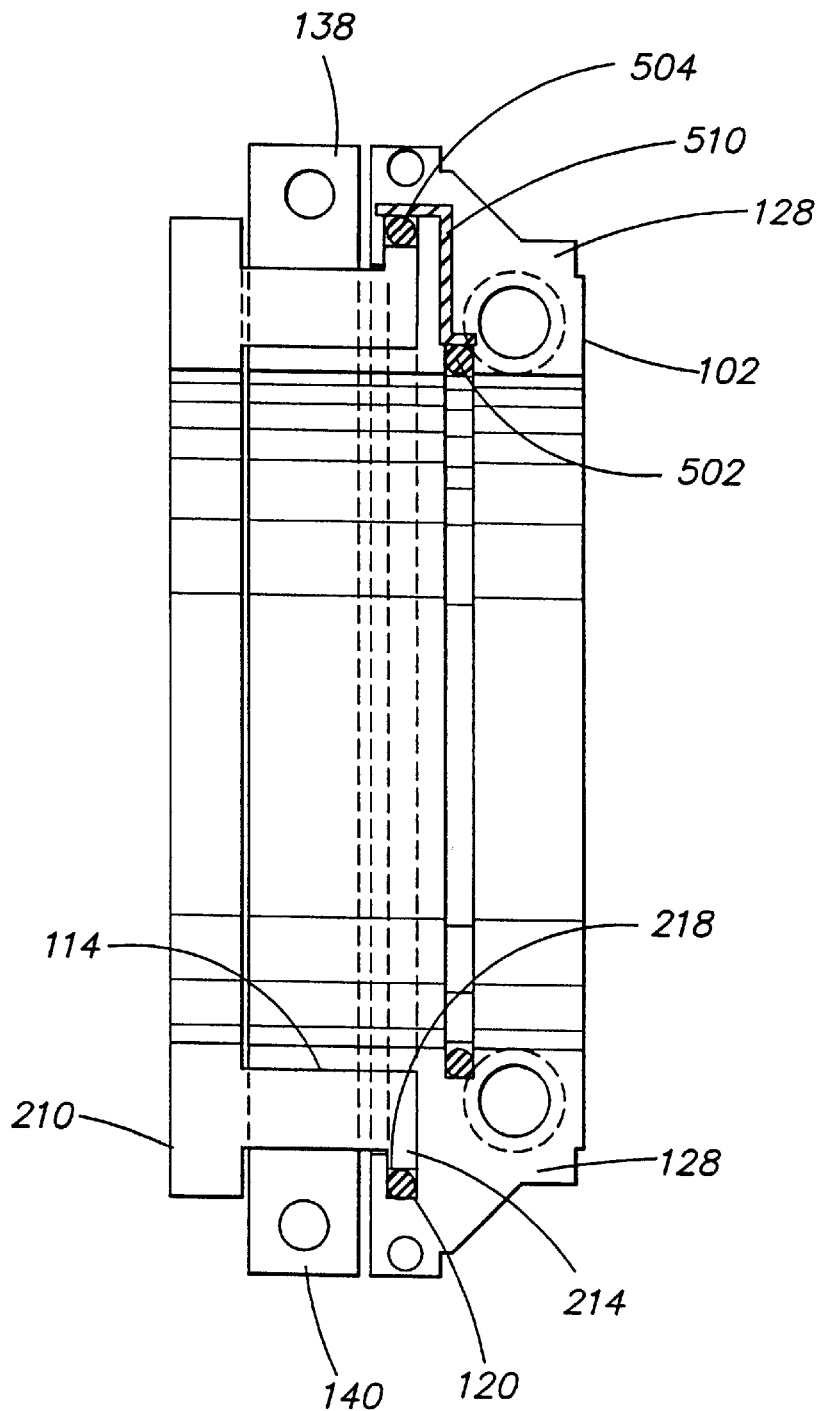
FIG. 20B is a side view of a rotary seal component half employing a channel gasket behind the seal face.
Figure 21:
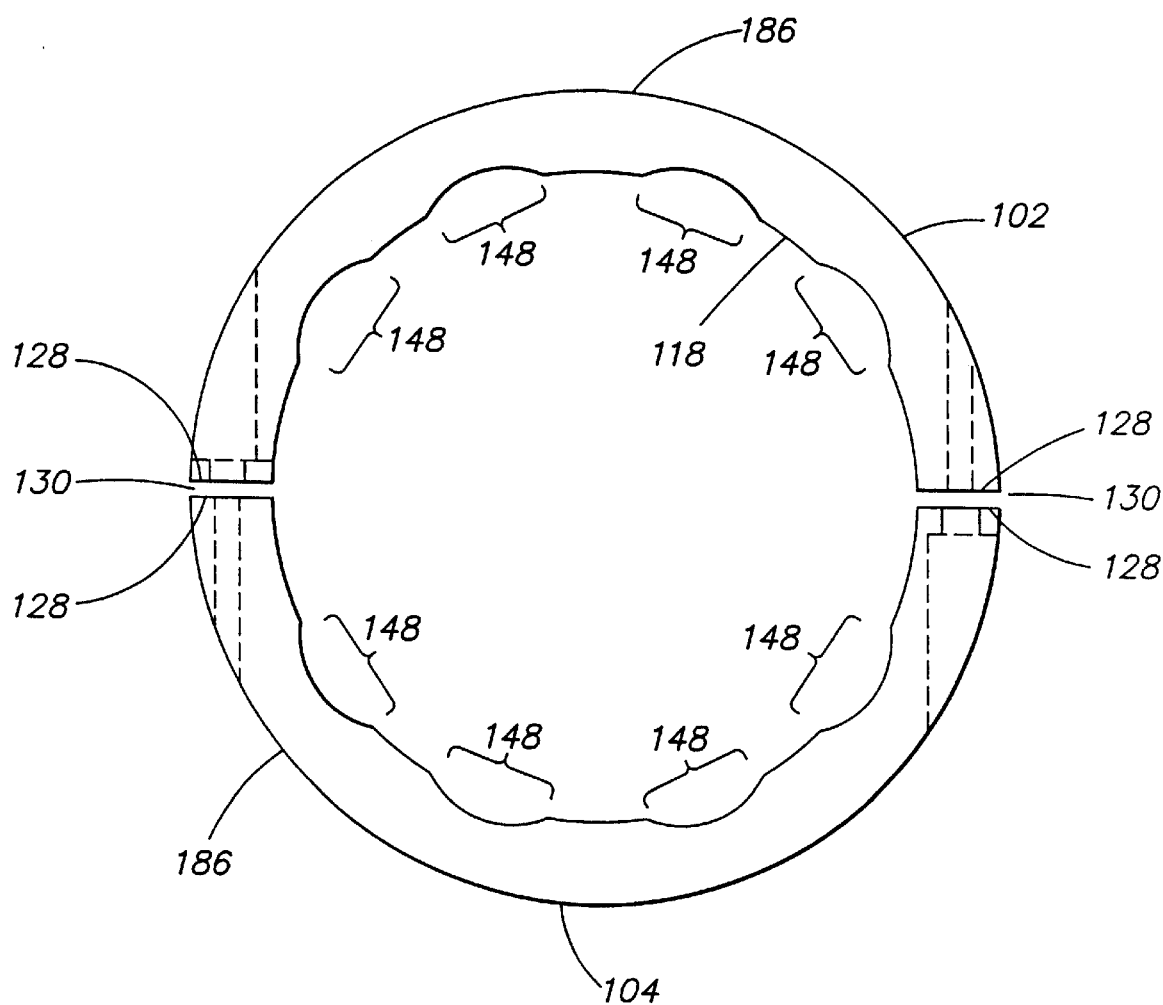
FIG. 21 is a top view of a rotary seal component half including stress-relieving features.

Two split o-rings 502 and 504 may be used instead of the single split o-ring 500 as shown in FIGS. 10A, 10B and 20B. Split o-ring 502 seals between the shaft 20 and the rotary holder halves 102, 104 and split o-ring 504 seals between the outer axial wall 218 of the seal face segments 206f and the rotary holder halves 102, 104. A gasket 510 is positioned to form a seal between the split o-rings 502, 504.

The ends of the split o-rings may be slightly displaced angularly from the rotary holder mating surfaces 128. This slight offset provides a good seal against the shaft 20 and prevents the o-ring from being caught between the mating surfaces 128 of the holder halves 102, 104. Alternatively, the ends of the split o-ring may include a ball and socket joint, tongue and groove joint, or may be formed blunt.

The inner axial wall 114 also contributes to concentricity between the seal face 200 and the shaft 20. The inner axial wall 220 of section 212 bears radially against the inner axial wall 114 and prevents the face 200 from being pulled eccentric to the shaft 20 which could create a leak between the face and shaft, if the holder is tightened unevenly. The inner axial wall 220 also limits the amount of eccentricity of the face so that the face runs concentrically to the shaft.

Figure 5A:
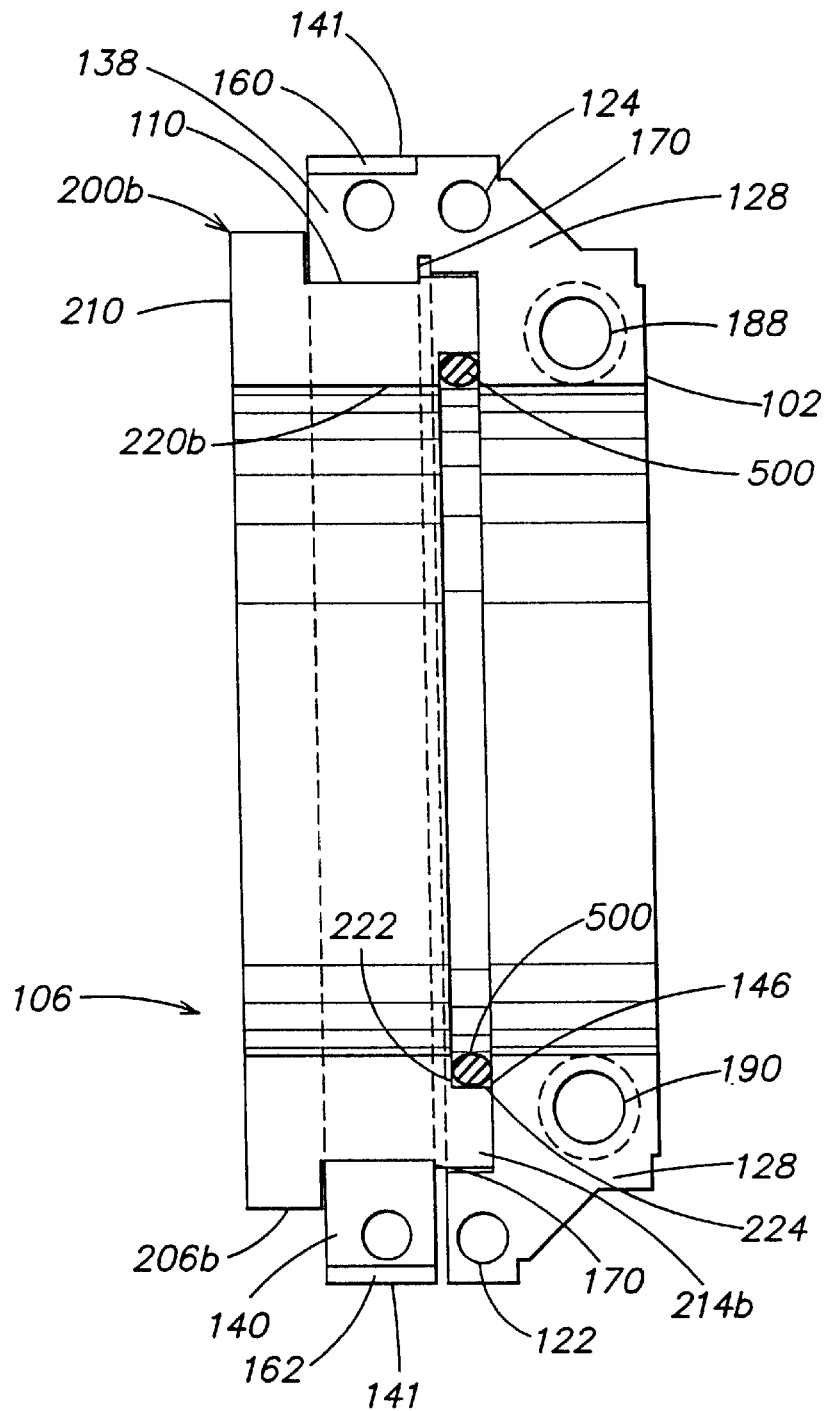
FIGS. 5A and 5B are side views of a rotary seal component half according to further embodiments of the invention shown without an axial wall between the seal face and the shaft.
Figure 5B:
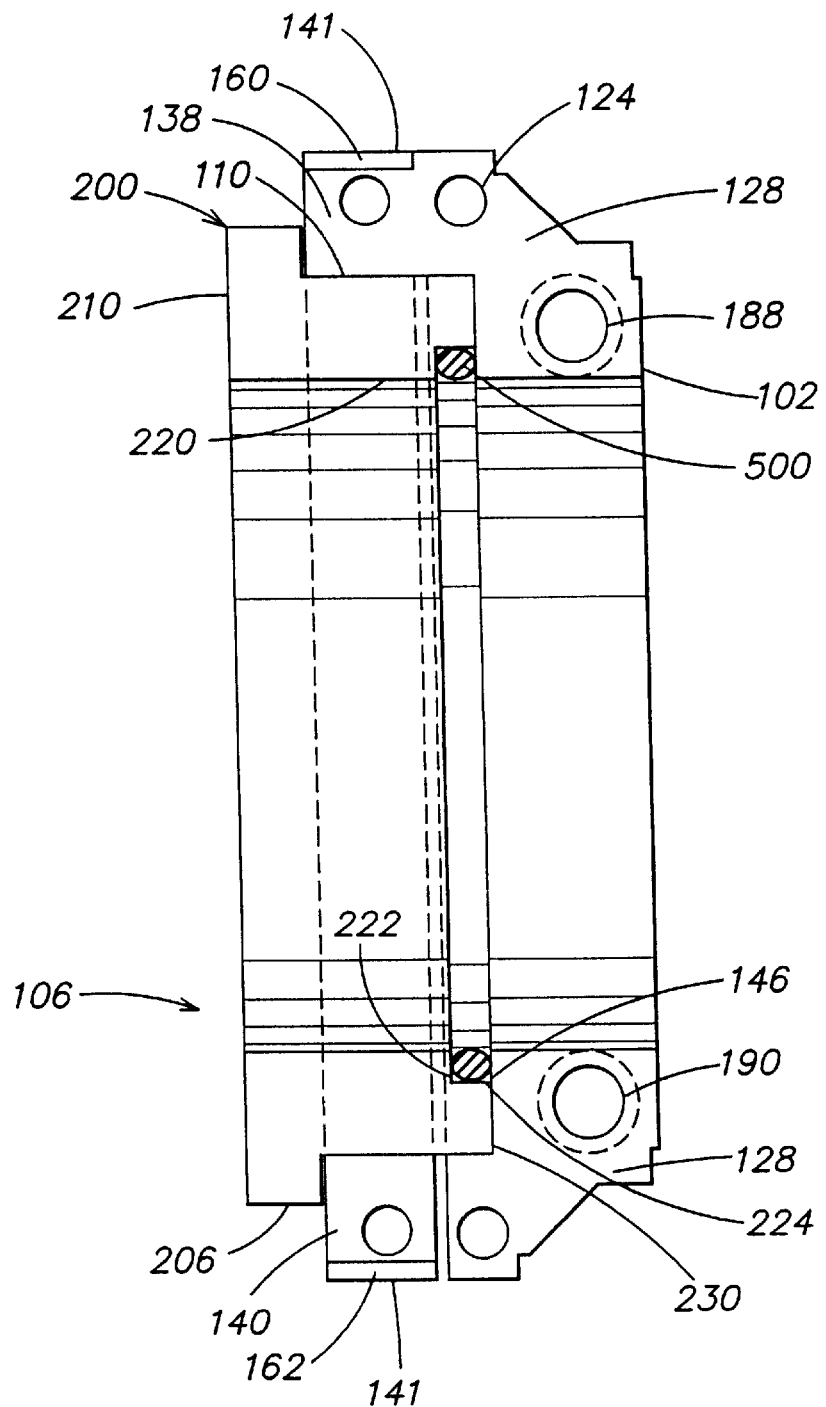
Figure 6A:
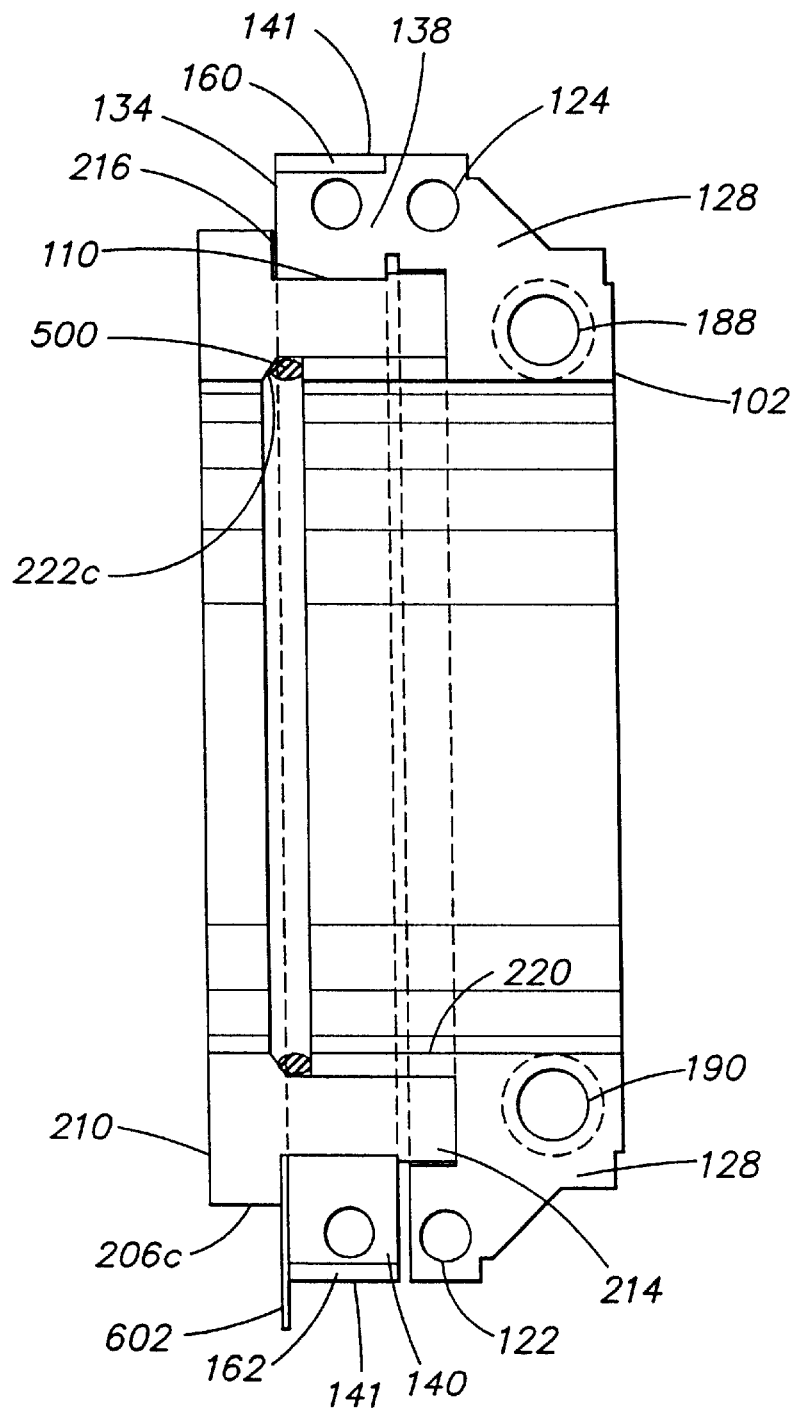
FIGS. 6A and 6B are side views of a rotary seal component half according to further embodiments of the invention in which a seal face surface proximate a split o-ring is conically shaped.
Figure 6B:
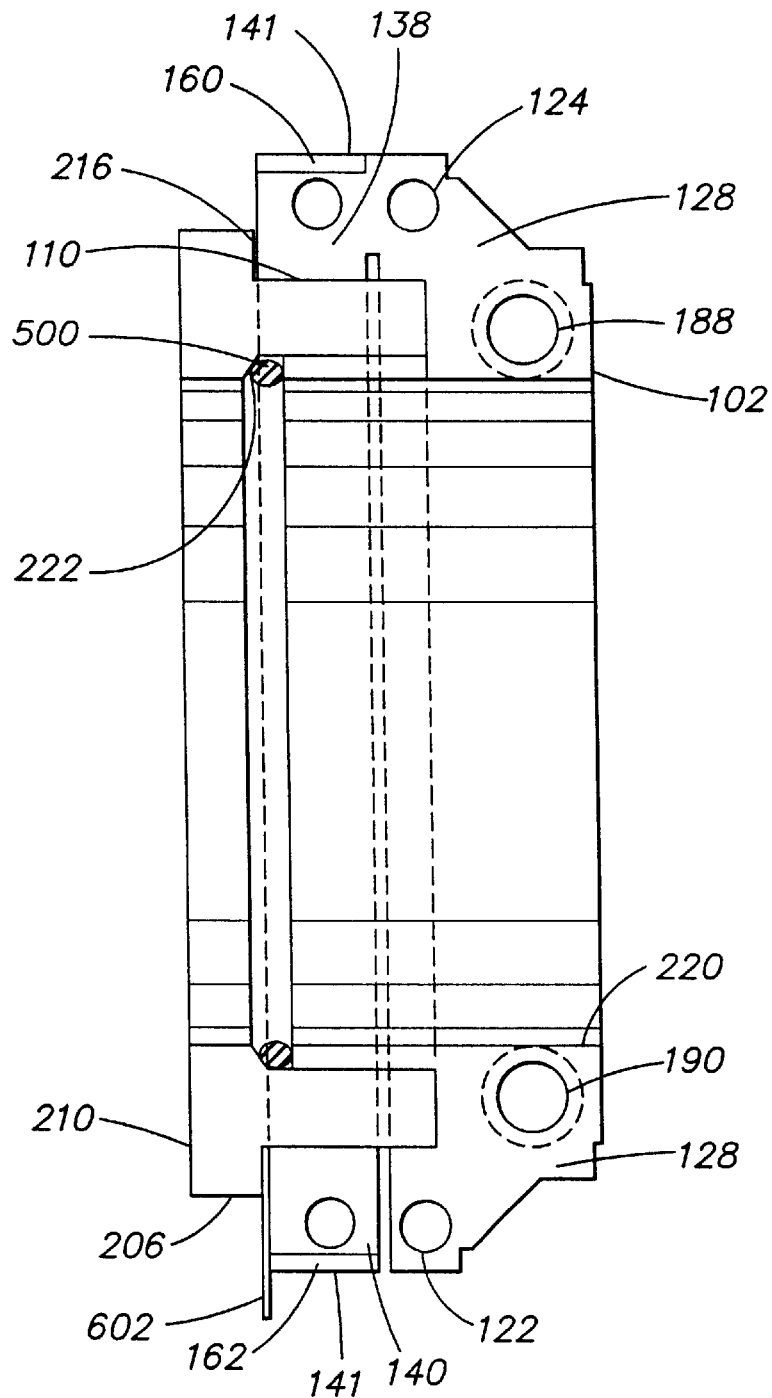

Alternatively as shown in FIGS. 5A and 5B, the counterbore 110 may not include an inner axial wall 114. In such a configuration, a close fit between the inner axial wall 220b of the seal face and the shaft 20 may assist with achieving and maintaining concentricity between the seal face 200b and the shaft 20.

Figure 35B:
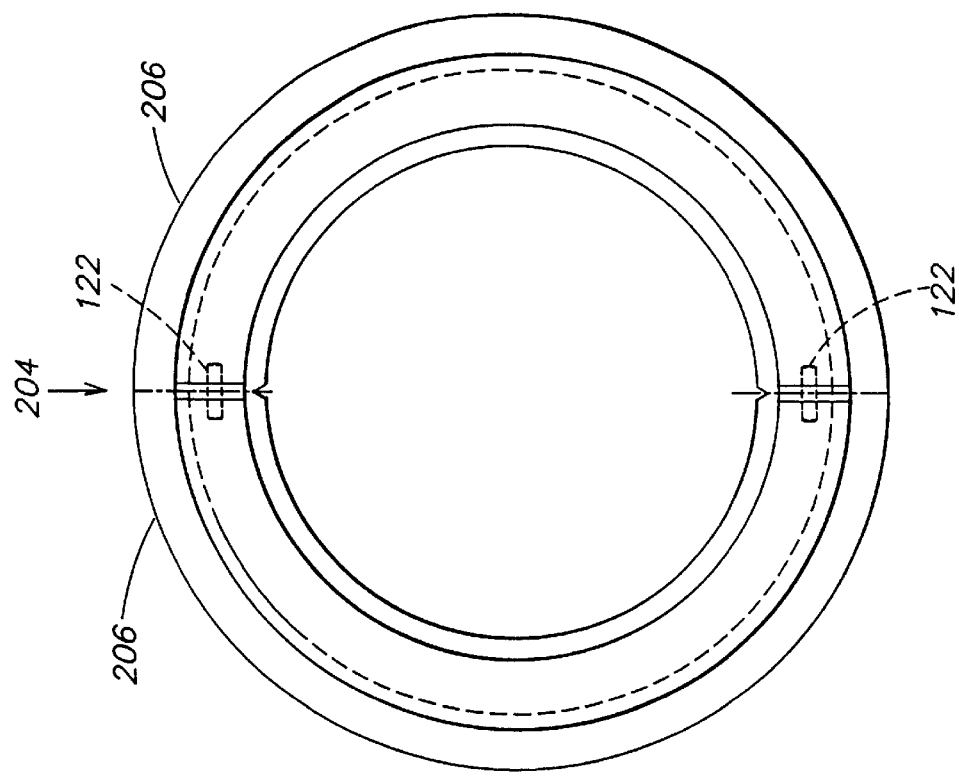
FIG. 35B is a top view of the face seal of FIG. 35A.
Figure 35A:
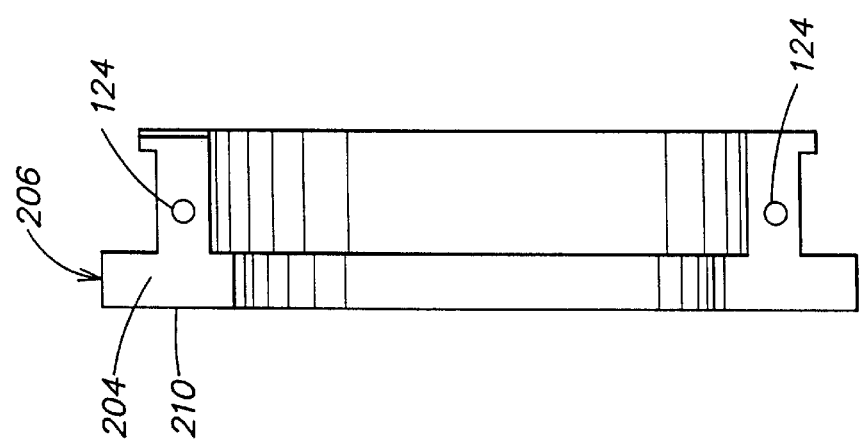
FIG. 35A is a side view of an alternative embodiment of the face seal.

Alignment of the seal face segments 206 may be assisted by aligning pins 122. These pins may have chamfered or rounded ends, which may extend from one of the rotary holder mating surfaces 128 of each rotary holder half 102, 104. Aligning holes 124 may be bored in the other rotary holder mating surface 128 of each rotary holder half 102, 104. The aligning pins 122 and aligning holes 124 may have a snug fit with about a 0.0005 in. clearance such that insertion of the aligning pins 122 into the aligning holes 124 helps assist in aligning the primary sealing surfaces 210. Those skilled in the art will recognize that the aligning pins 122 and aligning holes 124 may be placed directly in the mating surfaces 204 of the seal face segments 206 as shown in FIGS. 35A and 35B, rather than the mating surfaces 128 of the holder halves 102, 104. In a further embodiment of the invention as shown in FIGS. 35A and 35B, aligning holes 124 may be bored into each mating surface 128 or 204. The aligning pin 122 may be inserted into the aligning holes 124 to align the sealing surfaces 210. The aligning pin 122 includes but is not limited to, dowel pins, gaskets, and flanges, which may be permanent or removable.

The snug fit of the aligning pins 122 in the aligning holes 124 has the further advantage of providing for easy installation. If the rotary seal component halves 106, 108 are placed around the shaft 20 and the aligning pins 122 are inserted into the aligning holes 124, the rotary seal component 30 may be left on the shaft 20 or moved along the shaft 20 without becoming undesirably disengaged, even before the attachment of any fasteners.

Although the insertion of the aligning pins 122 into the aligning holes 124 and the interaction of the nose 214 of the seal face 200 with the recess 120 of the rotary holder halves 106, 108 may satisfactorily help assist in aligning the primary sealing surfaces 210 when the two rotary component halves 106, 108 are connected, a final alignment may be warranted before fastening. A shim 602 may be inserted as illustrated in FIG. 6A, between a front edge 134 of the outer wall 118 of the counterbore 110, and the outward radial surface 216 opposing the primary sealing surface 210. The shim 602 may be employed to move the rotary face segments so that the nose 214 can move forward to engage the front edge of the recess or the back edge of the band, wherein the edge of the band acts as an abutment surface, depending upon the particular configuration selected. Moving the rotary face segment aligns the face substantially perpendicular to the shaft.

Figure 7:
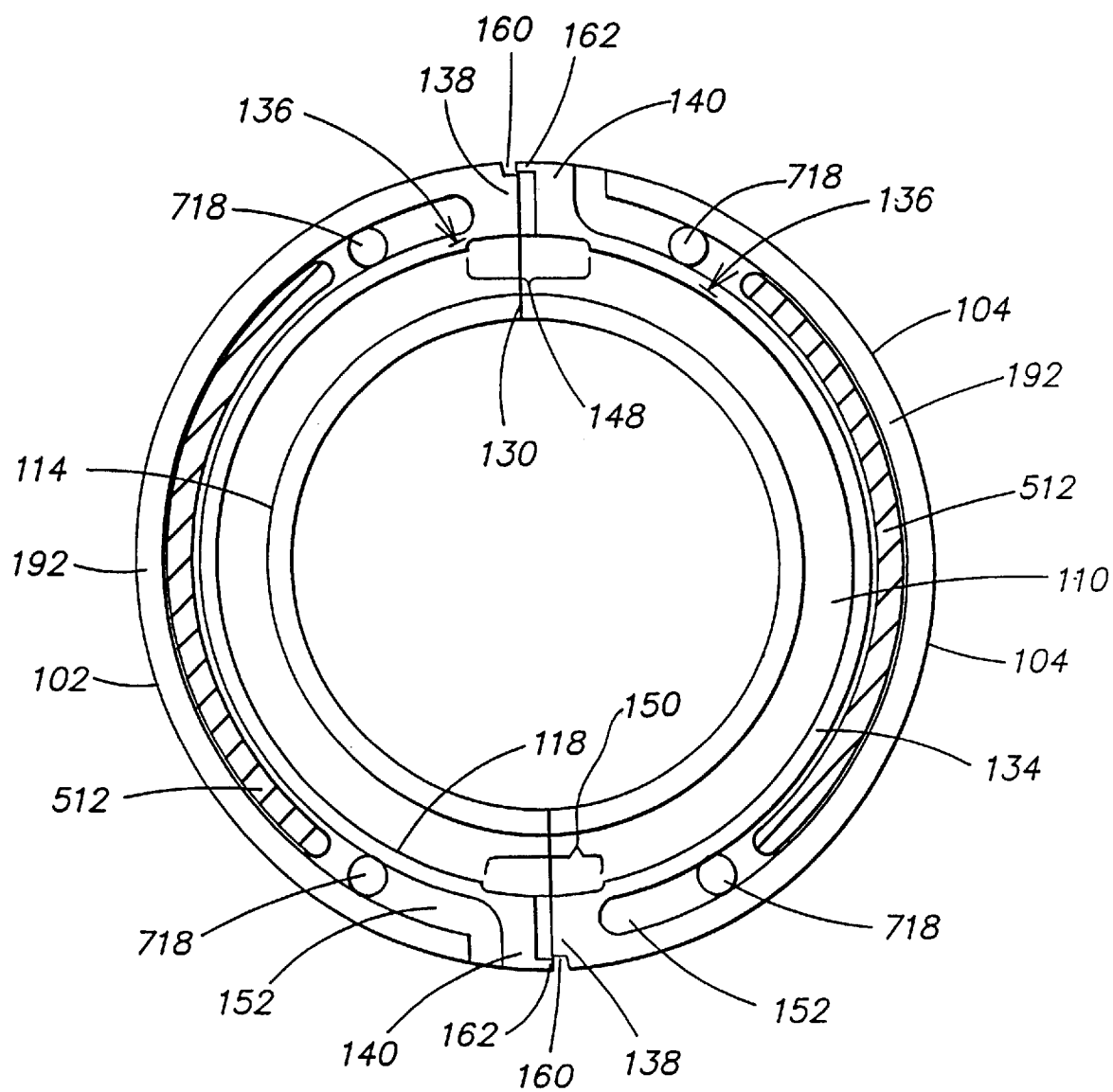
FIG. 7 is a top view of two joined rotary holder halves, illustrating stress-reliefs in inner and outer axial walls.
Figure 18:
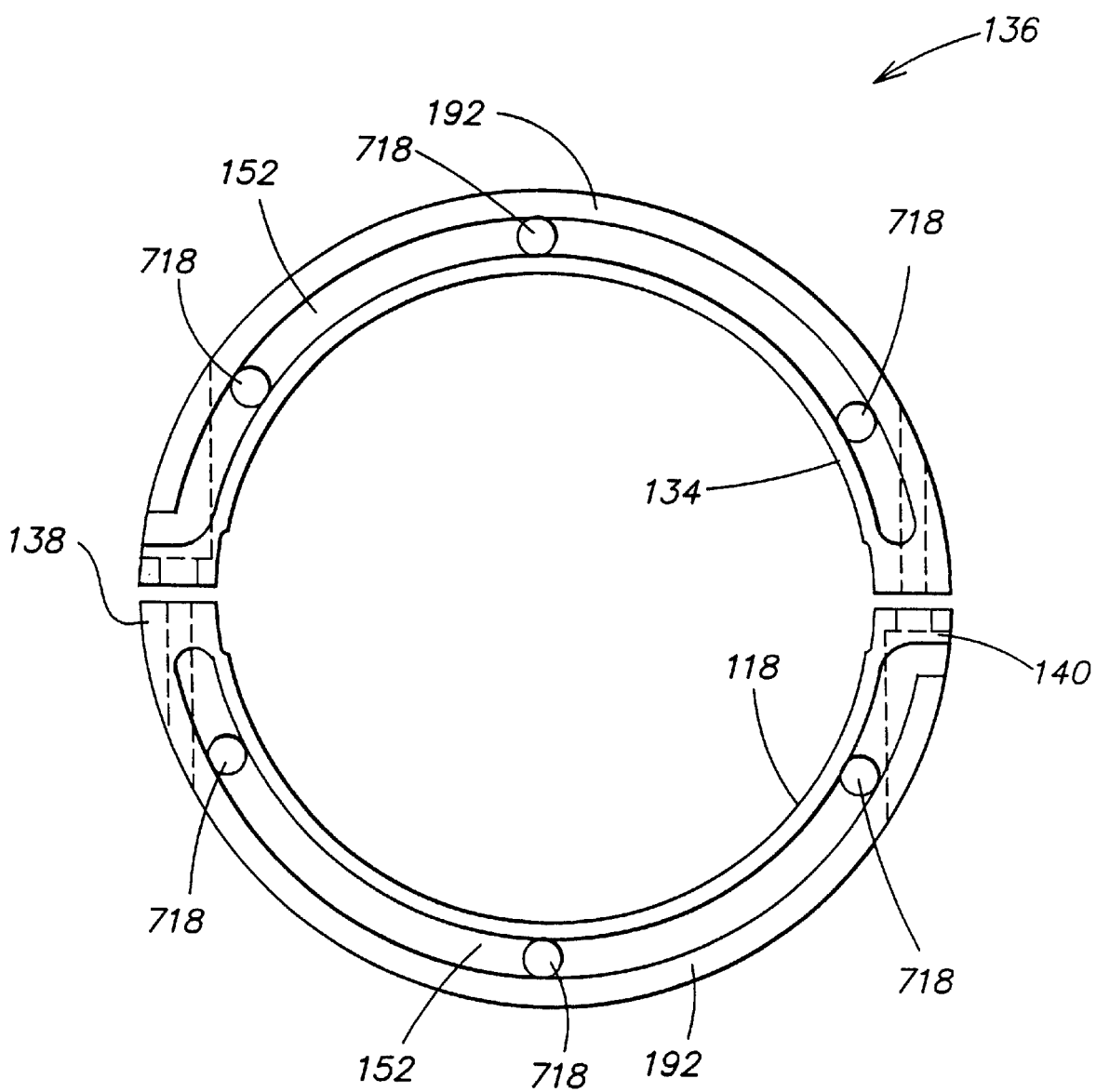
FIG. 18 is a top view of a pair of bands that may be secured around the seal faces and that may also be secured to a seal holder with the use of suitable fasteners.

Alternatively, as shown in FIGS. 1A, 7, and 18, seal height device 718 may be mounted to a rotary holder half 102, 104 to help set the seal face 200 at the proper axial position within the channel 112 of the holder half 102, 104. Due to the clearances between the metal contact points between seal 200 and the rotary holder halves 102, 104, seal height device 718 insures proper alignment of the seal faces 200 during installation. In one embodiment of the invention, the seal height device 718 includes a spring mounted on a radial face 720 of the holder half 102, 104. Wave springs, canted coils, leaf springs and bands or resilient copolymers also may be used. The spring contacts the outward radial surface 216 of the opposing seal face segment 206. Thus, the spring mounted against the rigid holder half 102, 104 may move the rotary face segments forward so that the nose 214 can move forward to engage the front edge of the recess or the back edge of the band, depending upon the particular configuration selected. Moving the rotary seal face segment forward aligns the face substantially perpendicular to the shaft. In a further embodiment of the invention as shown in FIG. 1A, the spring 718 may be mounted in a hole 722 drilled into rotary holder half 102, 104 and may be removably mounted in the hole 722 or fixably mounted with an adhesive. In an alternative embodiment of the invention as shown in FIG. 7, the seal height device 718, which may be a spring, may be mounted between the band 136 and the external axial wall 192 of the rotary holder half 102, 104. In a further embodiment as shown in FIG. 7, the o-ring 512, if used, may be split into multiple parts and the seal height device 718 may be centrally mounted in groove 152 between the o-rings 512.

A small amount of material, such as about 0.013 inches, may be removed by machining from each mating surface 128 of each holder half 102, 104. This helps to position the face 200 perpendicular and concentric with the shaft 20 as well as aiding in clamping the holder to the shaft 20.

The seal face 200 may be clamped in position and formed concentrically about the shaft 20 by fastening together a band 136 of each rotary holder half 102, 104 around the outer periphery 218 of the seal face section 212. The bands 136 securely clamp the rotary face segments 206 together into a non-split configuration concentric with the shaft 20, and reduce or eliminate relative axial or radial movement between the rotary face segments 206. Although a torque-wrench may be used to tighten the bands 136 to the same tightness at each junction, because other features may be included such as the split o-ring 500 and the inner axial wall 114, which contribute to forming the seal face concentrically with the shaft 20, identical tightness at the junctions of the bands 136 may not be critical to concentricity.

Figure 8A:
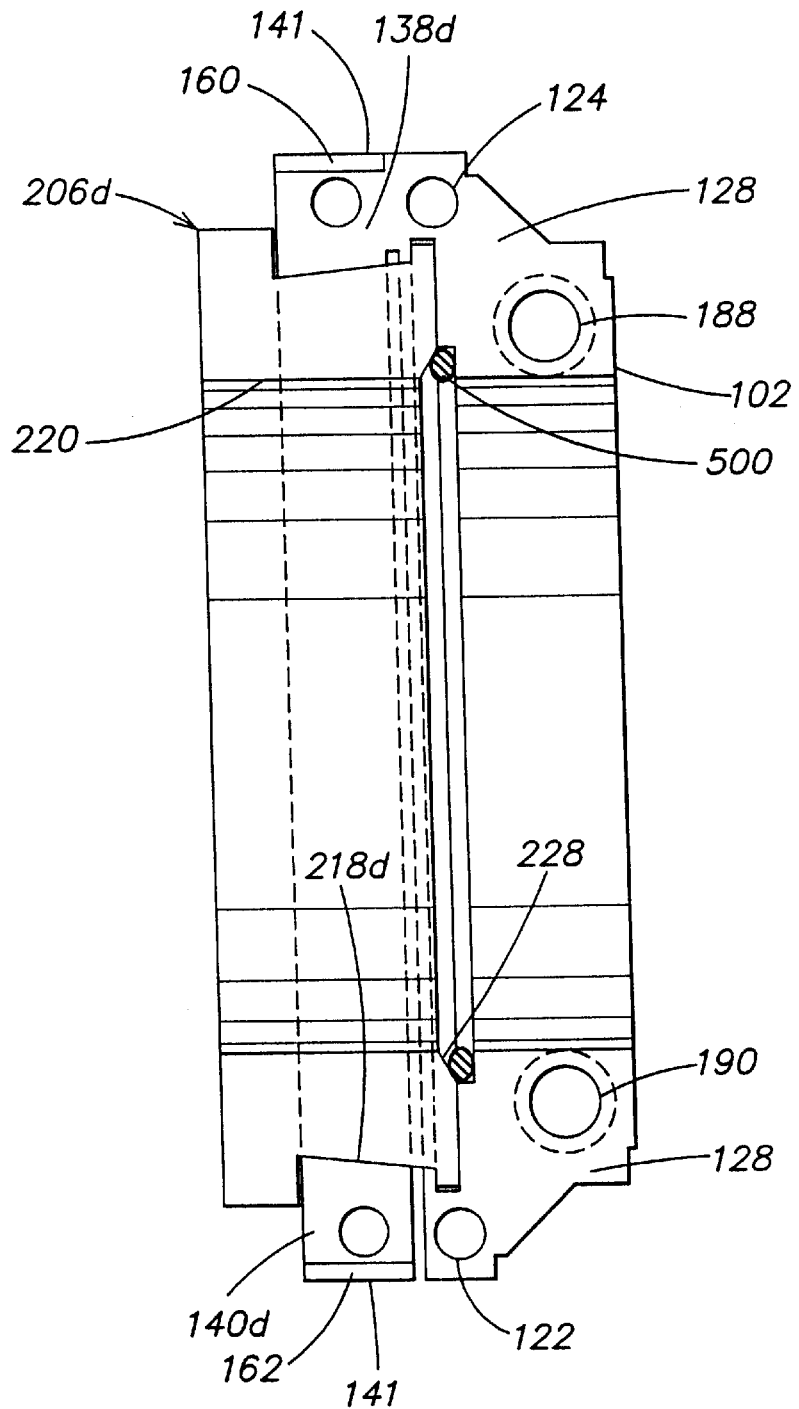
FIGS. 8A and 8B are side views of a rotary seal component half according to further embodiments of the invention in which the outer periphery of the seal face is conically shaped and an end of the seal face against which a split o-ring rests is also conically shaped.

As shown in FIG. 7, the band 136 may form a section of the outer axial wall 118 of the counterbore 110. A cylindrically-shaped band 136 or a conically-shaped band (FIG. 8B) may be used, which is complementary in shape to a seal face segment 206d with a conically-shaped outer axial wall 218d as shown in FIG. 8A. A tight tolerance between the band 136 and the outer axial wall 218 of the rotary face 206 allows the band to accurately conform to the outer periphery with a minimum take up of the band when tightened. If the diameter of band 136 is too large or too small, the seal face 200 may deform and distort. The back edge 170 of the band 136 may also serve as a stop for the nose 214 extending outwardly from the seal face segments as shown in FIGS. 5A and 5B and FIGS. 9A and 9B.

Figure 8B:
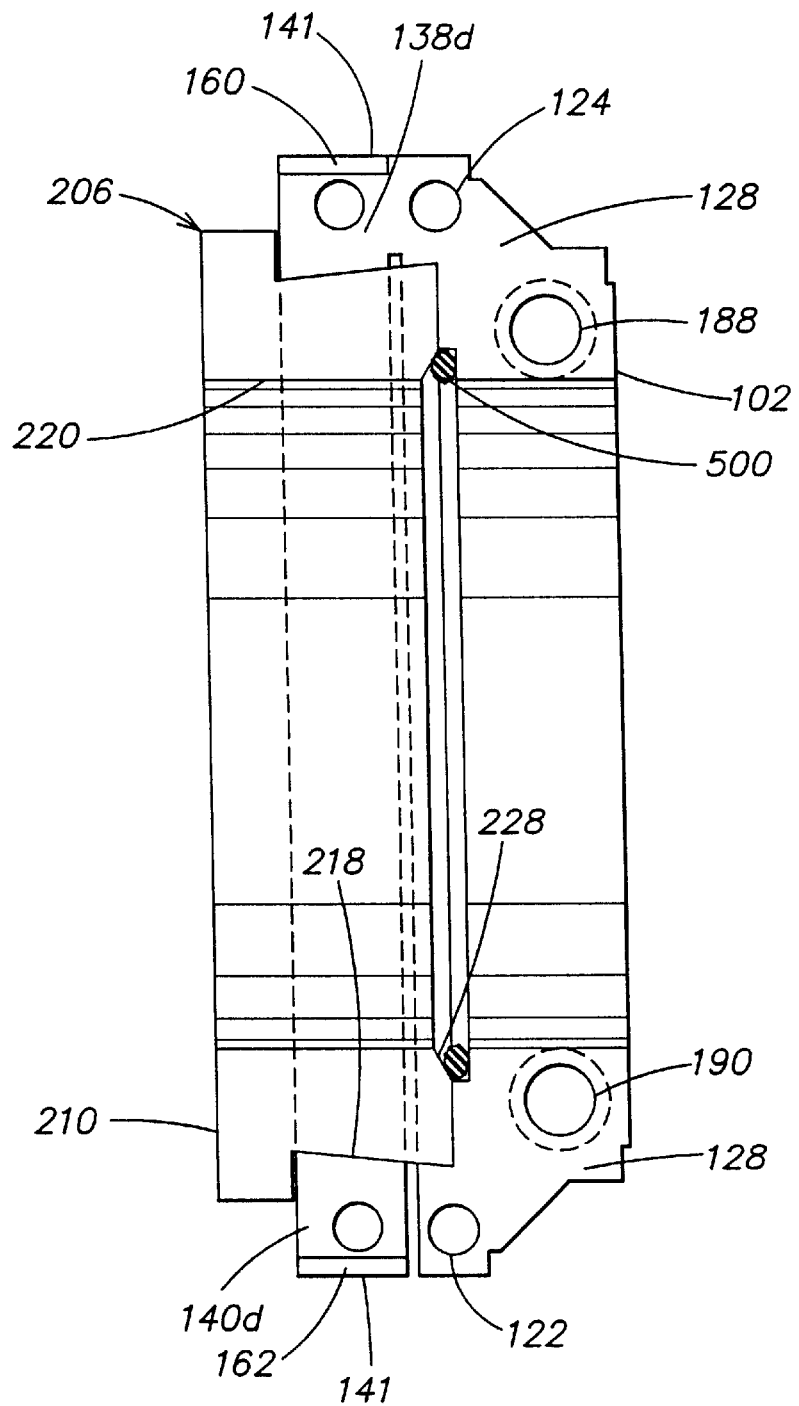

The cylindrically-shaped band 136 terminates in first and second flanged sections 138, 140 normal to the shaft 20. The conically-shaped band, if employed, would also terminate in first and second flanged sections 138d, 140d as shown in FIG. 8B. Each second flanged section 140 may have a lip 162, protruding from an outer edge 141. Each first flanged section 138 may have a complementary notch 160. Screws or other fastening devices (not shown) are used to tighten the bands around the seal face substantially evenly and equally which thereby rigidly attaches each seal face segment to a respective holder half, at least upon installation of the seal about a shaft, if not before. When the bands are tightened, lips 162 fit into notches 160 providing an interlock. This interlocking of the bands may help to reduce the likelihood that the bands will twist and drive inward towards the face possibly knocking it out of alignment. The interlock also reduces vibration and loosening of the screws. Of course, such an interlocking arrangement need not be employed.

Each band 136 may be attached to each rotary holder half 102, 104, respectively, proximate one of the rotary holder mating surfaces 128 or may be otherwise unattached. In a further embodiment of the invention, the band 136 may be integrally formed with each rotary holder half 102, 104, or in an alternative embodiment of the invention as shown in FIG. 18, may be attached using a suitable attachment device, known in the art, including, but not limited to, adhesives, screws, pins, detents, tongue-and-groove structures, and notches. In one embodiment of the invention, the band 136 may be rigidly attached to the rotary holder half 102, 104.

Figure 15A:
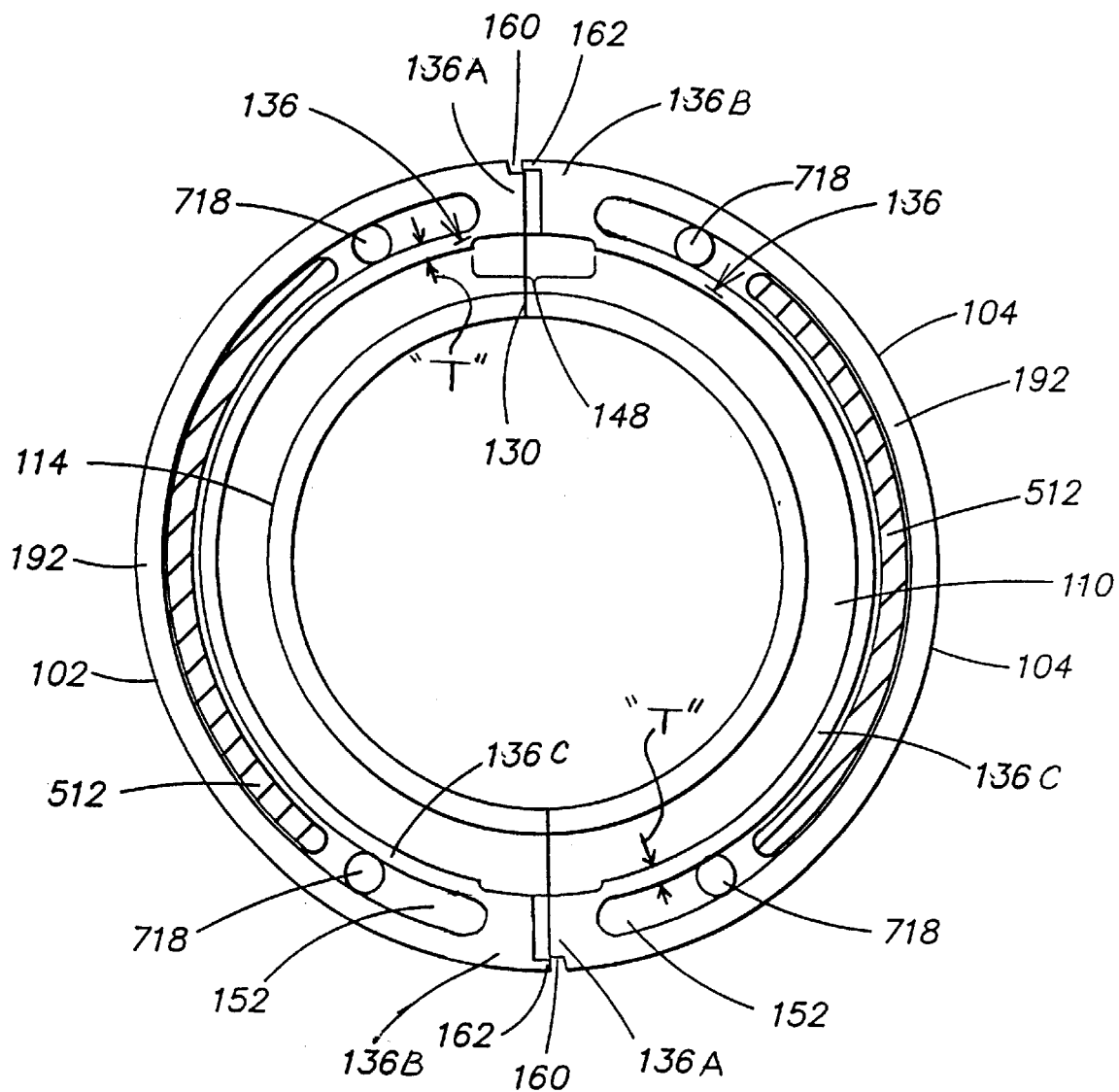
FIG. 15A is a top view of a seal component, showing an alternative embodiment of the integral bands that clamp around the seal surface.

In one embodiment, the band 136 may be attached to the holder half proximate an end of the holder half. The remainder of the band is free to move relative to the holder half, in a cantilevered manner inwardly toward the shaft when the holder is attached about the shaft. In an alternative embodiment as shown in FIG. 15A, the band may be attached at both ends 136A, 136B on the holder half 102, 104 such that the center section 136C extending between two ends 136A, 136B is free from the holder half. In addition, although not required, the band may also be attached to the holder half along the center section 136C. Of course, the bands may be attached in any suitable manner including attaching the band using adhesives, screws, pins, detents, tongue-and-groove structures and notches. In one embodiment, the band may be attached to the holder at one end, at both ends, and/or at the center section by integrally forming the band with the holder.

In one embodiment, the band may also have a thickness "T" that is suitable for holding the seal face with sufficient force to conform to the seal faces without deforming the seal face. The thickness of the band may be dependent upon a number of variables including the pressure and temperature of the operating conditions under which the split seal operates, the size of the shaft upon which the seal is mounted, the materials used in the design of the split seal, namely the material of the holder as well as the material of the band itself, and the width of the band. In one example, for a shaft size ranging between 1.437 inches to 2.625 inches the thickness of the band is about 0.060 inches. In another example, for a shaft size ranging between about 2.626 inches to about 5.250 inches, the band thickness is about 0.090 inches.

It may be desirable to allow the seal face 200 to self-align with the stationary seal 400. This may be accomplished by allowing the seal face to free-float within the holder half 102, 104, as shown, for example, in FIG. 17.

Figure 17A:
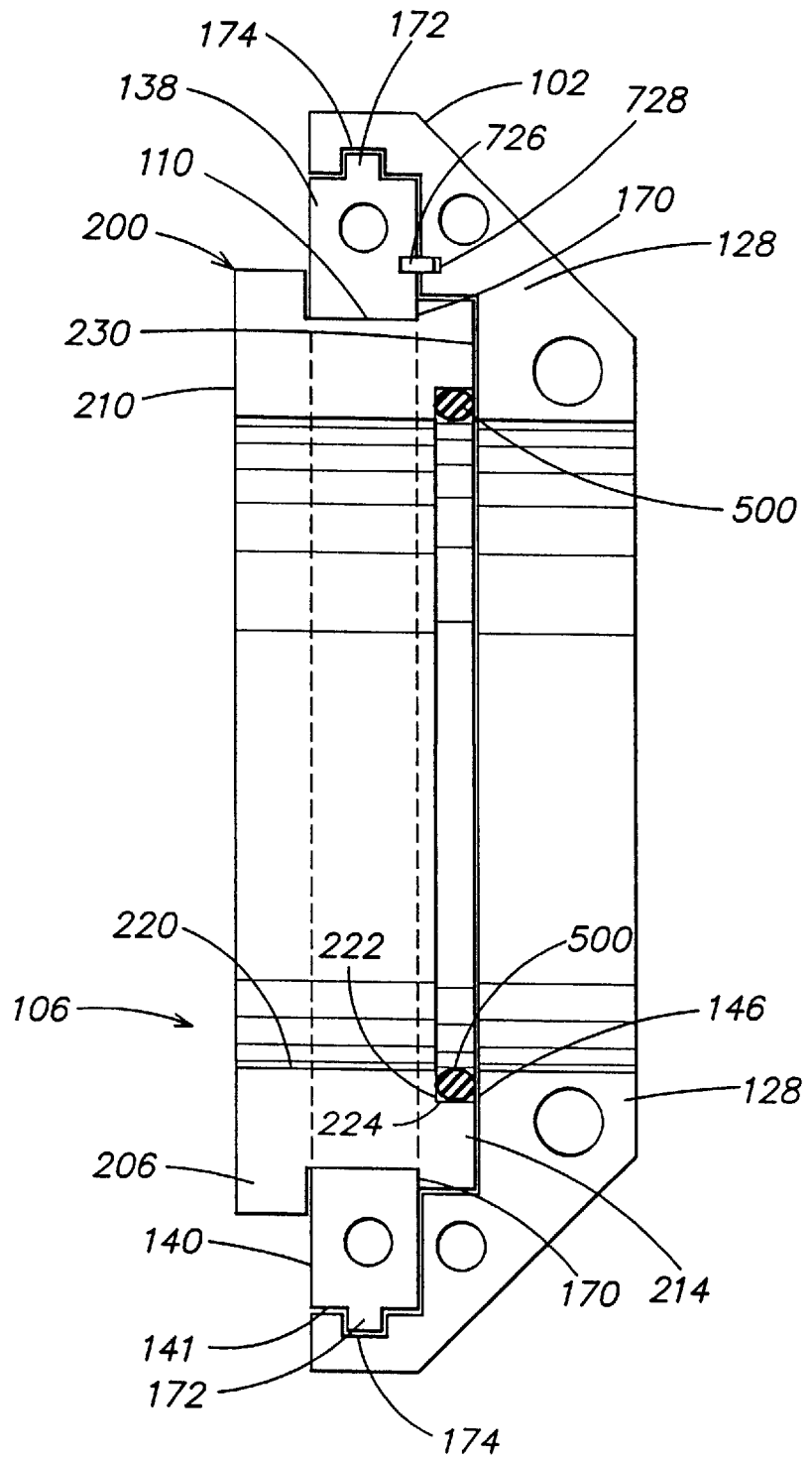
FIGS. 17A and 17B are side views of a rotary the invention component half according to further embodiments of the invention wherein a portion of the band is disposed in a groove in the rotary holder half.
Figure 17B:
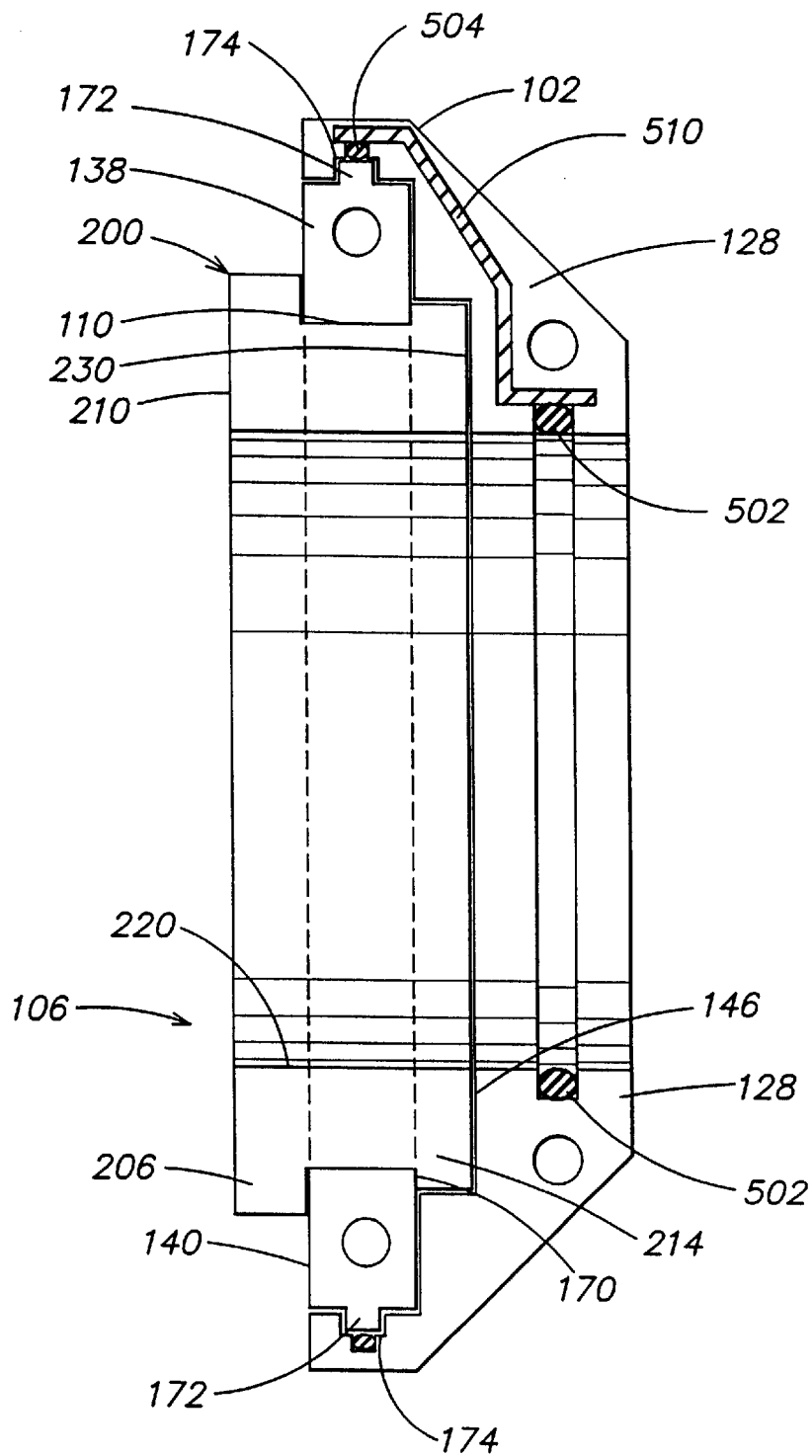

In one embodiment, the seal face segment 206 is rigidly attached to the band 136, which in turn is flexibly mounted in the holder half 102, 104. In a further embodiment, the integral band 136 may be removably attached to the rotary holder half 102, 104. In one embodiment, the band 136 and the corresponding mounting surface, the rotary holder half 102, 104, may be shaped and formed to create a tongue-and-groove structure as shown in FIGS. 17A and 17B. The tongue 172 may be attached or integrally formed on the outer edge of the band wall (not shown) and/or on the outer edge 141 of the band flanges 138, 140. The tongue 172 may then mount into a corresponding groove 174 in the holder 102, 104. Alternatively, the tongue 172 may be attached or integrally formed on the holder halves 102, 104, which may then mount into a corresponding groove 174 in the band 136. Those skilled in the art will recognize that the groove 174 may not completely surround the tongue 170, and may only provide an abutment surface. The tongue-and-groove structure may extend substantially along the entire diameter of band 136 and the rotary holder half 102, 104 in an arcuate manner. In an alternative embodiment, multiple tongue-and-groove structures, such as pins and mating receptacles, may be formed rather than a single tongue-and-groove structure.

To drive the flexibly mounted band 136 and seal face segments 206 around the shaft 20 during operation, at least one axially extending anti-rotation pin 726 may be mounted on the back edge 170 of the band 136 or the radial surface 230 seal face segment 206, as shown in FIGS. 17A and 17B. Alternatively, the pin 726 may be disposed between the face and the holder. The rotary halves 102, 104 may have corresponding anti-rotation pin holes. During installation, the seal face 200 is placed around the shaft 20 and then surrounded by the band 136. The band 136 may secured with fasteners (not shown). The holder half 102, 104 may then be placed around the band 136 and the seal face 200, radially aligning the anti-rotation pins 726 and pin holes 728 while also mating the tongue-and-groove structure on the band 136 and the holder halves 102, 104. Those skilled in the art will recognize that anti-rotation pins 726 may be placed on the rotary holder hales and the anti-rotation pin holes may be correspondingly placed on the seal face segment 206.

The tongue-and-groove structure may rigidly mount the band 136 to the rotary holder halves 102, 104. Alternatively, the tongue-and-groove structure may be shaped and formed to provide some movement of the band within the rigid holder of the tongue-and-groove structure. Although the band 136 may be moveable within the tongue-and-groove structure, the band 136 will tend to center as the rotating shaft 20 gains its operational rotation speed.

Furthermore, those skilled in the art will recognize that many attachment and mounting methods are suitable for rigidly or flexibly mounting band 136 to the rotary holder half 102, 104, as well as recognize that any attachment structure may be formed either on the band 136 on the rotary holder half 102, 104, or both attachment surfaces.

One or more elastomeric strips or o-ring segments 512 may be inserted into each rotary holder half 102, 104, coaxial and outer to the outer axial wall 118 in an arcuate slot 152. The o-ring segments 512 may be stacked axially, one upon another within the slots 152. The o-ring segments 512 assist in assembly of the two halves 102, 104. The o-ring segments 512 press against the outer axial wall 118 which forces the face segment 206 into a semi-circular shape and reduces the likelihood of the seal face segment sliding within the channel 112. When the two holder halves 102, 104 are brought together, because each face segment 206 is held in a semi-circular shape, the halves connect easily. The elastomeric strips or o-ring segments 512 also contribute to the concentricity of the seal face 200 by pressing against the outer axial wall 118 as illustrated in FIG. 7. The elastomeric strips or o-ring segments 512 may also provide vibration dampening.

Figure 36:
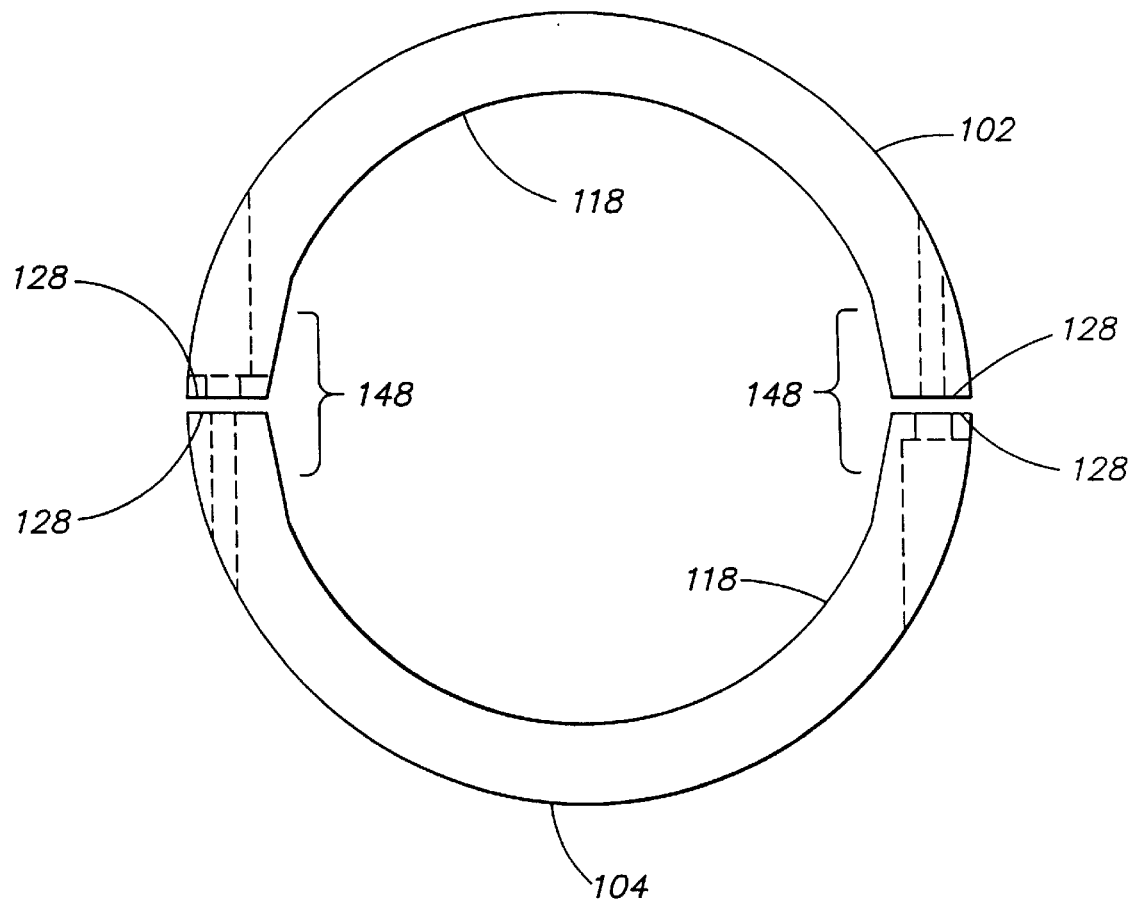
FIG. 36 shows an alternative embodiment of the face seal.

Although the embodiments described above include a band, other embodiments as shown, for example in FIG. 36, do not employ a band. Rather, the rotary holder halves may be formed as a rigid block.

As shown in FIGS. 1A and 1B, the counterbore 110 in each rotary half 102, 104 is bounded by the outer axial wall 118 of each rotary holder half 102, 104 and which supports and aligns the rotary seal face segments 206. The rotary holder halves 102, 104 may also include an inner axial wall 114, forming an inner wall or channel 112 to additionally support and align to the rotary seal face segments 206.

High stress areas may occur on the seal face due to distortion of a rigidly mounted seal face as the holder half and/or gland are tightened around the seal face, which is then tightened against the shaft. As the holder halves are tightened during installation, opposing surfaces may create localized stresses, which may result in a distortion of the seal face. Also, if a band is used to secure around the seal face, it may bend inward toward the outer axial wall of the seal face segment and cause distortion of the primary sealing surface.

To compensate for such high stress areas, the area providing stress relief 148, 150 between the rotary holder axial walls and the seal face segment axial walls may be located proximate to the first and second mating surfaces 128 of the rotary holder halves 102, 104 as shown in FIGS. 7 and 15 or in selected areas around the diameter of the walls as shown in FIGS. 21–25. The area of stress relief may be provided on the outer axial wall 118, the inner axial wall 114, or both walls of the rotary holder halves 102, 104 as shown in FIGS. 7 and 15. Those skilled in the art will recognize that the stress relief may also be provided on either the outer axial wall 218, the inner axial wall 220, or both walls of the seal face segment 206. The stress relief areas on the seal face segment 206 may be provided as an alternative to providing a stress relief area on the holder halves 102, 104 or, may be provided in addition to stress relief areas provided on the stationary holder halves 102, 104. The band may in addition or in the alternative be shaped to provide stress relief.

In one embodiment, as shown in FIGS. 7 and 15, at least one area of stress relief 148 may be proximate to the first and second mating surfaces 128 of the outer axial wall 118 of the rotary holder halves 102, 104. The inner axial wall 114 (if one is present) may also have a stress-relieved region 150. The areas 148, 150, as shown in FIG. 15, may also provide an added advantage of facilitating easy insertion of the seal face segment 206 into rotary holder halves 102, 104 in addition to relieving stress between the contact surfaces of the seal segment 206 and the holder halves 102, 104.

In addition, to reduce or eliminate the localized stresses, one of the opposing surfaces, the outer axial wall 118 or the inner axial wall 114 of the rotary holder halves whether the rotary holder halves or the stationary holder halves, or the inner axial wall 220 or the outer axial wall 218 of the rotary seal face segment 206, may be shaped and formed to relieve stress between the holder halves 102, 104 and the seal face segment 206.

The axial wall may be shaped and formed to provide at least one area of reduced thickness, e.g., to provide a stress relieved area between the opposing surfaces of the holder halves 102, 104 and the seal face segment 206. The reduced thickness of the wall of the seal face segment 206 may be located on the outer axial wall 218 of the seal face segment 206, on the inner axial wall 220 of the seal face segment 206, on the outer axial wall 118 of the rotary holder halves 102, 104, on the inner axial wall 114 of the rotary holder halves 102, 104, or any combination of the aforementioned walls.

Figure 22B:
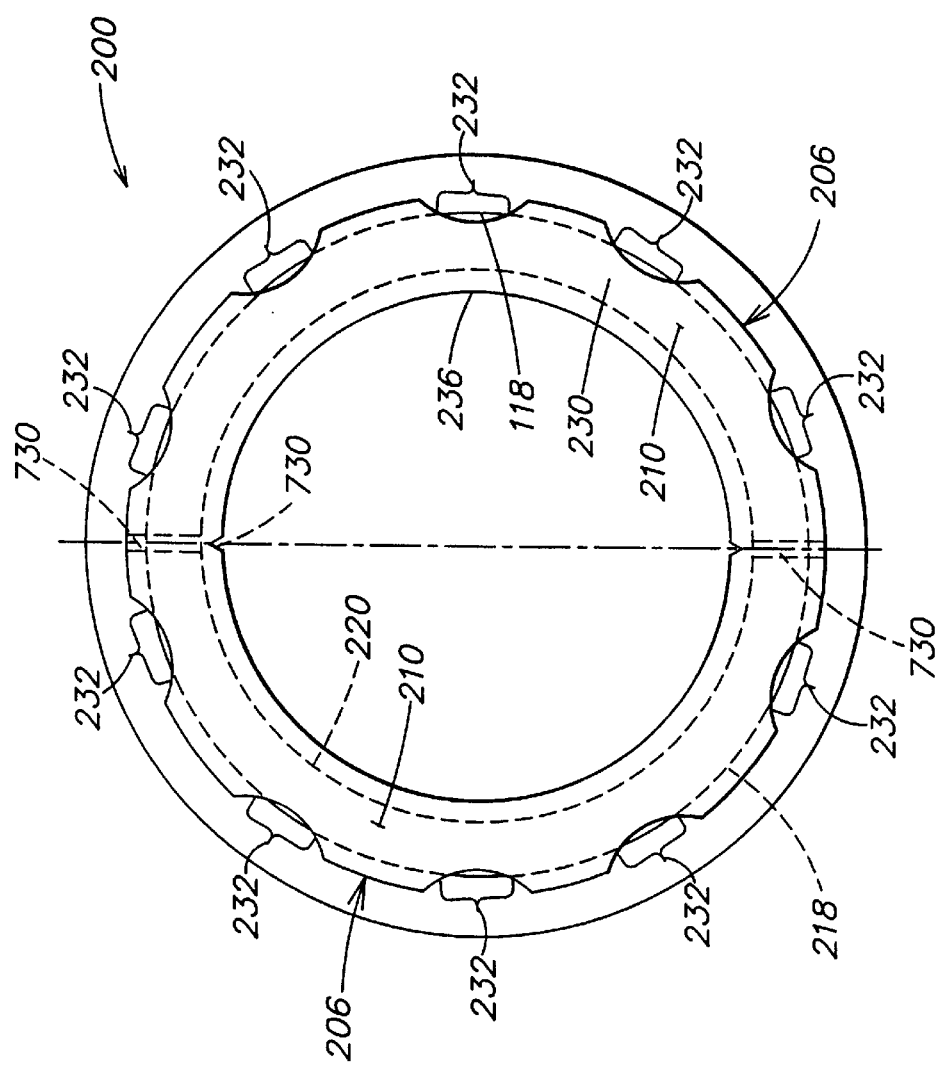
FIG. 22B is a top view of a pair of seal faces of FIG. 22A.
Figure 22A:
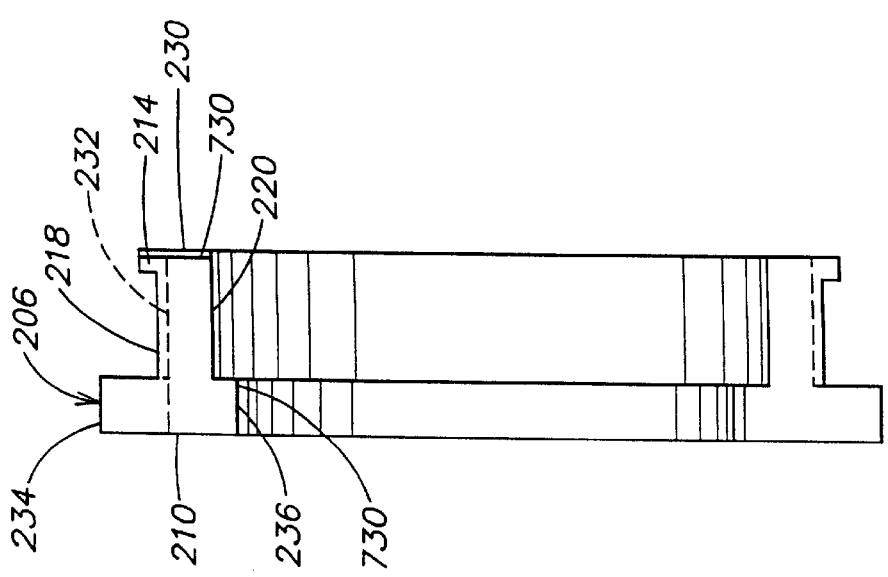
FIG. 22A is a side view of a seal face wherein the outer diameter is relieved.
Figure 23B:
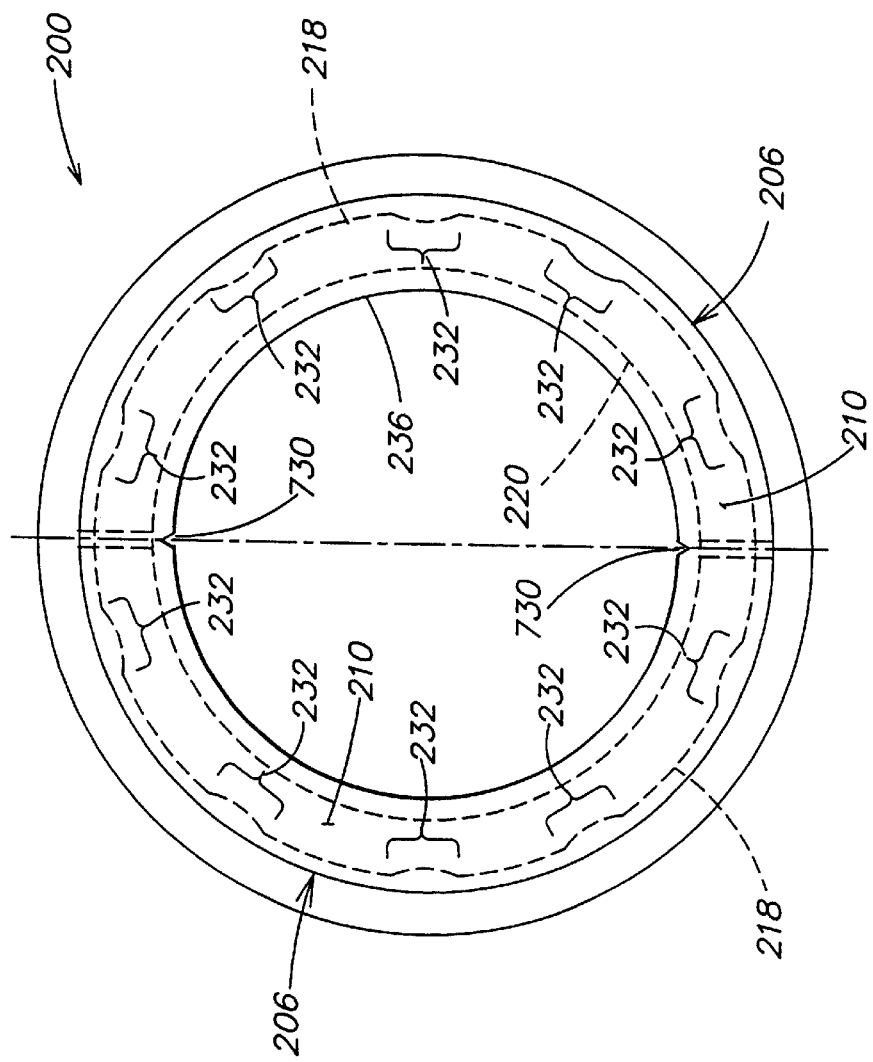
FIGS. 23A and 23B are alternative embodiments of the seal faces of FIGS. 22A and 22B, respectively.
Figure 23A:
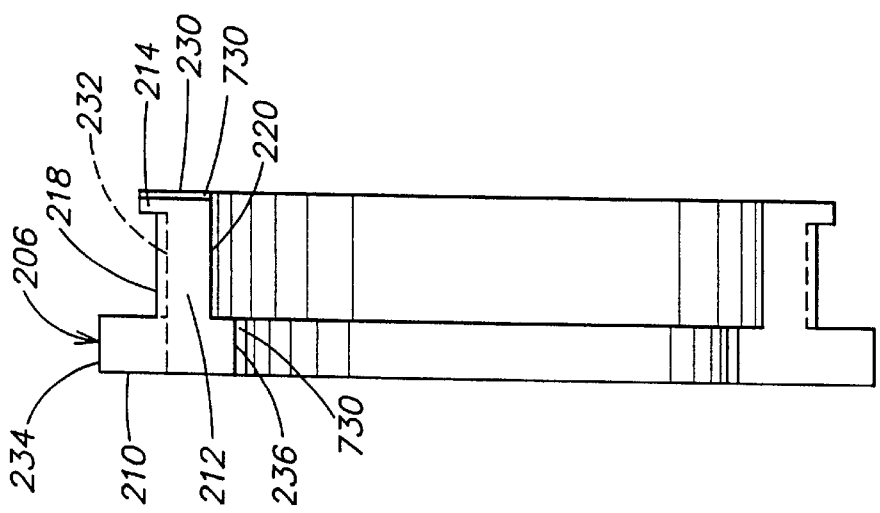

In a further embodiment of the invention as shown in FIGS. 23A and 23B, an area of reduced thickness of the wall of the seal face segment 206 may not affect the width of the actual seal face 210, and may only affect the thickness of the seal face section 212 axial walls. Thus, the primary sealing surface 210 thickness may be substantially equal around the seal face 206 diameter while the seal face section 212 provides at least one area of stress relief. Of course, the outer axial wall 234 or the inner axial wall 236 of the face may be stress relieved, and in a further embodiment as shown in FIG. 22A and 22B, the outer axial wall 234 may be stress relieved in combination with a stress relieved outer axial wall 118.

Figure 24:
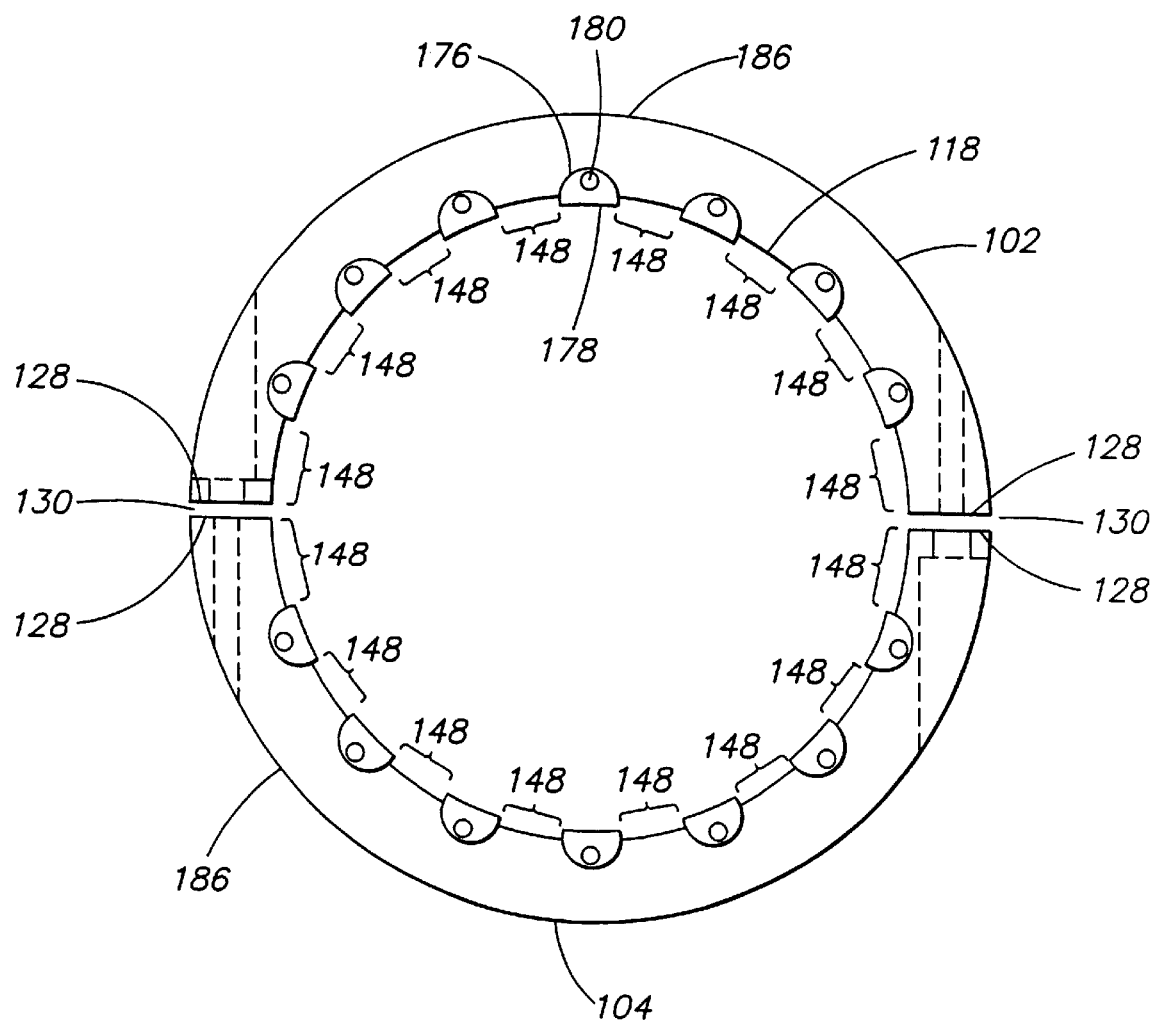
FIG. 24 is a top view of a pair of holders according to another embodiment of the invention.

In an alternative embodiment of the invention as shown in FIG. 24, the area of stress relief may be provided by mounting at least one cam 176 on an axial wall of the holder halves 102, 104 or on the axial wall of the seal face segment 206. The end 178 of the cam 176 extends radially beyond the axial wall to create an area of increased thickness, thus, creating an area of reduced stress on the axial wall where no cam 176 is mounted. A plurality of cams 176 may be mounted to the axial wall to create an even loading over the whole diameter of the axial wall. The cam 176 may be attached to the axial wall with a pin 180, or any suitable attachment device known in the art. In one embodiment, the cams 176 may be rotatably mounted to the axial wall of the holder half 102, 104 allowing the cams 176 to conform to the opposing face of the axial wall of the seal face segment 206, or alternatively, the cams 176 may be rotatably mounted to the axial wall of the seal face segment 206 allowing the cams 176 to conform to the opposing face of the axial wall of the holder half 102, 104.

Figure 25:
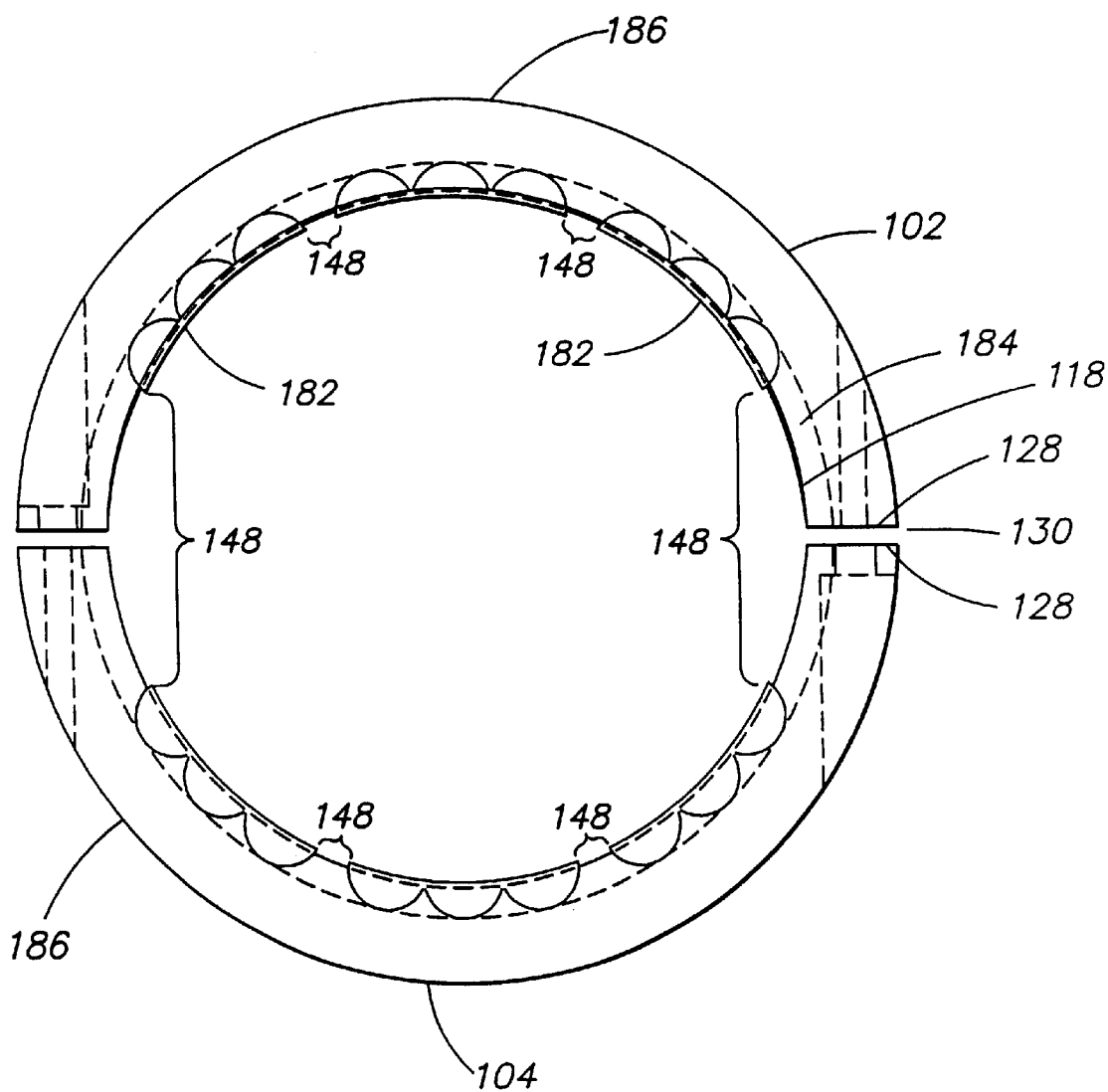
FIG. 25 is a top view of a pair of holders according to yet another embodiment of the invention.

Similarly as shown in FIG. 25, the area of stress relief may be formed by mounting at least one flexible mounting device 182 on an axial wall of the holder halves 102, 104 or on an axial wall of the seal face segment 206. Flexible mounting device 182 may be inserted into a groove 184 in the axial wall and mounted using methods well-known in the art. The flexible mounting points 182 may be fixably attached or removably mounted to the axial wall. The flexible mounting points may be formed of any suitable material.

In an alternative embodiment of the invention, the stress on the seal face 206 due to the tightening of the holder halves 102, 104 around the shaft 20 may be relieved with a stress relief 144 placed between the holder fasteners 190 and the seal face segment 206. In a further embodiment of the invention as shown in FIG. 3, a relief cut may be formed in the holder halves 102, 104 in the radial direction. Thus, as the holder halves 102, 104 are tightened to the shaft 20 and possibly biased towards the shaft, the seal face alignment may remain undisturbed as the distorting force is absorbed by the relief cut 144, rather than the seal face segments 206.

As noted above, the high stress areas occur on the seal face 210 due to distortion of the a rigidly mounted seal face as the holder half 102, 104 and/or gland are tightened around the seal face which is then tightened against the shaft 20. In one embodiment, the seal face 200 may be constructed to compensate for any existing distortion due to stress points between the seal face segment 206 and the holder half 102, 104, rather than as noted above, modifying the holder half 102, 104 or the seal face segment 206 to avoid any stress which may cause distortion of the seal face 210.

In one embodiment as shown in FIGS. 37–38, the holder half 102, 104 may be shaped and formed to have a smaller outer axial wall 118 diameter than the diameter of the outer axial wall 218 of the seal face 200. The holder half 102, 104 may then be heated, causing expansion of the metal construction of the holder half 102, 104 and allowing the seal face 200 to be press fit into the heated holder half 102, 104. The seal face segments 206 may have a taper on the rear outer axial wall 218 to facilitate press fitting into the holder halves 102, 104. As the holder half 102, 104 is allowed to cool, the material of the holder half 102, 104 then contracts and rigidly holds the seal face 200 as well as creates stress on the seal face 200 causing distortion of the primary sealing surface 210.

The seal face 200 may be circular or split into seal face segments 206 before it is press fit into the holder halves 102, 104. In one embodiment of the invention, the unbroken seal face 200 may then be press fit into a pre-assembled holder 102, 104. After the holder halves 102, 104 have cooled and applied distorting pressure to the seal face 200, the holder half 102, 104 fasteners (not shown) are removed. The face 200 may then be cleanly split using various methods including, but not limited to, applying a force to the inside axial wall 220 in equally opposing directions 90 degrees from the desired rotary face splits 202. In one embodiment of the invention, a relief 730, shown in FIG. 22B, may be formed in the radial surface 230 of the seal face 200 to facilitate a clean split in the proper location. The face 200 and holder halves 102, 104 are then forced apart and each holder 102, 104 and seal face segment 206 remains together so when assembled back together the face segments 206 are aligned perfectly due to the grain of the split surface 204 and the close tolerance of the aligning pins 122 and aligning holes 124 in the holder halves 102, 104.

Alternatively, the seal face 200 may be split into the seal face segments 206 before being press fit into the heated holder halves 102, 104. To press fit the seal segments 206, the face halves are matched up and put together so it is effectively one "whole" seal face 200. The seal face 200 is then inserted into the pre-assembled and pre-heated holder 102, 104. With the holder 102, 104 resting on a flat plate, the face 200 may be pressed in using a device (not shown) that is substantially flat. The pressure device pushes against the primary sealing surfaces 210 of the seal face 200 and does not cause the seal face segments 206 to become misaligned. When the holder halves 102, 104 cool, they remain assembled with the seal face segments 206 pressed in allowing the primary sealing surface 210 to be lapped to relieve any distortion that may have been caused by pressing the face in. When the holder 102, 104 are disassembled, the seal face segments 206 remain in their respective holder 102, 104 halves and suitably align when reassembled.

Although press fit of the seal 200 into the holder halves 102, 104 is shown in FIG. 38 with respect to a cartridge seal assembly 10 design with a sleeve 198, the present invention is not limited in this respect and may be used in association with any of the seal face constructions, such as component, cartridge, unitized, or semi-unitized, discussed and/or shown in the figures.

Those skilled in the art will recognize that the seal face 200 may also be placed in the holder half 102, 104 before installation onto the equipment 700, and then the holder halves 102, 104 may be tightened so as to create a metal to metal contact between the holder half 102, 104. However, the primary sealing surface 210 may then be lapped to create an undistorted seal face 210 to compensate for any distortion created by the contraction of the holder half 102, 104. Some minimal distortion of the seal face 210 may still occur during and after assembly as the seal assembly 10 is attached to the shaft 20 and a force of the attachment devices may place some distorting stress on the seal face 210. Thus, the lapping of the seal face 200 in the holder halves 102, 104 may merely reduce the effect of stresses caused by the glands 370 and the shaft 20.

Figure 39:
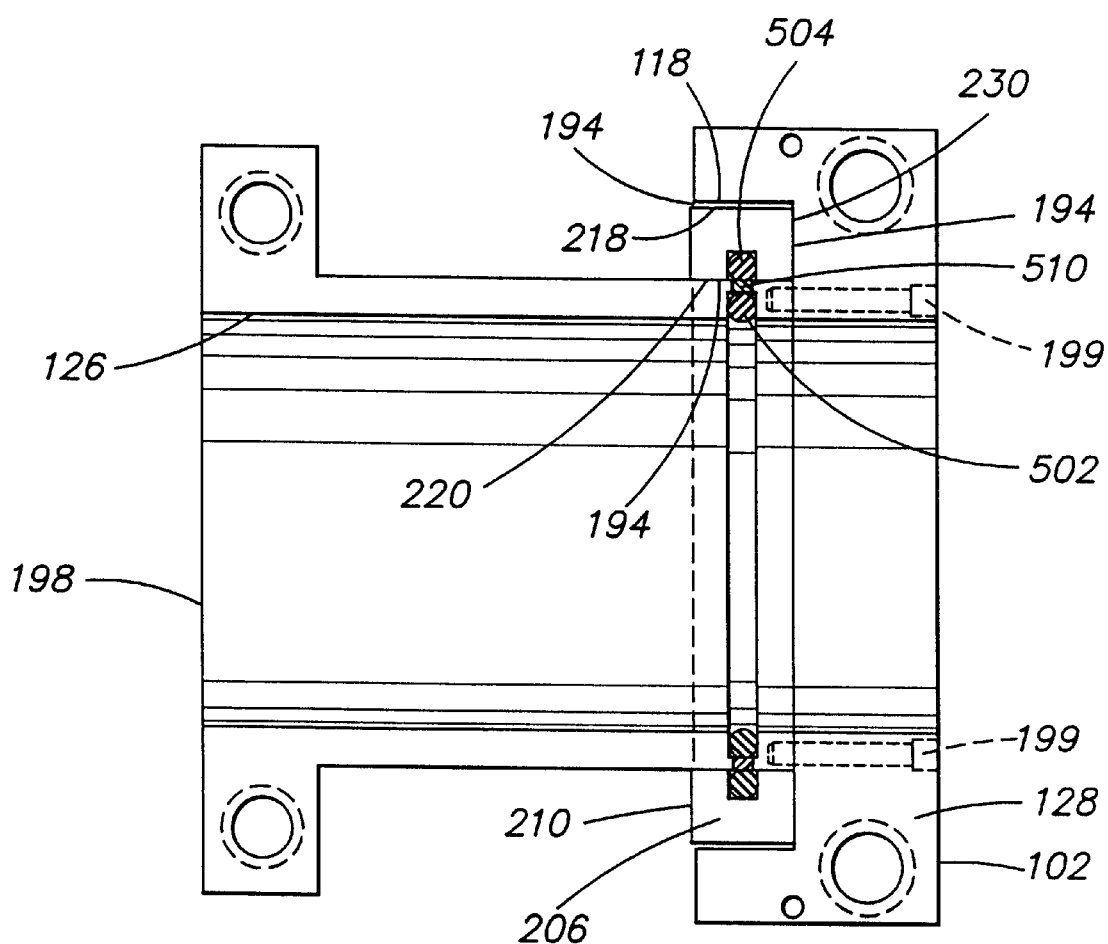
FIGS. 39–40 are alternative embodiments of FIGS. 37–38.
Figure 40:
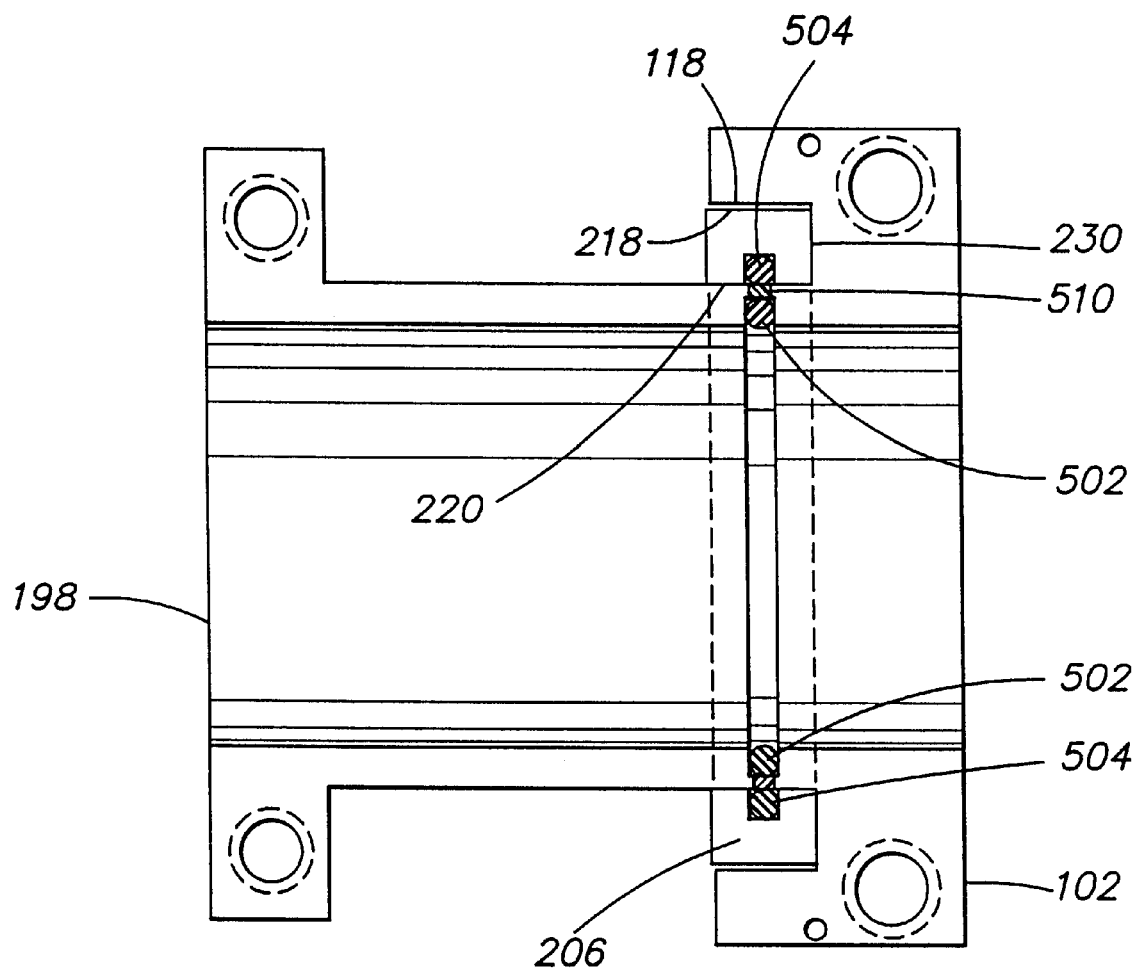
Figure 41:
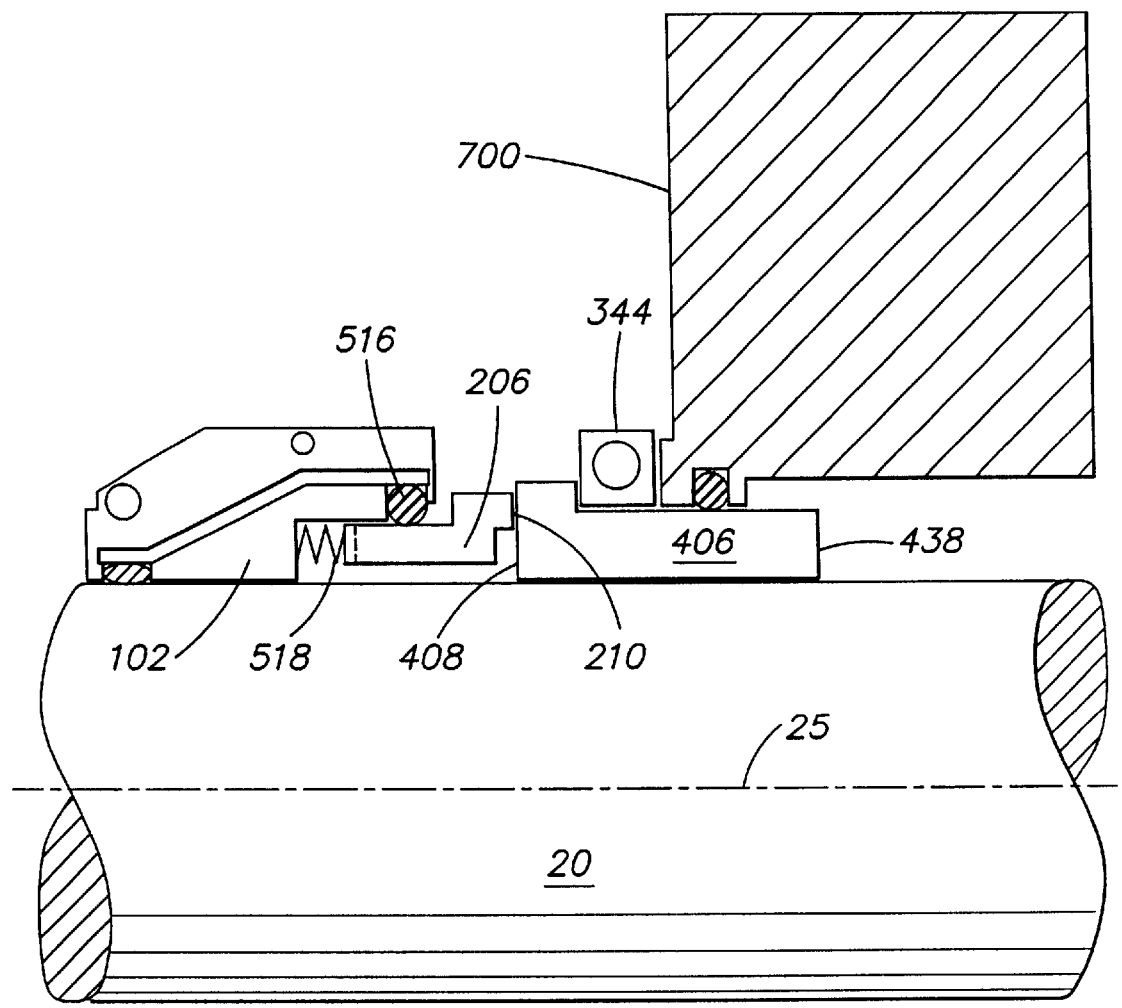
FIG. 41 is an alternative embodiment of the mechanical split seal wherein a portion of the seal is formed integral with the equipment to be sealed.

In an alternative embodiment as shown in FIGS. 39–40, the seal face 200 may be fixably mounted to the holder half 102, 104 with an adhesive that is sufficiently rigid to turn the seal face 200 with the shaft 20 and the holder 102, 104 during operation, however, the adhesive is more compressive than the surrounding material of the holder half 102, 104 and therefore absorbs any external forces placed on the seal assembly 10 before allowing distortion of the seal face 200. In one embodiment, seal face 200 may be shaped and formed to have a close fit with the holder half 102, 104, however, gaps 194 substantially within the range of 0.001 inches to 1 inch or more may be formed between the outer axial wall 218 of the seal face 206 and the outer axial wall 118 of the rotary holder half 102, 104. The gap 194 may then be filled with the adhesive, including, but not limited to, epoxy resins. Thus, any clamping forces are transferred from the holder 102, 104 to the epoxy and compress the epoxy rather than distort the seal face segments 206. Those skilled in the art will recognize that the adhesive may seal the seal face 206 with a sleeve 198 rather than the holder 102, 104.

The seal face 200 may be inserted into the holder 102, 104 or onto the sleeve 198 before it is broken into two segments 206. The adhesive can be placed on the seal face 200, the sleeve 198, or holder half 102, 104 at the desired location. The unbroken seal face 200 may then be placed into a preassembled holder 102, 104 or a sleeve 198. After the adhesive hardens, the face 200 may then be cleanly split using methods including, but not limited to, a force applied to the inside axial wall 220 in equally opposing directions 90 degrees from the desired rotary face splits 202. In one embodiment, a relief 730, shown in FIG. 22B, may be formed in the radial surface 230 of the seal face 200 to facilitate a clean split in the proper location. The face 200 and holder halves 102, 104 are then forced apart and each holder 102, 104 and seal face segment 206 remains together so when assembled back together the face segments 206 are suitably aligned due to the grain of the split surface 204 and the close tolerance of the aligning pins 122 and aligning holes 124 in the holder halves 102, 104.

Alternatively, the seal face 200 may be split before inserting the seal face 200 into the holder 102, 104 or sleeve 198. Seal face segments 206 may be matched up and put together as effectively one "whole" face 200. The adhesive may be placed on the seal face segments 206, the sleeve, or the holder 102, 104 at the desired location. The seal face segments 206 may then be inserted into a pre-assembled holder 102, 104 or sleeve 198 while holding the seal face segments 206 together. The face segments 206 may be manually held together by the installer or by some other mean including, but not limited to, removable containing bands such as a rubber band or clamp. The seal face segment 206 may include a taper on the rear outer axial wall 218 to facilitate installation.

In a further embodiment, the seal face may have an o-ring 504 on the inner diameter, the outer diameter, or the back surface. As shown in FIGS. 38–41, the inner axial wall 114 of the holder 102, 104 or sleeve 198 may be machined to a diameter that provides the correct amount of compression on the o-ring 504 when the seal face 206 is pressed fit into or adhered to the holder 102, 104 or sleeve 198.

The adhesive may be placed in the inner axial wall of the seal face 220, the outer axial wall 218 of the seal face 200, the radial surface 230 between the inner axial wall 220 and the outer axial wall 218 of the seal face 200, the inner axial wall 114 of the holder 102, 104 or sleeve 198, the outer axial wall of the holder 102, 104 or sleeve 198, the radial surface 116 between the inner axial wall 114 and the outer axial wall 118 of the holder 102, 104 or the sleeve 198, or any combination of the above-mentioned surfaces. Preferably, the adhesive has an expansion rate close to that of the material used to form the holder 102, 104 or sleeve 198 such that the adhesive does not break away from the holder or put excess pressure on the seal face 200. The holder 102, 104 and/or sleeve 198 may incorporate a channel gasket 510 between the halves as shown in FIG. 38. This design may keep the process fluid from contacting the adhesive, which may otherwise break down the adhesive.

A rotary seal component may have any one of the seal face geometries discussed or shown in the figures, with a suitable o-ring with or without a channel gasket on the parting line, in conjunction with a rotary holder that may or may not have an inner axial wall. A band, either conically or cylindrically shaped, may be used to clamp the seal face segments together and position them concentric with the shaft. The band may hold the seal face rigidly or flexibly. The band may be used in conjunction with a seal face having a nose or without a nose. The nose may be placed at various axial positions along the seal face section and may be attached on either the inner or outer axial wall. The nose may bear against or be placed in a recess in the outer wall of the holder, the back edge of the integral band, or the inner axial wall of the holder. The rotary holder or seal face segment may have stress-relieved axial walls. Vibration damping strips may be included in slots in the rotary holder halves. Thus, the possible configurations produced by combining the various features described are numerous and the present invention is not limited to any specific configuration. The embodiments described above are merely exemplary.

The rotary seal component 106, 108 may be in the form of a kit. Such a kit may include at least two rotary seal face segments 206, two rotary holder halves 102, 104, or two sleeve halves and at least one split o-ring. The seal face segments, rotary holder halves, and split o-ring may have any combination of the configurations discussed above. The rotary seal component kit may be utilized in a conventional mechanical split seal or in conjunction with the stationary gland discussed below.

Each stationary holder half 310, 312 may be mounted within two gland halves 370 and may be integrally formed with the glands 370. Each stationary holder half 310, 312 may contain a stationary seal face segment 406 resiliently mounted in a counterbore 322 as shown in FIGS. 1A and 1B. A split o-ring 506 may be mounted in an arcuate groove 324 in the counterbore 322 and may reduce the likelihood that the stationary seal face 400 will be axially withdrawn from the counterbore 322. The stationary seal face 400 may have a circumferential ridge 410 with a larger diameter than the inner periphery 507 of the split o-ring 506 in its uncompressed state. If an axial force is applied to withdraw the stationary seal face 400 from the holder half 310, 312, the ridge 410 contacts the o-ring 506 which forms a stop, tending to restrain the seal face 400 in the counterbore 322. The split o-ring 506 also seals between the stationary seal face 400 and the holder halves 310, 312 and presses radially inwardly against the stationary seal face 400, helping to position the face 400 concentric with the shaft 20.

Each holder half 310, 312 may include an inner axial wall 328. The inner axial wall 328 helps align the stationary seal face segments 406 normal to the shaft 20 during assembly and installation. The inner axial wall 328 in conjunction with the ridge 410 and split o-ring 506, also retains the stationary seal face segments 406 in the holder halves 310, 312. The ridge 410 may be tapered to facilitate easy axial insertion of the ridge 410 past the inner periphery 507 of the split o-ring 506. The stationary component 40, thus, may comprise only two stationary component halves 306, 308 with no loose parts, except for fasteners. The ridge 410 may aid in axially aligning the face.

A resilient support may push the stationary primary sealing surface 408 away from the holder halves toward the rotary primary sealing surfaces 210. Such a resilient support may constitute compression springs 514 retained in the counterbore 322 by the seal face 400. Wave springs, canted coils, leaf springs and bands or resilient materials, such as elastomers, also may be used. If the counterbore has an inner axial wall 328, the wall 328 reduces the likelihood of the resilient support being dislodged.

For ease of assembly and for alignment, one of the mating surfaces 318 of one of the stationary holder halves 310 may have an aligning pin 330 that mates with a corresponding aligning hole 320 on one of the mating surfaces 318 of the other stationary holder half 312. Gland bolts or other fasteners (not shown) connect the holder halves 310, 312 sealing the mating surfaces 318 together.

Figure 11A:
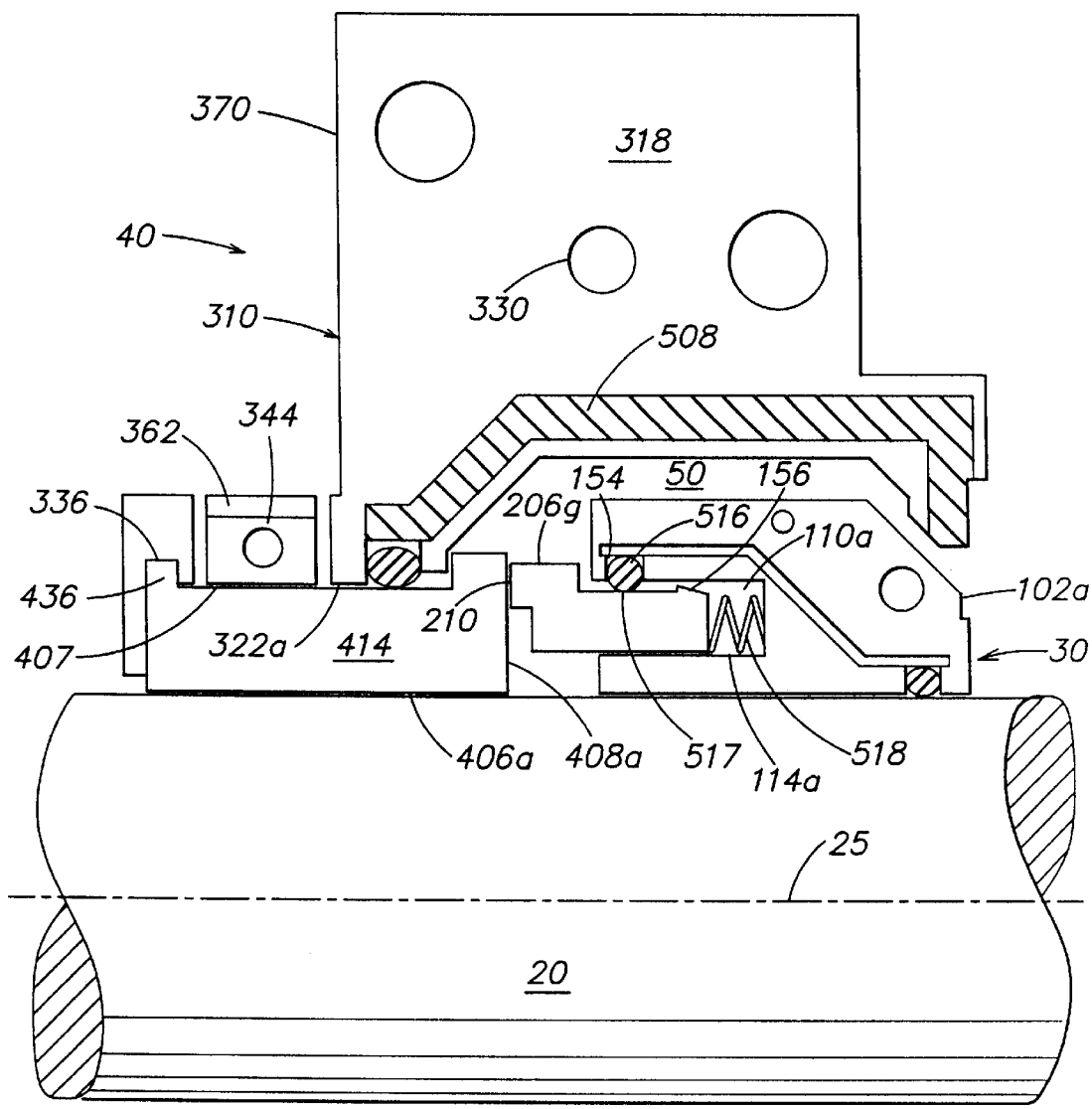
FIGS. 11A and 11B are side views of alternative embodiment of the invention showing a mechanical split seal assembly in which the stationary seal face is seated rigidly and the rotary seal face is mounted resiliently.
Figure 11B:
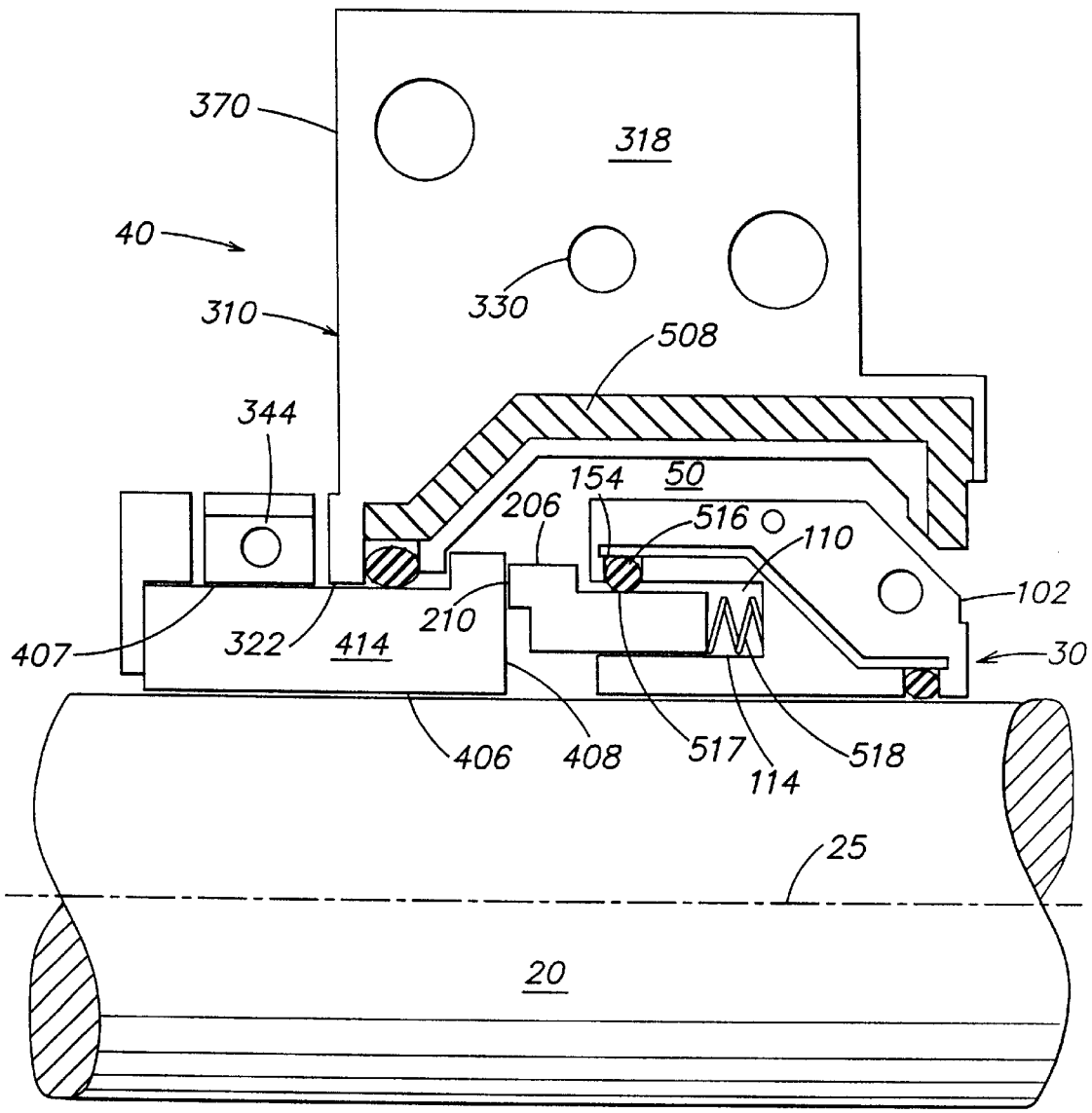

Alternatively, the stationary face segments 406a may be held rigidly and the rotary seal face segments 206g may be mounted resiliently. It should be appreciated that any of the structures for the rigidly held rotary seal face 206 and rotary holder halves 102, 104 described above may be suitable for the stationary rigidly held seal face segments 406 and stationary halves 310, 312. As shown in FIGS. 11A and 11B, the stationary face segments 406a are held rigidly in a counterbore 322a. The stationary holder halves 310, 312 may have an inner axial wall 328a so that a channel 326a is formed in which the stationary face segment 406b is seated, as shown in FIG. 12. The stationary seal face segments 406b may be slid radially into the channel 326a. In another configuration, the holder halves 310, 312 may not have an inner axial wall as shown in FIGS. 11 and 13.

Figure 12A:
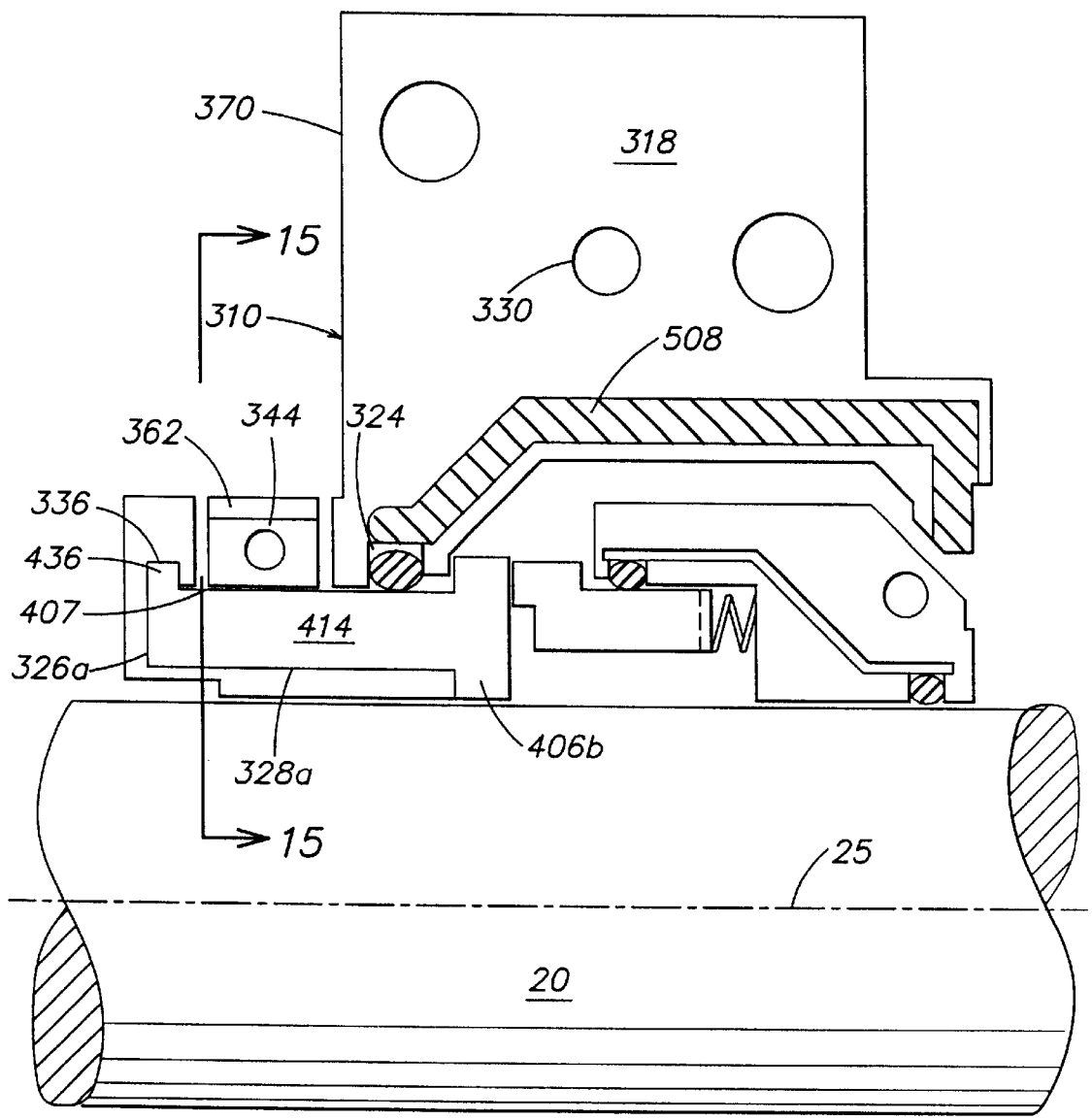
FIGS. 12A and 12B are side views of alternative embodiments of a mechanical split seal component half in which the stationary seal face is held in a channel.
Figure 12B:
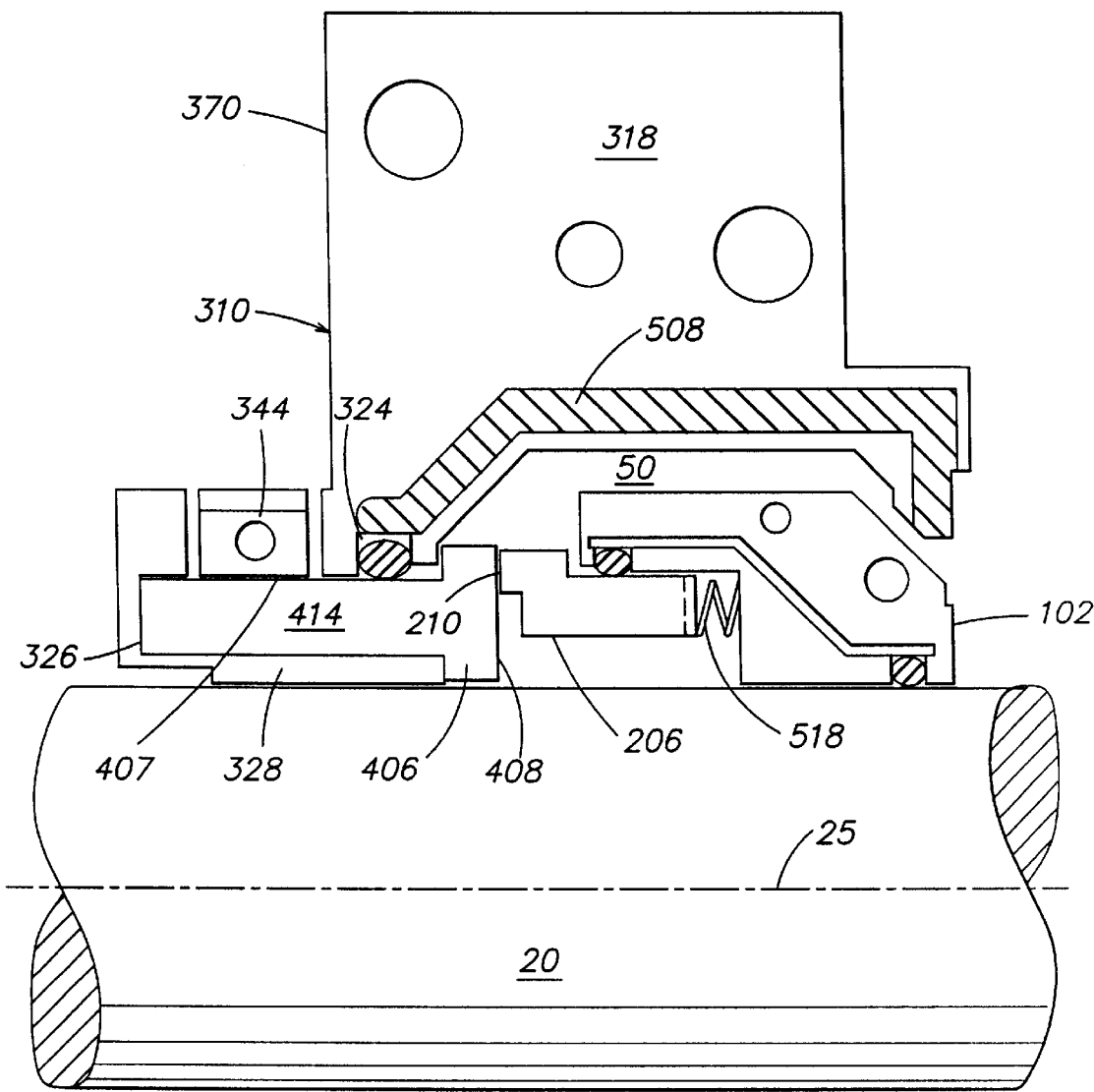
Figure 13A:
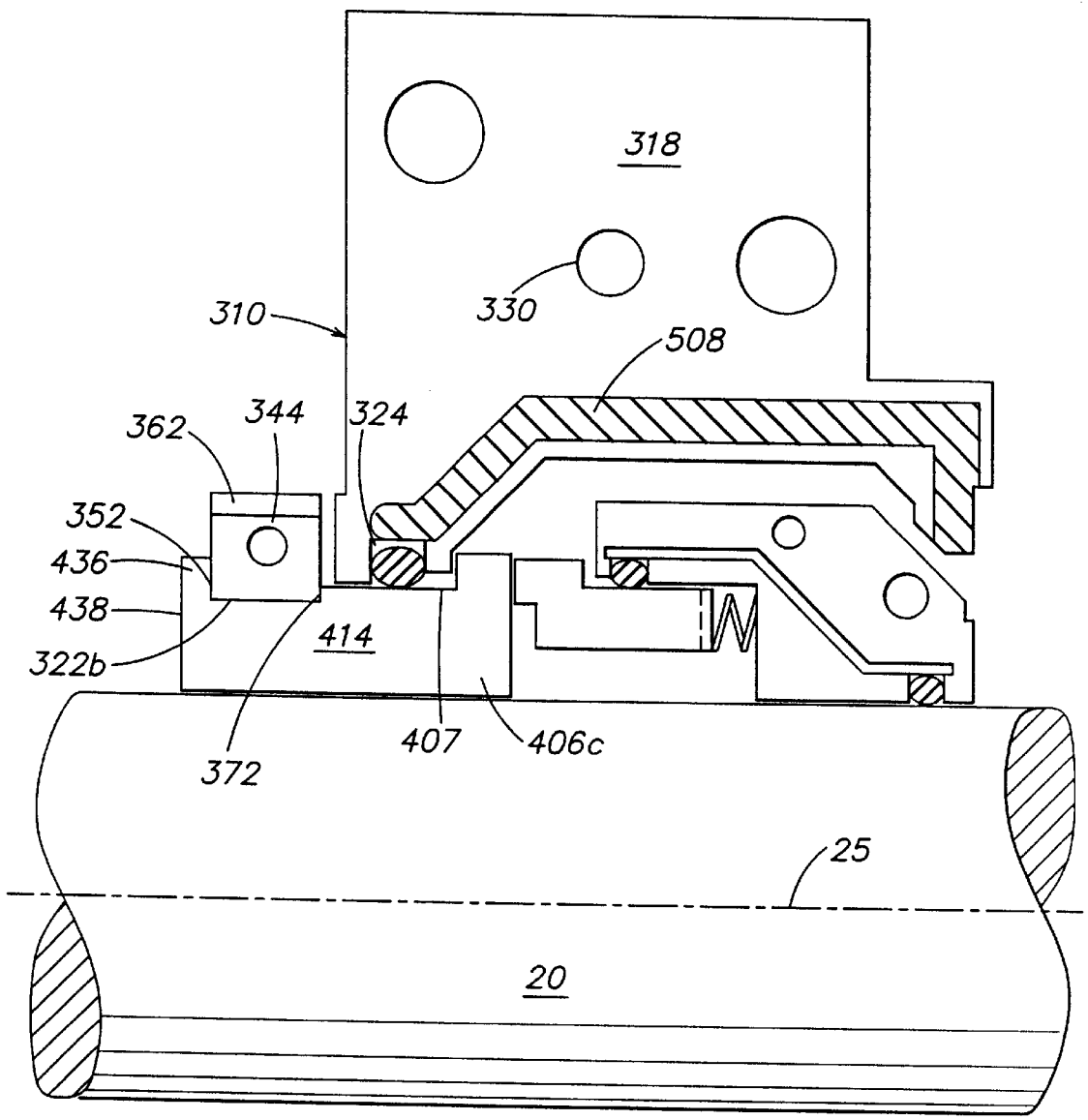
FIGS. 13A and 13B are side views of alternative embodiments of a mechanical split seal component half in which the stationary seal face bears axially against the front and back edges of the band.
Figure 13B:
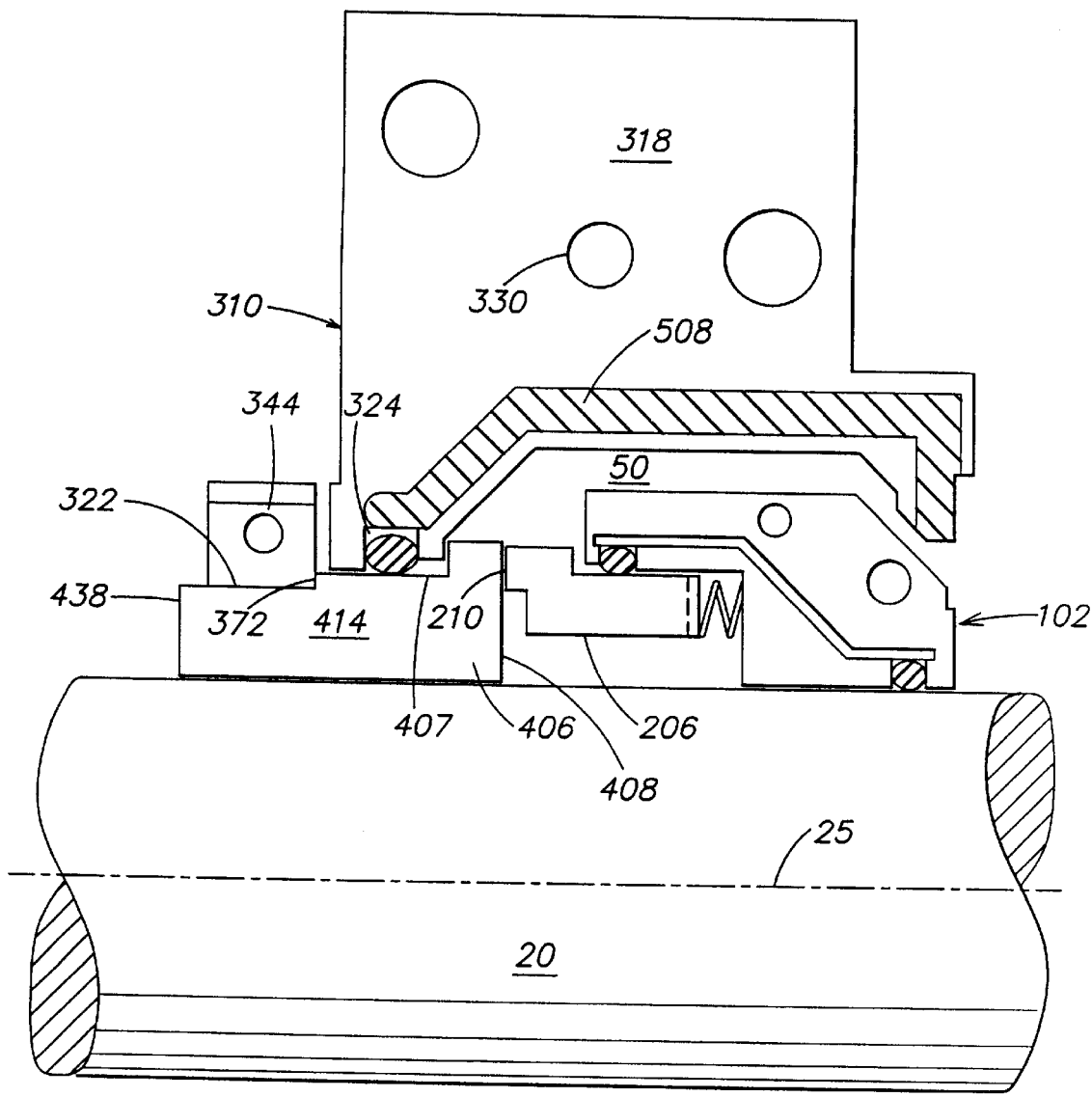

A nose 436 may engage with a recess 336 as shown in FIGS. 11A and 12A. Alternatively, the nose 436 may extend beyond the counterbore 322b so that it extends axially from the stationary holder halves 310, 312 as shown in FIG. 13A.

In either configuration the nose 436 is axially supported along 360 degrees reducing distortion at the seal face 406 under high pressures. As shown in FIG. 13A, the back radial surface 438 of the nose 436 may be used to axially align the stationary seal face segments 406c. In another configuration as shown in FIGS. 11B, 12B, 13B and 14B, the stationary seal face segments 406d do not have a nose 436 and may be restrained from dislodging axially toward the rotary component by a net force on the seal face in the opposing direction. As noted above with reference to the rigidly mounted rotary seal face segments 206, the stationary seal face segments 406 may be supported and prevented from dislodging axially towards the rotary component by the band 342.

As shown in FIGS. 11–14, the stationary face segments 406a–d may be clamped concentrically by a band 342 configured similarly to that discussed above with respect to a rigidly mounted rotary seal face 200. Each stationary holder half 310, 312 may have a band 342 around the outer axial wall 407 of a cylindrical seal face section 414 of the seal face segments 406. The bands 342 rigidly and securely hold the stationary face segments 406 together into a rigid non-split configuration concentric with the shaft 20, and reduce relative axial or radial movement between the stationary face segments 406.

Figure 14:
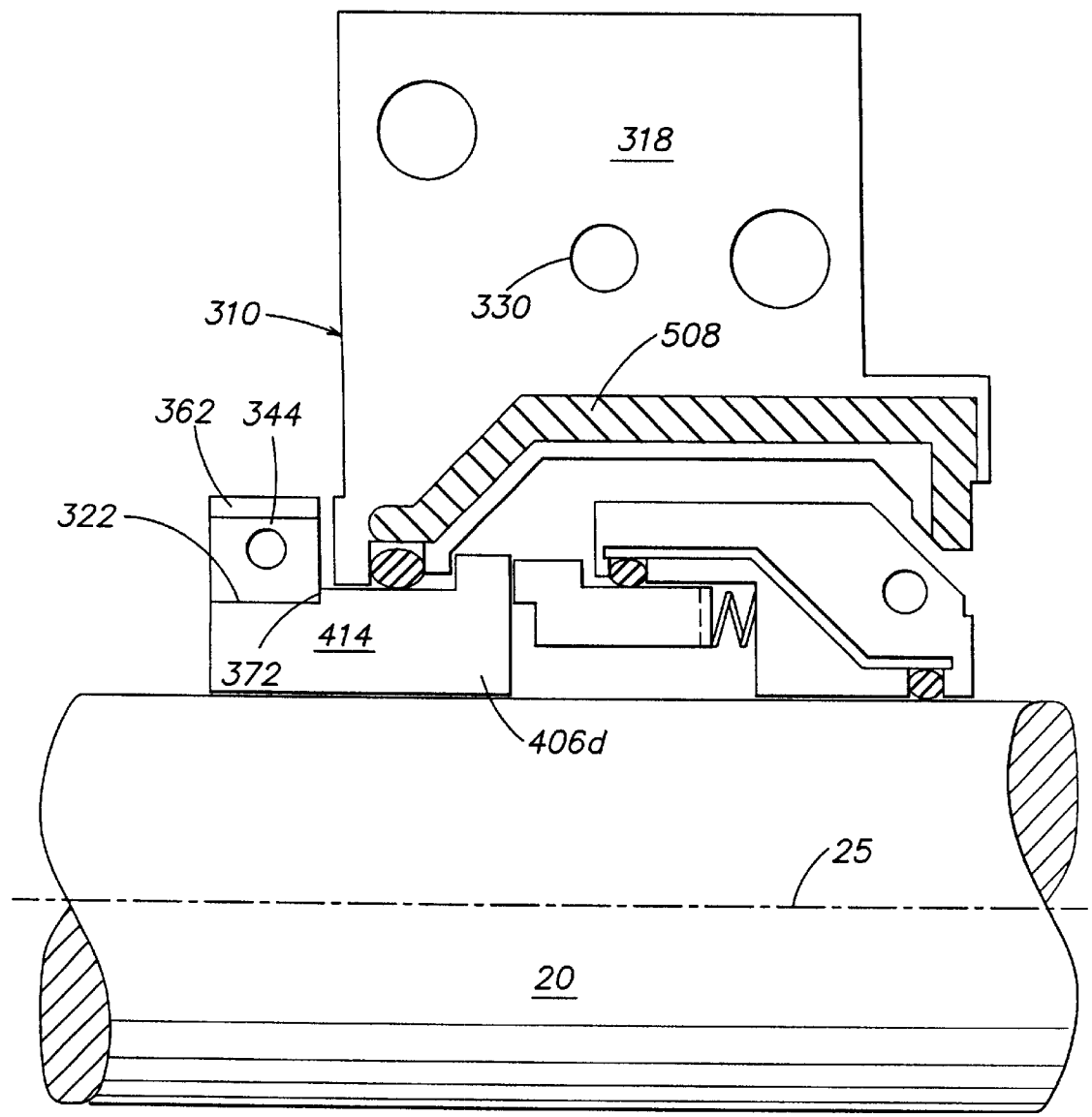
FIG. 14 is a side view of one-quarter of a mechanical split seal assembly in which the stationary seal face does not have a nose.

As shown in FIG. 15, the band 342 may form a section of the outer axial wall 314 of the counterbore 322. Each band 342 may be attached to or integrally formed with each stationary holder half 310, 312 proximate one of the stationary holder mating surfaces 318, 320 and may be otherwise unattached. The cylindrically-shaped band 342 terminates in flanged sections 344, 346 normal to the shaft 20. Each first flange section 344 may have a lip 362, protruding from an outer edge. Each second flange section 346 may have a complementary notch 360. Screws or other fastening devices (not shown) may be used to tighten the bands around the seal face. When the bands are tightened, lips 362 fit into notches 360 providing an interlock. The back edge 352 and front edge 372 of the band 342 may also serve as axial stops for the nose 436 extending outwardly from the seal face segments 406c as shown in FIGS. 13 and 14.

The counterbore 322 in each stationary holder half 310, 312 is bounded by the outer axial wall 314 of each stationary holder half 310, 312. The outer axial wall 314 may provide support to the stationary seal face segments 406. The stationary holder halves 310, 312 may also include an inner axial wall 328, forming an inner wall or channel 326a to provide additional support to the stationary seal face segment 406.

As described above the inner axial wall and the outer axial wall provide support respectively to the inner axial wall and the outer axial wall of the stationary seal face segment, the opposing surfaces may create localized stresses, which may result in a distortion of the seal face. As noted above with reference to the rotary holder halves and the rotary seal face segments, the stationary holder halves 310, 312 and the stationary seal face segments 406 may also have stress relieved regions on any axial wall and in any combination of structure as discussed above. In one embodiment as shown in FIG. 15, at least one area of stress relief 148 on the outer axial wall 314 may be proximate to the first and second mating surfaces 318 of the stationary holder halves 310, 312. The inner axial wall 328 (if one is present) may also have a stress-relief region 150. These regions 148, 150 as shown in FIG. 15 may provide an added advantage of facilitating easy insertion of the seal face segment 406 into stationary holder halves 310, 312.

As shown in FIGS. 11A and 11B, each rotary holder half 102a, 104a may contain a rotary face segment 206g resiliently mounted in a counterbore 110a. A split o-ring 516 may be mounted in an arcuate groove 154 in the counterbore 110a and may prevent the rotary seal face segment 206g from being axially withdrawn from the counterbore 110a. Each rotary seal face segment 206g may have a ridge 156 with a larger diameter than the inner periphery 517 of the split o-ring 516 in its uncompressed state. If an axial force is applied to withdraw the rotary seal face segment 206g from the holder half 102a, 104a then the ridge 156 contacts the o-ring 516 which forms a stop, tending to retain the seal face 206g in the counterbore 110a. The split o-ring 516 also seals between the rotary seal face segments 206g and the holder halves 102a, 104a and presses radially inwardly against the rotary seal face segments 206g, helping to position the seal face concentric with the shaft 20. The ridge 156 may aid in axially aligning the face. The ridge 156 may be tapered to facilitate easy axial insertion of the ridge 156 past the inner periphery 517 of the split o-ring 516.

Each holder half 102a, 104a may include an inner axial wall 114a. The inner axial wall 114a helps align the rotary seal face segments 206g normal to the shaft 20 during assembly and installation. The wall 114a in conjunction with the ridge 156 and split o-ring 516, also retains the rotary seal face segments 206g in the holder halves 102a, 104a. The rotary component 30, thus, may comprise only the two rotary component halves with no loose parts, except for fasteners.

A resilient support pushes the rotary primary sealing surface 210 toward the stationary primary sealing surface 408a. Such a resilient support may constitute compression springs 518 retained in the counterbore 110a by the seal face segments 206g. Wave springs, canted coils, leaf springs and bands or resilient materials such as elastomers, also may be used. If the counterbore 110a has an inner axial wall 114a, the wall 114a reduces the likelihood of the resilient support being dislodged.

One of the advantages of the split seal assembly is the ease of assembly and installation. The method of assembly depends on the particular seal configuration.

In a split seal assembly 10, the equipment 700 to which the split seal is attached does not have to be dismantled to slide on a ring shaped seal assembly, rather, in a split seal assembly, the parts may be placed around the shaft and attached either to the shaft or the equipment.

Figure 27:
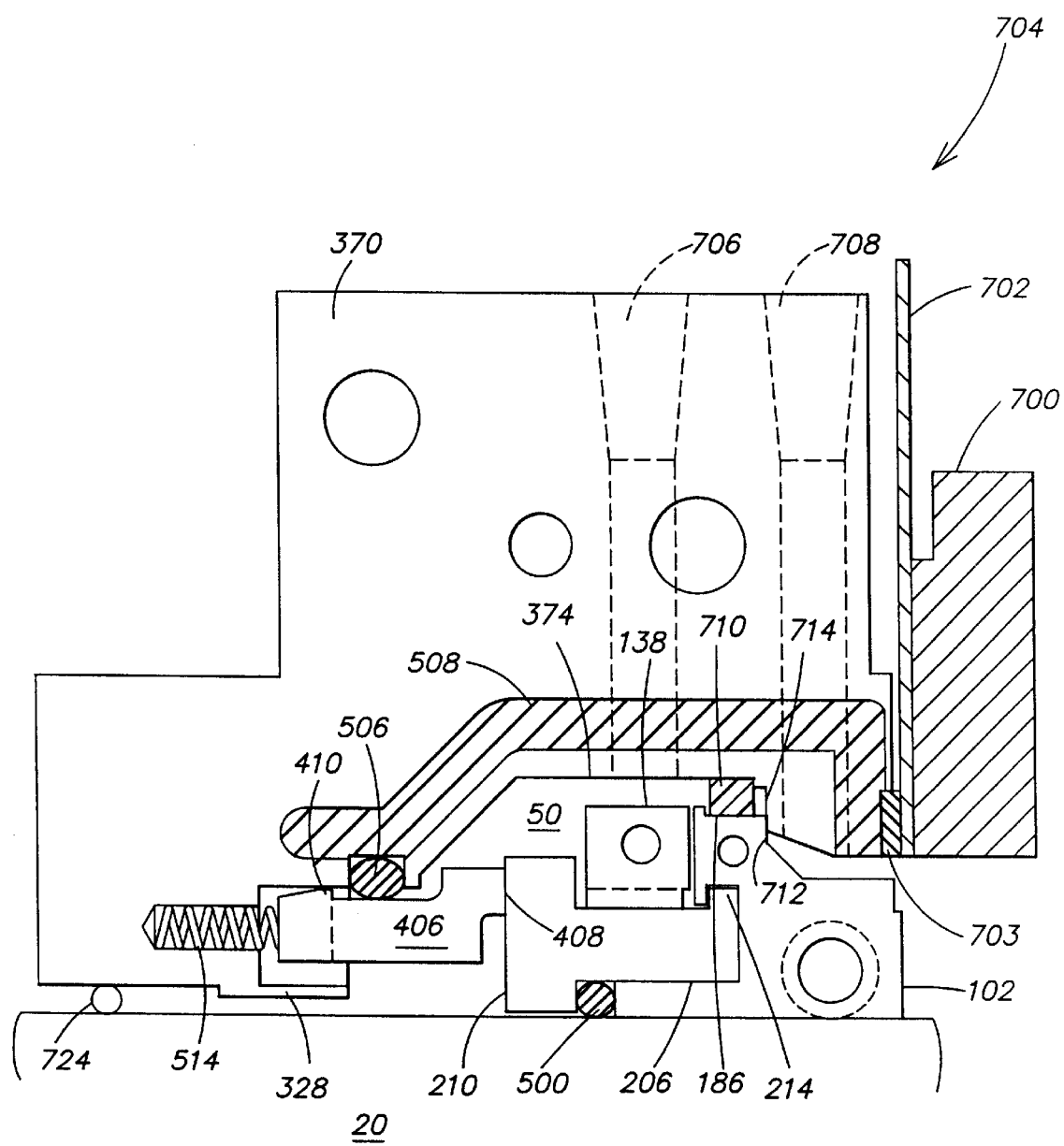

In a component design, each part of the split seal assembly is individually mounted to the shaft a predetermined distance along the shaft 20 from the equipment 700. As shown in FIG. 27, a shim 702 is placed between each part and the equipment 700 to aid in installation of the part a predetermined distance from the equipment.

The resiliently-mounted stationary component 40 may be assembled with the following steps: A biasing device such as compression springs 514 or wave springs may be placed in the counterbore 322 of each holder half 310, 312. Next a split o-ring 506 may be set into a groove 324 in the outer wall 314 of the counterbore 322. Finally, the stationary seal face 400 may be inserted axially into the counterbore 322 so that the ridge 410 of the stationary seal face 400 pushes past and is held within the counterbore 322 by the split o-ring 506.

In a unitized design as shown in FIGS. 26–32, each rotary seal component half 106, 108 fits into a component housing such as a gland half. In one embodiment, each stationary holder half is attached to or integrally formed with a gland half. The gland half may also include a receptacle 705 for receiving the rotary seal component half. Thus, the unitized seal may comprise two unitized halves 704, with no loose parts, that fit around a shaft 20 and form the split seal assembly 10.

Because each half of the unitized seal component 704 may be assembled at a factory in clean room conditions, rather than on site, contamination of the seal assembly 10, and more particularly, contamination of the primary seal faces 210, 408 may be reduced. Because each half of the rotary seal component 106, 108 and each half of the stationary component 306 may be fully assembled in at least two unitized halves 704 before mounting to the shaft 20, the installation procedure is simple and allows two parts 704 to be manipulated during installation. Thus, installation may be completed by the unskilled or untrained. Thus, all parts are mounted in each component half 704.

The simplicity of installation and reduction of part assembly on site also reduces damage to the primary seal faces 210, 408 due to, for example, human error at the time of installation. Unlike seal faces known in the art, the inventors have found that avoiding sliding of the primary seal faces 210, 408 during installation may reduce the occurrence of damage to the primary seal faces 210, 408. The inventor's have found that after rigidly mounting one seal face, the shaft 20 may need to be rotated to seat the seal faces, which may be off or out of grain mesh, and thus, the rotation may damage the seal faces at the joints. Rather, the inventors have found that a rigidly mounted seal face does not require rotation of the shaft, since one face is already rigid and flat, as in conventional flexibly mounted seals. In addition, such a unitized design reduces the likelihood of damage to the split joints of the seal faces.

Figure 26:
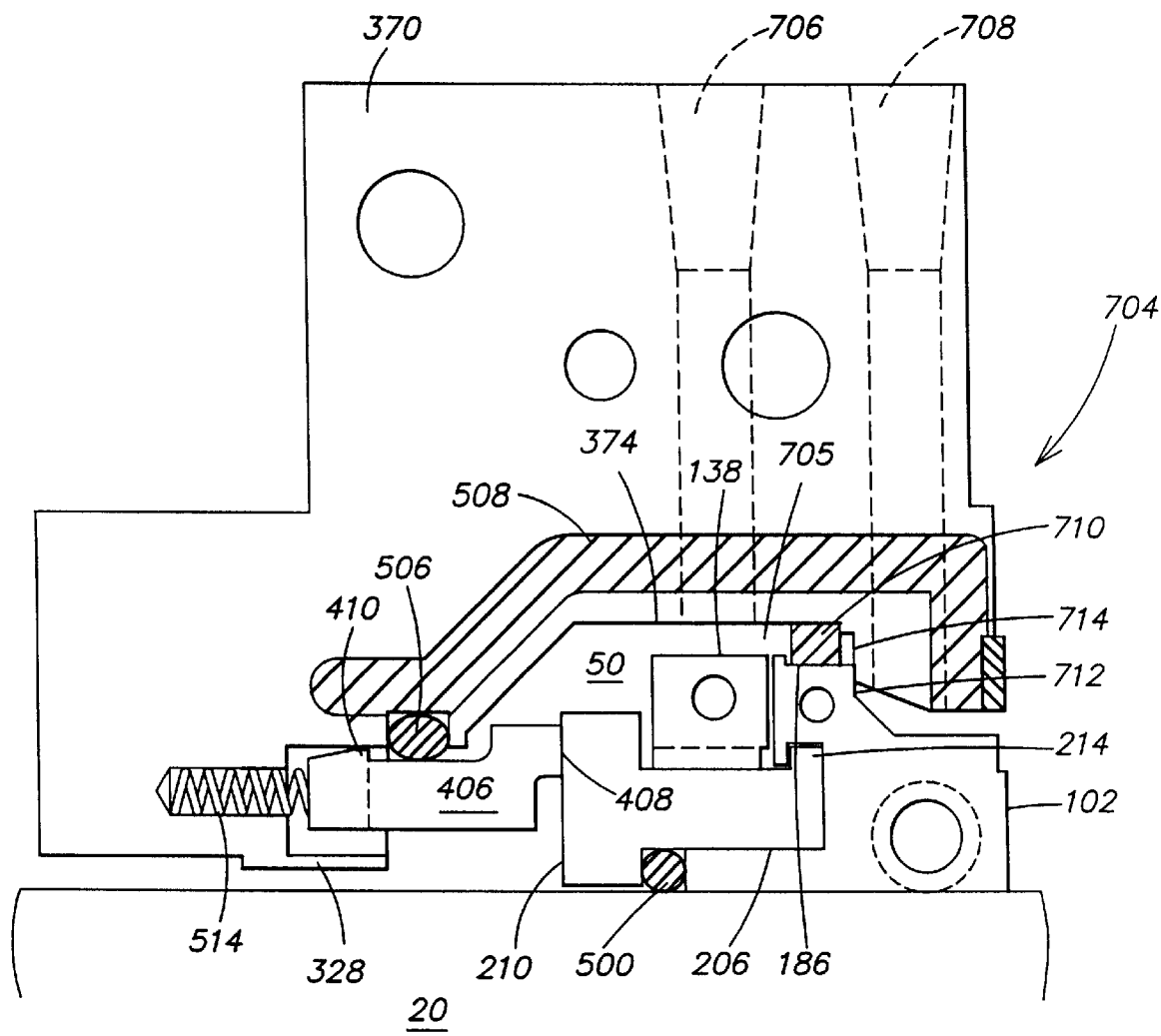
FIGS. 26–28 show the mechanical split seal in various states of installation.

To releasably and stably hold the rotary seal face 206 and holder halves 102, 104 in the unitized component half 704, a unitized design may also include a face alignment shoulder 712 on the external diameter of the rotary half 102, 104. The shoulder 712 is fixably attached to the rotary holder half 102, 104, and in one embodiment of the invention, may be integrally formed with the rotary holder half 102, 104 as shown in FIGS. 26, 27, and 29. After installation of the rotary holder half 102, 104 onto the shaft 20, the face alignment shoulder 712 abuts a corresponding abutment surface or flange 714 on the internal surface 374 of the gland 370 in a radial direction as shown in FIGS. 26–30. Thus, this abutment between the shoulder 712 and the abutment surface 714 helps create and maintain axial face alignment in the unitized design during installation.

Figure 31:
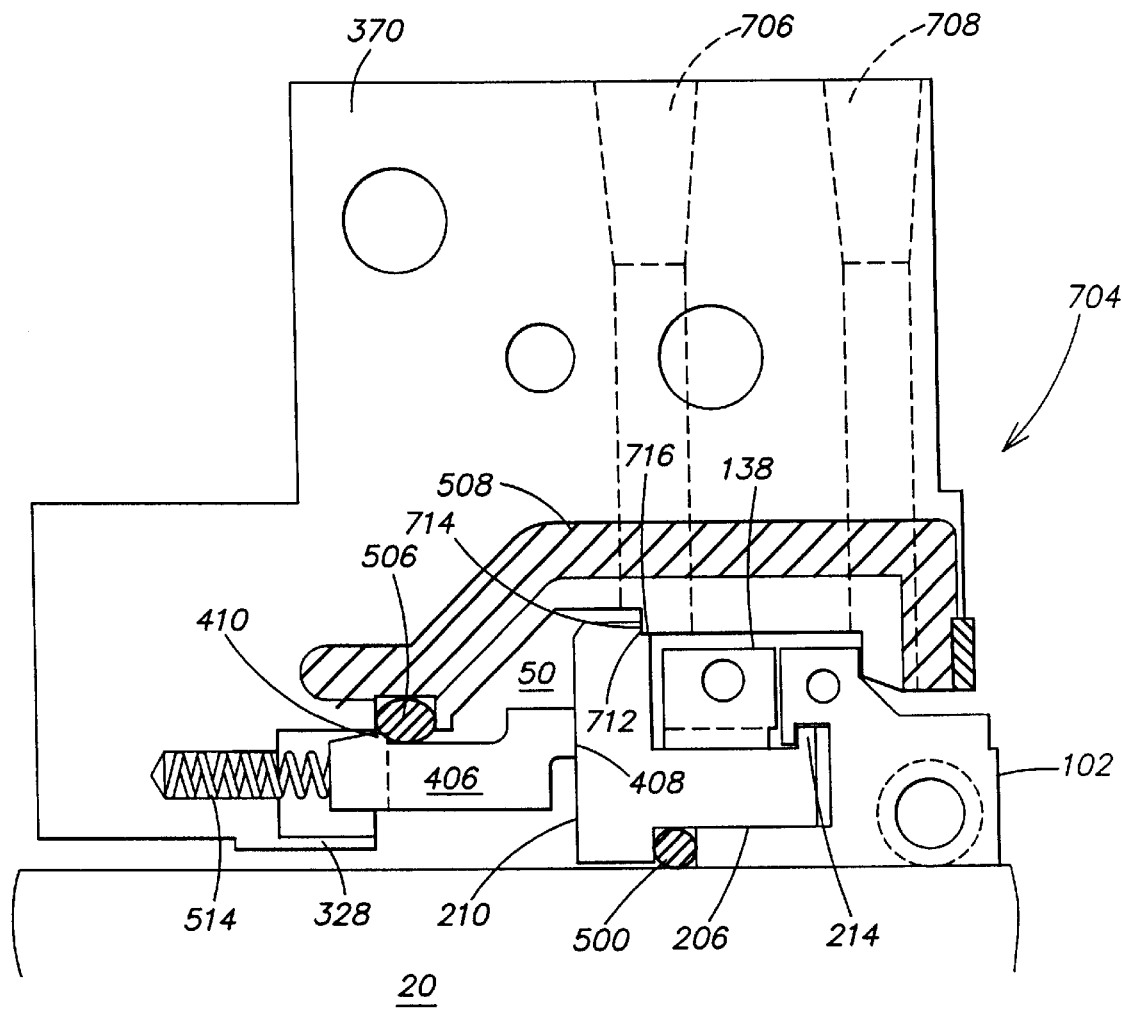

In a further embodiment of the invention as shown in FIGS. 29 and 31, face alignment shoulder 712 may also contact corresponding abutment surfaces or flanges 716 on the internal surface of the gland in an axial direction. Thus, this contact can also help create and maintain radial alignment on the seal face segments 206. Those skilled in the art will recognize that the face alignment shoulder 712 may also be directly placed on the seal face segment 206 rather than on the holder halves 102, 104 as shown in FIGS. 31–34. The flanges and/or the shoulder may be integrally formed to their respective host components or may be otherwise attached thereto. In addition, the flanges and shoulders are formed of any suitable material, such as metal or plastic or other non-metallic material.

In a rotary component without an inner axial wall 114, the rotary seal face segments 206 may not necessarily have to be slid radially into the rotary holder halves 102, 104. When no inner axial wall 114 is employed, the rotary seal face segments 206, may be positioned around the shaft 20 and then may be surrounded by the rotary holder halves 102, 104. A snap ring (not shown) may be placed around rotary seal face segments 206 to hold them while the rotary holder halves 102, 104 are positioned. However, if the fit between the nose 214 and a recess 120 is very close, it may be easier to slide the seal face segments 206 radially into the holder halves 102, 104 even when there is no inner axial wall.

A shim 602 may be used to set the axial alignment of the face segments 206, as shown in FIGS. 6A and 6B. To ensure that the face segments are satisfactorily aligned, a finger may be passed over the junction 130 and the face segments 206 may be pressed toward the shim 602 until no misalignment is felt between the face segments. Then, the shim 602 may be removed and the mating surfaces may be fastened together. Fasteners may be inserted through holes 188 and 190, shown in FIGS. 3A and 3B, and tightened. Finally, bands 136 of the rotary holder halves 102, 104 may be tightened one to another to position the rotary seal face 200 concentrically around the shaft 20.

The gland halves 310, 312 with the gasket 508 installed in the mating surface 318 then may be placed around the rotary component 30 and secured so that the rotary and stationary primary sealing surfaces 210, 408 are in biased contact with one another.

A unitized design may also include two access holes 706, one in each gland half, as shown in FIGS. 16 and 26–32. The two access holes 706 provide access to tighten any existing band cap screws (not shown). Alternatively or additionally, the two access holes 706 may also be used to inject a barrier fluid into the sealed annular cavity 50 to flush the seal face area in the sealed annular cavity 50 to prevent any suspended solids and abrasives in the process fluid from clogging movement of the parts or from damaging the parts with friction or corrosion, thus maximizing plant operating efficiencies and reducing operating costs. Access port 708 provide access to the rotary holder drive screws (not shown) and additionally may also be used to inject a barrier fluid into the annular cavity open to the equipment 700 to flush the holder halves 102, 104 and to reduce the likelihood that solids in the process fluid will clog the seal assembly 10 and provide a second barrier against solids migrating into the annular cavity 50 and the seal surfaces 210, 408. The access holes 706, 708 may also be used to insert a cooling liquid to flush the system and cool the internal moving parts due to friction between the parts or friction between the parts and the process fluid allowed internal to the seal assembly 10. Those skilled in the art will recognize that access ports 706, 708 may be used individually or in combination to flush the seal assembly 10.

Figure 28:
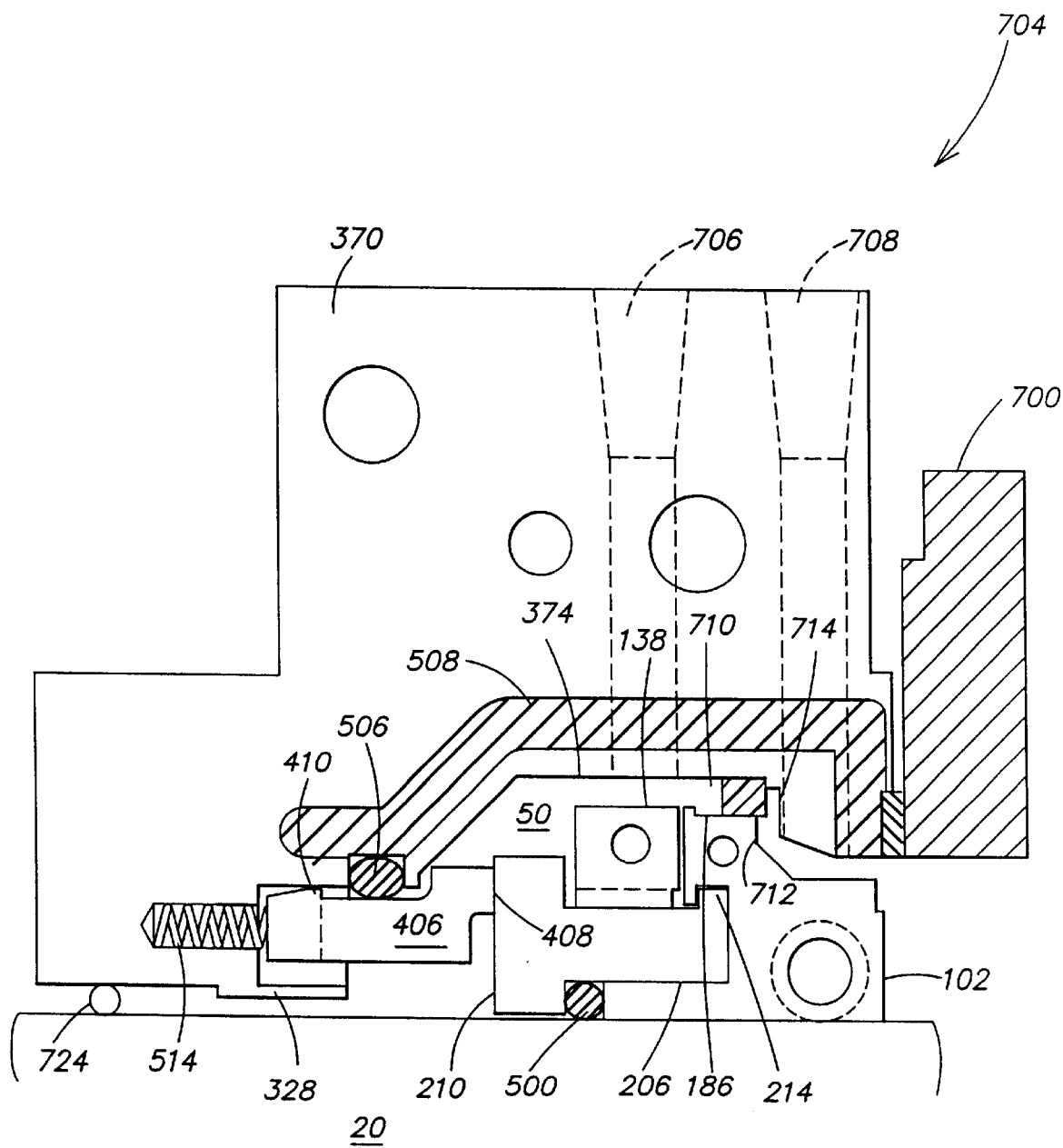
Figure 29:
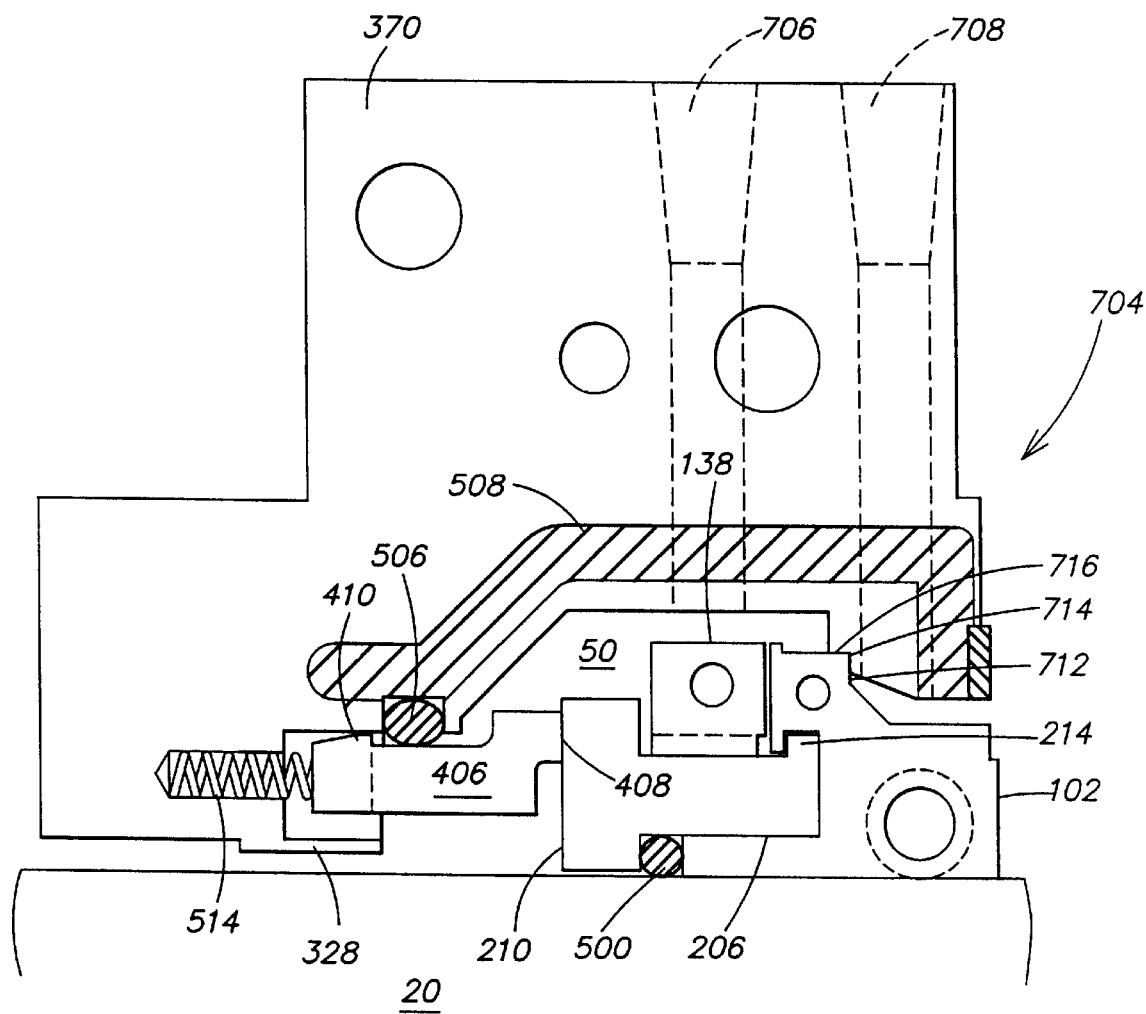
FIGS. 29–32 show an alternative embodiment of the mechanical split seal of FIGS. 26–28.

In addition, the amount of suspended solids in the process fluid may also be reduced before the fluid is allowed into the sealed annular cavity 50 of the seal face assembly 10 with use of an environment control strip 710 as shown in FIGS. 26–28. The internal environmental control strip 710 makes environmental control a self-contained feature in the seal assembly 10, in contrast to prior art designs where a bushing is mounted external to the seal assembly. Thus, additional costs and installation procedures are reduced. Furthermore, the internal environmental control strip 710 may also reduce damage to the shaft, in contrast to the prior art designs which attached a stationary teflon bushing to the rotating shaft which created wear on the shaft.

The environmental control strip 710 is mounted between the outer edge 186 of the rotary holder half 102, 104 and the inner axial wall 374 of the gland half 370. The environmental control strip 710 may be made of a substantially non-compressible material including, but not limited to, teflon, glass filled teflon, nylon, and delrin.

The environmental control strip 710 may be mounted around the complete circumference of the rotary holder halves 102, 104 and the gland half 370. In addition, a barrier fluid may be introduced to the sealed annular cavity 50 through the access holes 706, 708 to create a high pressure area in annular cavity 50 in front of the environmental control strip 710 and around the seal faces 210, 408 and prevent abrasives from migrating forward into the annular cavity 50. The environmental control strip 710 may wear slightly due to the rotation of the holder halves 102, 104, thereby providing a clearance area that may act as an orifice imparting velocity to the barrier fluid and prevent the migration of destructive solids or abrasives in the process fluid to the annular cavity 50 and the seal faces 210, 408. Furthermore, as the environmental control strip 710 wears due to the friction between the control strip 710 and the holder halves 102, 104, the holder halves are not significantly abraded by the control strip 710, which may reduce damage to the holder halves 102, 104.

In an alternative embodiment of the invention, the environmental control strip 710 may not prevent all suspended solids from entering the annular cavity 50 of the seal assembly, but may only inhibit the amount of suspended solids from entering the annular cavity 50 in some areas and may freely allow passage of the process fluid and solids into the annular cavity 50 in other areas. Thus, the environmental control strip 710 may be mounted in a single area around the diameter of the rotary holder half 102, 104 and the gland half 370, or multiple environmental control strips 710 with spacing between the control strips 710 may be mounted between the rotary holder half 102, 104 and the gland half 370. In one embodiment, of the invention a portion of the environmental control strip is removed from each end, providing a channel of flow of the process fluid through the annular cavity 50.

In an alternative embodiment removal of the environmental control strip 710 may provide an increasing channel of flow, with a maximum flow providing maximum heat dissipation within the annular cavity 50. The environmental control strip 710 allows for easy alteration of the seal assembly 10 for differing environmental and operational considerations.

The environmental control strip 710, being made of a rigid material, may also assure that the seal faces 206 are concentric to the shaft 20 while avoiding a metal to metal contact, thus decreasing the need for using centering clips during installation. The environmental control strip 710 may also set the seal face compression, rather than a setting gauge. If the environmental control strip 710 is not needed during operation of the seal assembly, it may be used to align the seal faces and then be removed before operation.

The unitized design also allows movement of the equipment shaft 20 through the seal without complete disassembly of the seal components, allowing trouble shooting and corrective actions to be performed without complete disassembly of the seal 10 and possible corresponding damage or contamination to the seal during disassembly.

The unitized design may also allow adjustments of shaft 20 without disturbing the rotary seal face settings, thus, if the seal assembly 10 leaks at pressurization of the seal, problems can be pinpointed without disturbing the rotary seal face segments 206. Rotary drive screws (not shown) may be loosened through at least one of the access holes 708. Thus, all seal setting and clamping screws are internal to the seal assembly 10 when accessed through the access holes in the gland 370. A shim 602 may be temporarily installed in front of the gland 370 to keep the seal face segments aligned as shown in FIGS. 6A and 6B. Then, the gland 370 may be unbolted allowing adjustment of the shaft 20. As shown in FIG. 27, a second shim 702 may then be inserted behind the gasket 703, which seals the gland to the equipment, to ensure proper axial placement of the seal face assembly on the shaft and the rotary drive screws may be rebolted through the access holes. The rotary component halves 106, 108 may be mounted flush to the equipment is 700 and the environmental control strip 710 may provide axial alignment of the stationary holder halves 306. The axial length of the environmental control strip 710 may be sufficient to pre-load the resilient mounting 514. Finally, the gland 370 may be bolted down. Thus, the unitized design allows for installation with only two component halves 704, while also allowing removal of the gland halves 370 in a component manner without disturbing the seal face alignment.

To install a unitized design, the unitized component halves 704 are placed around the shaft 20 and secured together as shown in FIGS. 27, 29, and 31. A shim 702 may be placed between the unitized component halves 704 and the equipment 700 to ensure that the seal is correctly positioned axially relative to the equipment 700. Additionally or alternatively, a centering shim 724, as shown in FIGS. 27–28, may be placed between the inner axial wall of the stationary holder half 306 and the shaft 20 to ensure that the seal assembly 10 is correctly positioned radially relative to the shaft 20. The rotary holder halves 102, 104 are then secured to the shaft 20, i.e., mounted on the shaft 20 so that the rotary holder halves 102, 104 rotate with the shaft 20.

In one embodiment of the invention, an access port 708 may be provided to tighten the rotary holder halves 102, 104 to the shaft 20. In one embodiment of the invention the rotary holder is merely clamped to the shaft creating a friction mount. In an alternative embodiment of the invention, the rotary holder half may be fixably or removably attached to the shaft using any suitable attachment device.

Figure 30:
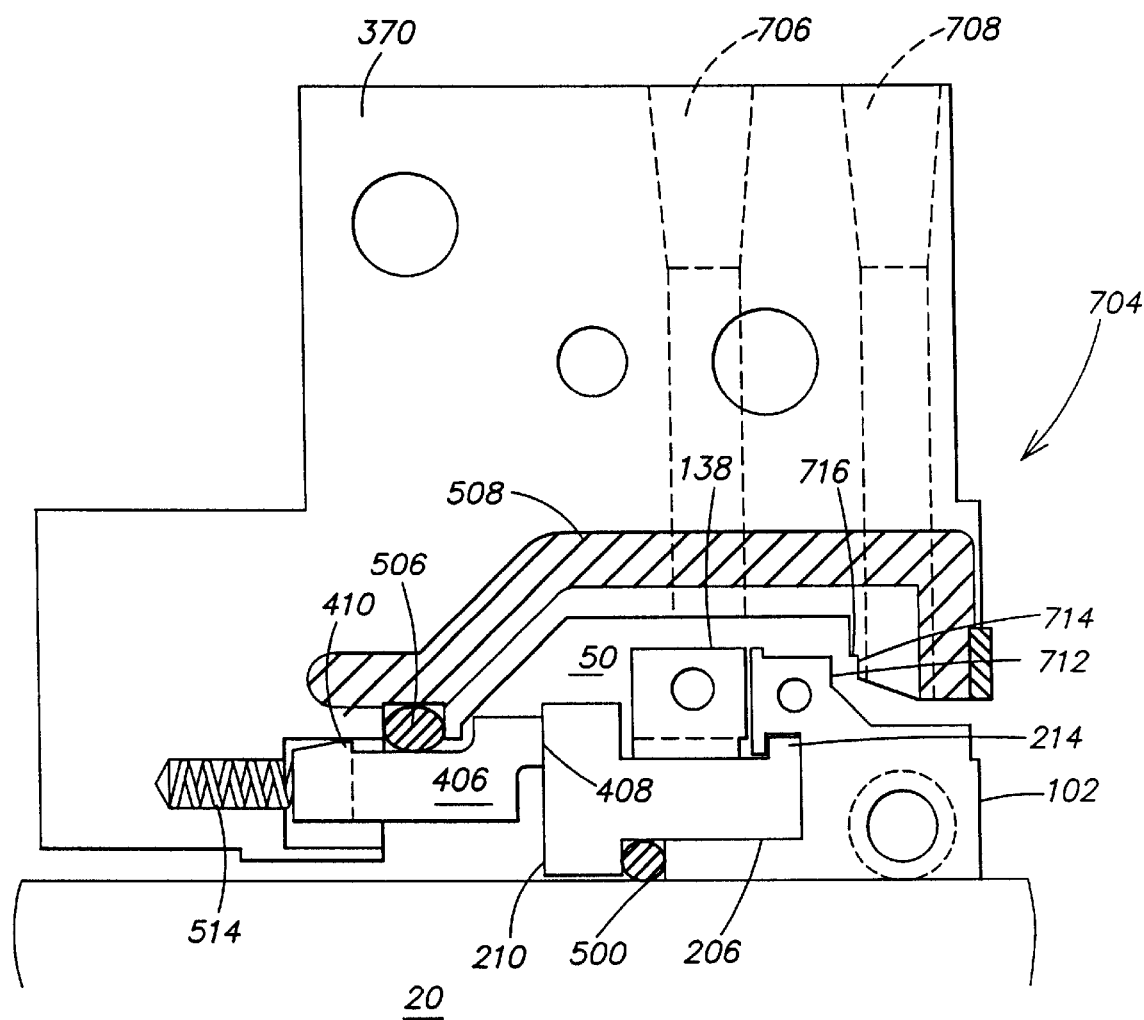
Figure 32:
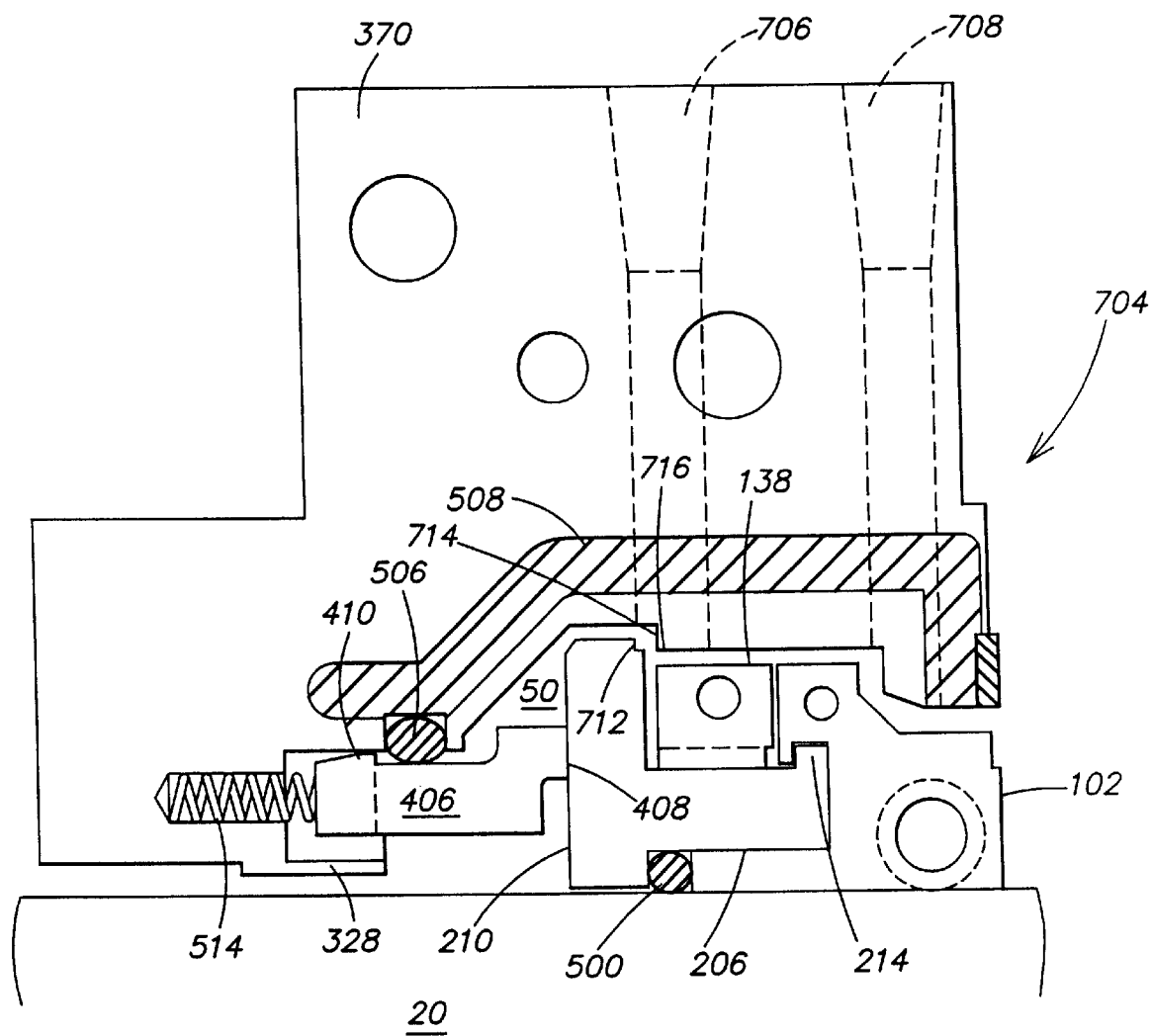
Figure 33:
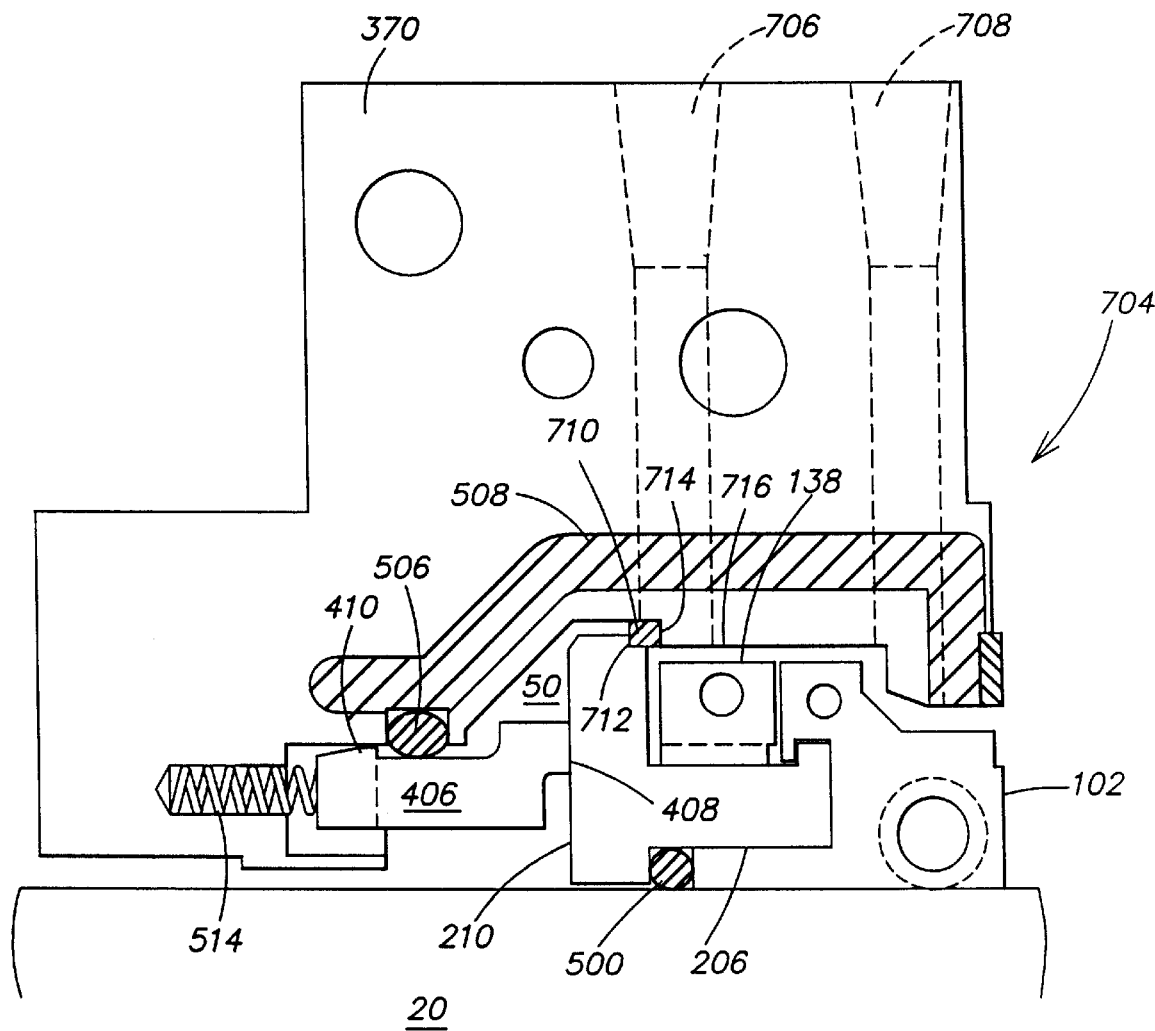
FIG. 33 is a side view of an alternative embodiment of the mechanical split seal employing an alignment mechanism.
Figure 34:
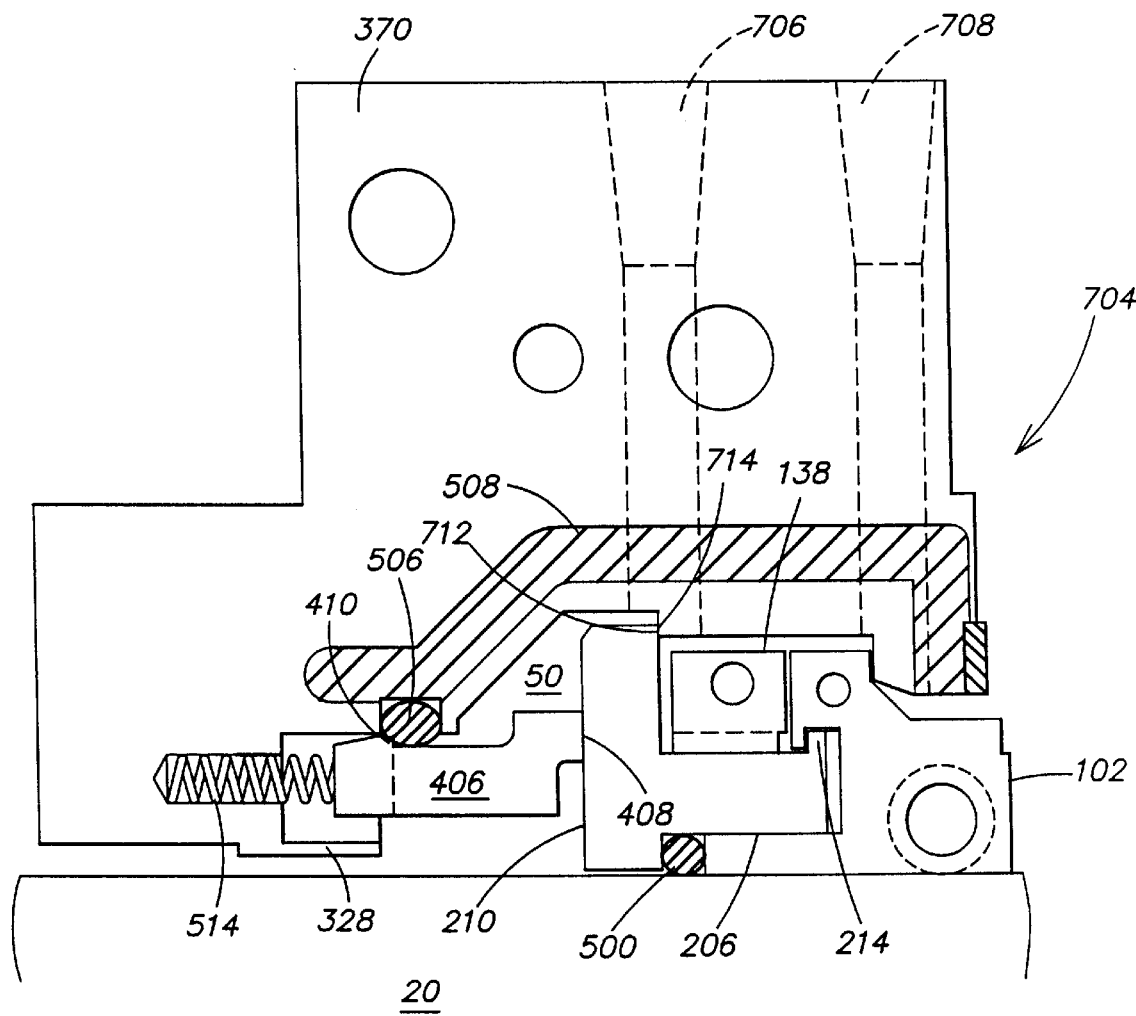
FIG. 34 is an alternative embodiment of the mechanical split seal.

After the rotary holder is secured to the shaft, seal assembly 10 is then pushed as a whole towards the equipment 700 on the rotary side of the seal assembly 10. However, since the rotary halves are fixed to the shaft, the force on the seal assembly places pressure on the flexible mounting of the stationary seal face and holder. Thus, this external force then preloads the flexible mounting and corrects the operational placement of the stationary holder and seal face within the gland and creates the proper clearances for operation as shown in FIGS. 28, 30, and 32.

In a conventional cartridge design, the rotary and stationary seal halves are mounted over a sleeve within clips that set the length, or external pressure, on the rotary and stationary holder halves before they are mounted to the shaft and equipment. An example of a cartridge-type seal according to one embodiment is shown in FIGS. 38–40 and 42. As shown, the sleeve 198 forms an inner wall 126 adjacent to the shaft 20. In one embodiment as shown in FIG. 37, the sleeve 198 may be removably attached to the holder halves 102, 104 with fasteners (not shown) through access holes 199. Alternatively, the sleeve 198 may be fixably attached to the holder halves 102, 104 with mounting methods known in art. In a further embodiment as shown in FIGS. 28 and 40. In addition, as shown in FIG. 19, the band may be attached to the sleeve. The sleeve 198 may be integrally formed with the holder halves 102, 104.

Figure 16D:
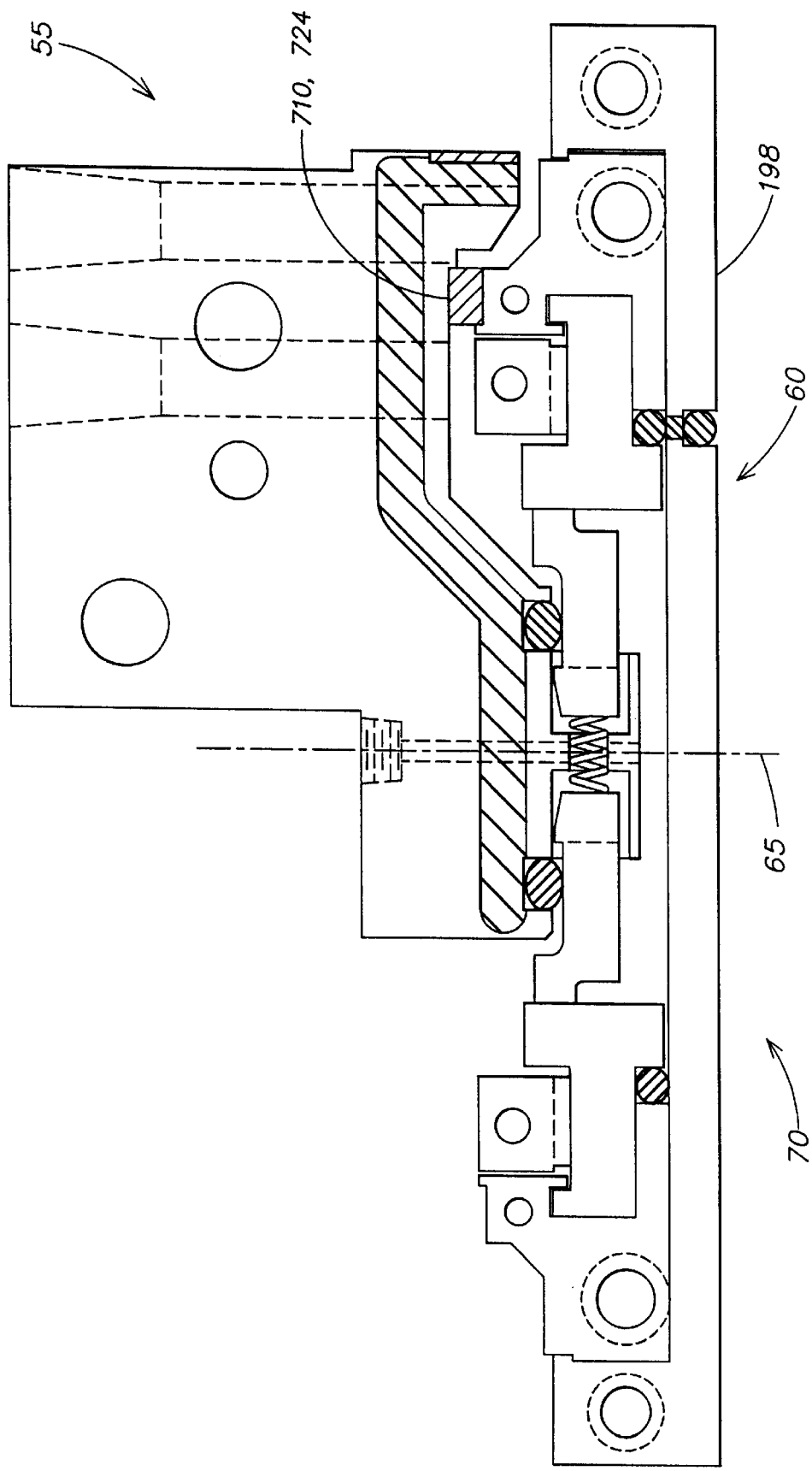
Figure 42:
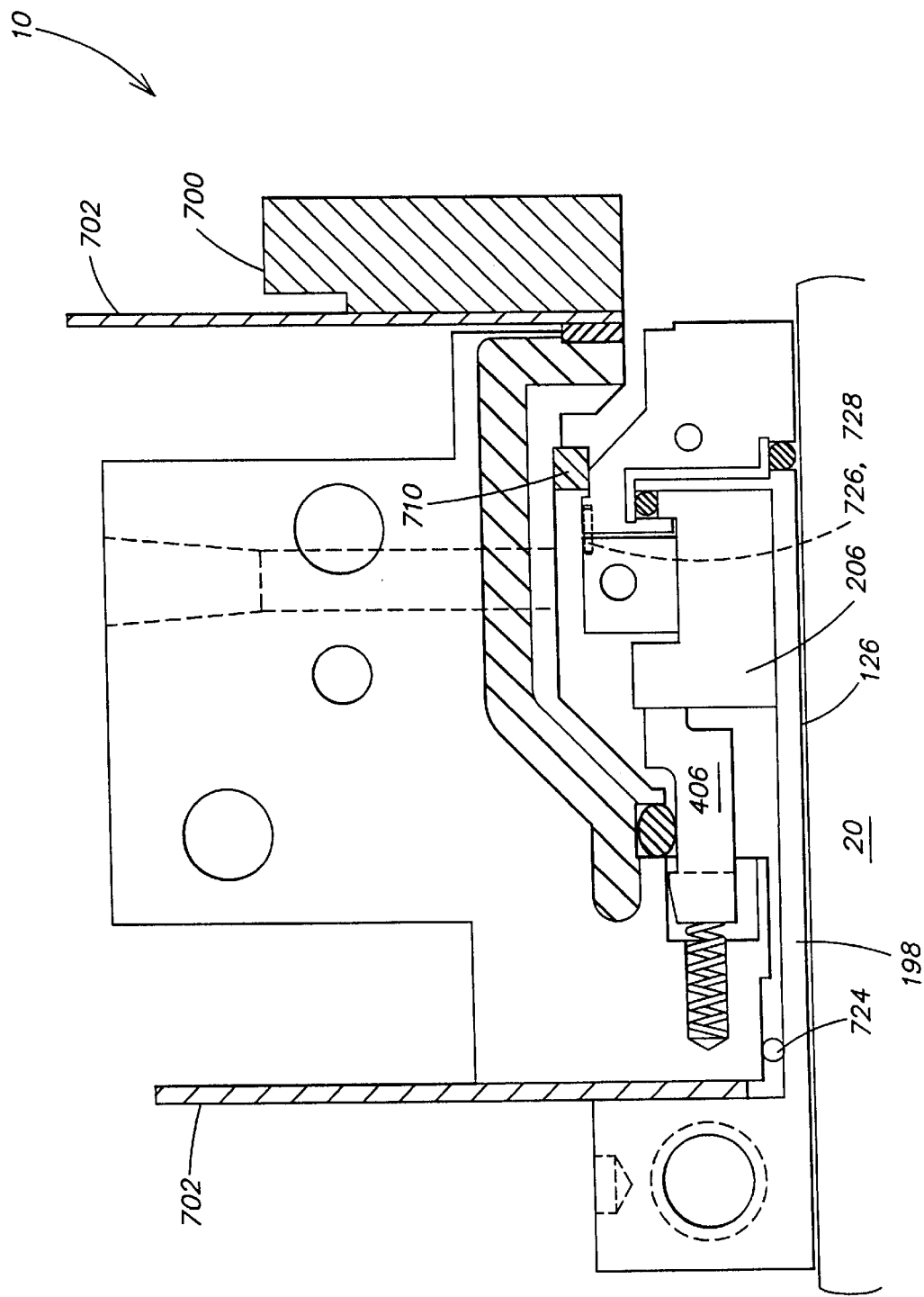
FIG. 42 is a side view of another embodiment of the seal.

Like the unitized design, each cartridge holder half 102, 104 is placed around the shaft 20 and then the halves are secured together. Again like the unitized design, the cartridge also is mounted to the shaft 20 a predetermined length from the equipment 700, and may also use a shim 702 and centering shim or ring 724 to set the axial and radial position of the seal assembly 10. An example of such an embodiment is shown in FIG. 42. Thus, unlike conventional cartridge seals using centering clips, axial positioning may be made using the shim radial alignment may be accomplished with the use of an environmental control strip 710 and/or centering shim 724. Of course, the use of the shims and environmental control strip and/or the centering shim may be incorporated in a double seal design. An example of the use of a centering shim or environmental control strip in a double seal, which will be described below, is shown in FIG. 16D.

In one embodiment the stationary portion of the seal assembly 10 may be mounted on the shaft 20 and attached directly to the equipment 700. In a further embodiment as shown in FIG. 42, the equipment 700 may incorporate the stationary component halves 306, and thus just the rotary seal component halves 106, 108 may be externally attached to the equipment 700 and shaft 20. As shown in FIG. 42, a band may be attached or integrally formed to the equipment 700 to secure the stationary seal face 400. The rotary seal face segments 206 may then be flexibly mounted within the rotary holder halves 102, 104, which are then installed around the shaft 20 against the stationary seal component halves 306. Thus, the equipment 700 supports the holder halves 310, 312 and eliminates the need for separate gland halves 370 to house the stationary seal components and attach to the equipment 700. Those skilled in the art will recognize that although the equipment integral seal halves are shown in FIG. 42 with connection with the stationary seal component halves 306, the present invention is not limited in this respect, and that the rotary component halves 106, 108 may be attached or integrally formed with the equipment 700.

In another embodiment, the unitized split seal assembly may be assembled on a component basis rather than as a unit. For example, the assembly steps for the rotary component 30 may include the following steps: First, the split o-ring 500 is positioned, preferably adhered to each seal face segment 206. The split o-ring 500 may be attached to the seal face segment 206 using adhesives well-known in the art. In one embodiment, the adhesive attaches the split o-ring 500 to the seal face segment 206 in selected areas along the split o-ring. The adhesive attaching the split o-ring 500 to the seal face segment 206 need only retain the o-ring through installation. In operation, the split o-ring 500 is supported by the surrounding split seal device and does not depend on the adhesive to maintain its position. Next the rotary seal face segments 206 are slid radially into the rotary holder halves 102, 104 with the noses 214 mounted in the holder halves 102, 104. The two rotary holder halves 102, 104 may then be affixed around the shaft 20. The aligning pins 122 may be inserted into the corresponding aligning holes 124.

Unlike conventional split seal assemblies, the face segments 206 do not need to be shifted radially so that the split 202 between the face segments 206 is offset with the junction 130 of the rotary holder mating surfaces 128. Thus, all joints may be aligned during installation and operation.

Next, the gland halves, each having the stationary seal face pre-installed therein and biased with springs as described above, may then be mounted over both the shaft and the rotary holder halves such that the primary sealing surfaces of the rotary seal face and the stationary seal face contact each other. The gland halves may then be secured together then mounted to the equipment. In this embodiment, when the gland halves are positioned over the rotary holder, the springs biasing the stationary seal face are biased away from the primary sealing surface of the rotary holder halves so that the proper axial alignment of the sealing surfaces may be obtained. In this manner, damage to either of the primary sealing surfaces is minimized.

In some instances, it may be desirable to utilize two mechanical seals to provide enhanced leak-free sealing. This may be accomplished by utilizing two of any of the seal assembly 10 combinations described above or various features thereof, in any suitable position on the rotating shaft 20. In one example, two mechanical seals may be employed and may be configured in a concentric configuration. In another example, two mechanical seals may be employed and may be configured in a tandem configuration. In yet another example, two mechanical seals may be employed and may be configured in a back-to-back configuration. As that shown in FIGS. 16A–16C, a single seal 55 having two seal sections in a back-to-back relationship may be employed. In the embodiments shown, the mechanical seal includes a housing 56, an inboard mechanical seal section 60 and an outboard mechanical seal section 70. For illustrative purposes, dividing line 65 demarks the boundary between the inboard and outboard sections 60, 70.

It should be appreciated that each seal section 60, 70 utilizes similar components as described above. Accordingly, the components of the inboard seal section 60 are labeled with the same reference numerals as described above except that each reference numeral includes reference designators "j", whereas the components of the outboard seal section 70 include reference designators "k". For the sake of clarity, not all components are labeled in FIGS. 16B and 16C.

In the embodiment shown in FIGS. 16A–16D, the seal 55 includes flexible mounting springs 514 (only one of which is shown) disposed between the two stationary seal components 406k and 406j. Further, in the embodiment shown in FIGS. 16A–16D, one or more ports 66 may be formed between the two sections 60, 70. The ports 66 may be used to introduce a fluid, which may be a liquid or a gas, between the two face seals 406j and 406k. The fluid may be used to equalize pressure internal and external to the seal assembly 10. The fluid may also cool and/or lubricate the seal face components during operation due to friction.

The housing 75 for the outboard seal section 70 may be removably attached to the gland halves 370 with suitable fasteners 76 known in the art. The housing 70 may provide protection to the seal assembly components during installation as well as provides the outboard seal section 70 abutment surface 714k for the shoulder 712k in a unitized design. After installation, the abutment surface 714k is not required, allowing the housing 75 to be removed after installation. However, the housing 75 may remain attached throughout operation to provide continued protection of the outboard seal section 70.

It should be appreciated that a cartridge-type seal may also be formed as a double seal. An example of such a seal is shown in FIG. 16D, wherein the sleeve 198 extends along the length of the double seal.

To hold the stationary seal faces 406j, 406k in alignment, a clamp ring 354 may be used. Thus, in the embodiment shown in FIG. 16B, seal 55 includes a first clamp ring 354j and a second clamp ring 352k. Each clamp ring 452j, 352k surrounds a respective seal face 406j, 406k. In this manner, the seal face segments are held together to reduce the likelihood of separation.

In an alternative embodiment, the seal faces 406j, 406k may be adhered to each other. Thus, in the embodiment shown in FIG. 16C, the split surface 404j, 404k of the seal face segments 406j, 406k include adhesive 356, which may be in the form of a spot. Similarly, in this manner, the seal face segments are held together to reduce the likelihood of separation.

As will be appreciated by those of skill in the art, the above-described band or adhesive may be employed with a cartridge-type seal, a component-type or a unitized-type seal. Although the adhesive and the clamp ring is shown and described with respect to a double seal, those skilled in the art will recognize that the present invention is not limited in this respect and that the spot adhesive or the clamp ring may be employed in a single seal.

Having now described a few embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In addition, various embodiments provide certain advantages and overcome certain drawbacks of conventional seals. Not all embodiments share the same advantages and these that do may not share them under all circumstances. Thus, it is to be appreciated that features of one or more embodiments may be combined with or removed from other embodiments, as the present invention is not limited to any particular embodiment having any particular feature. For example, as may have,been discussed above, the seal face segments may be rigidly held with a band or without a band and may include a nose or not include a nose.

What is claimed is:

1. A split seal combination, usable for assembly on a shaft, comprising:

a circular seal face including two seal face segments and having a primary sealing surface, an inner wall and an outer wall with an outer periphery;

first and second rotary holder halves each including an integrally formed clamping surface positionable adjacent a portion of said outer periphery to hold said seal face and each having a contact surface usable to aid alignment;

a second seal face including two seal face segments; and first and second stationary holder halves each arranged to receive one of said second seal face segments and each including an abutment surface to contact, said rotary holder half contact surface to aid alignment between rotary and stationary elements of the combination;

the split seal combination configured to permit said abutment and contact surfaces to be axially displaced to provide clearance upon completion of said assembly.

2. A split seal combination as in claim 1, wherein each stationary holder half is configured to utilize contact between said abutment and contact surfaces to provide pre-installation retention of one of said rotary holder halves before the stationary holder halves are installed on a shaft.

3. A split seal combination as in claim 2, configured to permit said abutment and contact surfaces to be axially displaced from pre-installation retention to provide operational clearance.

4. A split seal combination as in claim 1, wherein said rotary holder half contact surface is a shoulder which contacts a radially-extending abutment surface of said stationary holder half to aid axial alignment of elements of the split seal component.

5. A split seal combination as in claim 3, wherein said rotary holder half surface is a shoulder which contacts an axially-extending abutment surface of said stationary holder half to aid radial alignment of elements of the split seal component.

6. A split seal combination as in claim 3, wherein said rotary holder half surface is a shoulder which contacts both a radially-extending abutment surface and an axially extending abutment surface of said stationary holder half to aid radial and axial alignment of elements of the split seal component.

7. A split seal combination as in claim 1, wherein the stationary holder halves are configured so that during installation thereof around rotary holder halves previously installed on said shaft, said abutment surfaces aid alignment of stationary elements to rotary elements of the split seal.

8. A split seal combination as in claim 1, additionally comprising a substantially non-compressible curved control component disposed within each stationary holder half to provide said abutment surface.

9. A split seal combination as in claim 1, wherein said stationary holder halves comprise gland halves configured for attachment to equipment from which said shaft protrudes.

10. A split seal combination as in claim 1, wherein said clamping surface of each holder half comprises an inner surface of a flexible band portion.

11. A split seal combination as in claim 1, wherein said first and second rotary holder halves each include, prior to such assembly, at least one band section integrally formed therewith and cantilevered therefrom with a free end extending from a fixed end attached to the rotary holder half, the band sections comprising said clamping surface.

12. A split seal combination as in claim 1, wherein said clamping surface of each holder half includes at least one stress relief region.

13. A split seal combination as in claim 1, wherein said first and second rotary holder halves each have an annular portion positionable adjacent to said shaft and an axially-extending channel between an inner axial wall of the annular portion and an outer axial wall, said channel configured to contain at least a portion of one of said seal face segments.

14. A split seal combination as in claim 13, wherein said annular portion of each rotary holder half extends at least partially along the periphery of a semicircle.

15. A split seal combination as in claim 1, additionally including a split o-ring positioned against at least one of said inner and outer walls.

16. A split seal combination as in claim 15, wherein said inner wall includes a first portion with inner diameter approximating the outer diameter of said shaft and a second portion with a larger inner diameter, and said split o-ring is positioned against said second portion of the inner wall.

17. A split seal combination as in claim 1, wherein said split o-ring is formed of one of elastomeric or other material.

18. A split seal combination usable on a shaft, comprising:
a circular seal face including two seal face segments and having a primary sealing surface, an inner wall and an outer wall, the inner wall including a first portion with inner diameter approximating the outer diameter of said shaft and a second portion with larger inner diameter;
first and second rotary holder halves having inner axial walls positionable adjacent at least a portion of said outer wall to position said two seal face segments around said shaft and each having a contact surface usable to aid alignment;
a split o-ring positionable between the second portion of said inner wall and said shaft;
a second seal face including two seal face segments; and
first and second stationary holder halves each arranged to receive one of said second seal face segments and each including an abutment surface to contact said rotary holder half contact surface to aid alignment between rotary and stationary elements of the combination.

19. A split seal combination as in claim 18, configured to permit said abutment and contact surfaces to be axially displaced to provide operational clearance.

20. A split seal combination as in claim 18, wherein each stationary holder half is configured to utilize contact between said abutment and contact surfaces to provide pre-installation retention of one of said rotary holder halves before the stationary holder halves are installed on a shaft.

21. A split seal combination as in claim 18, wherein said rotary holder half contact surface is a shoulder which contacts a radially-extending abutment surface of said stationary holder half to aid axial alignment of elements of the split seal component.

22. A split seal combination as in claim 19, wherein said rotary holder half surface is a shoulder which contacts an axially-extending abutment surface of a said stationary holder half to aid radial alignment of elements of the split seal component.

23. A split seal combination as in claim 19, wherein said rotary holder half surface is a shoulder which contacts both a radially-extending abutment surface and an axially extending abutment surface of said stationary holder half to aid radial and axial alignment of elements of the split seal component.

24. A split seal combination as in 18, claim wherein the stationary holder halves are configured so that during installation thereof around rotary holder halves previously installed on said shaft, said abutment surface aids alignment of stationary elements to rotary elements of the split seal.

25. A split seal combination as in claim 18, additionally comprising a substantially non-compressible curved control component disposed within each stationary holder half to provide said abutment surface.

26. A split seal combination as in claim 18, wherein said stationary holder halves comprise gland halves configured for attachment to equipment from which said shaft protrudes.

27. A split seal combination as in claim 18, wherein said second portion of the inner wall is axially preceded by said first portion of the inner wall and followed by a third portion of the inner wall with inner diameter approximating the outer diameter of said shaft, said first, second and third portions forming an annular recess to receive said split o-ring.

28. A split seal combination as in claim 18, wherein said inner axial walls include an inner axial surface to partially compress said o-ring between the second portion of said inner wall and said shaft during installation of the split seal component.

29. A split seal combination as in claim 18, wherein each holder half includes at least one band section cantilevered therefrom with a free end extending from a fixed end attached to the holder half, the inner surface of the band sections comprising said inner axial surface.

30. A split seal, comprising:
a first seal face including two seal face segments;
first and second rotary holder halves each arranged to receive one of said first seal face segments and each having a contact surface usable to aid alignment;

a second seal face including two seal face segments; and first and second stationary holder halves each arranged to receive one of said second seal face segments and each including an abutment surface to contact said rotary holder half contact surface to aid alignment between rotary and stationary elements of the split seal.

31. A split seal as in claim 30, configured to permit said abutment and contact surfaces to be axially displaced to provide clearance during use of said split seal.

32. A split seal as in claim 31, wherein said rotary holder half contact surface is a shoulder which contacts a radially-extending abutment surface of said stationary holder half to aid axial alignment of elements of the split seal component.

33. A split seal as in claim 31, wherein said rotary holder half surface is a shoulder which contacts an axially-extending abutment surface of said stationary holder half to aid radial alignment of elements of the split seal component.

34. A split seal as in claim 31, wherein said rotary holder half surface is a shoulder which contacts both a radially-extending abutment surface and an axially extending abutment surface of said stationary holder half to aid radial and axial alignment of elements of the split seal component.

35. A split seal as in claim 30, wherein each holder half is configured to utilize contact between said abutment and contact surfaces to provide pre-installation retention of one of said rotary holder halves prior to installation and until said abutment and contact surfaces are axially displaced from pre-installation retention to provide operating clearance.

36. A split seal as in claim 30, wherein the stationary holder halves are configured so that during installation thereof around rotary holder halves previously installed on a shaft, a said abutment surface aids alignment of stationary elements to rotary elements of the split seal.

37. A split seal as in claim 30, additionally comprising a substantially non-compressible curved control component disposed within each stationary holder half to provide said abutment surface.

38. A split seal as in claim 37, wherein said curved control component is formed of one of: polytetrafluoroethylene; synthetic polymer.

39. A split seal as in claim 30, wherein said stationary holder halves comprise gland halves configured for attachment to equipment from which a shaft protrudes.

40. A split seal as in claim 30, wherein each of said first and second stationary holder halves includes a receptacle section configured to receive and provide said pre-installation retention of one of the rotary holder halves.

41. A split seal, comprising:

a first seal face including two seal face segments;

first and second rotary holder halves each arranged to receive one of said first seal face segments and each having a contact surface usable to aid alignment;

a second seal face including two seal face segments; and first and second stationary holder halves each arranged to receive one of said second seal face segments and each including an abutment surface to contact said rotary holder half contact surface to aid alignment between rotary and stationary elements of the split seal;

the stationary holder halves each configured to provide pre-installation retention of one of said rotary holder halves before the stationary holder halves are installed on a shaft, to enable pre-installation assembly of the split seal in two unitized halves each having rotary and stationary elements.

42. A split seal as in claim 41, configured to permit said abutment and contact surfaces to be axially displaced to provide clearance during use of said split seal.

43. A split seal as in claim 42, wherein said rotary holder half contact surface is a shoulder which contacts a radially-extending abutment surface of said stationary holder half to aid axial alignment between elements of the split seal component.

44. A split seal as in claim 42, wherein said rotary holder half surface is a shoulder which contacts an axially-extending abutment surface of a stationary holder half to aid axial alignment of elements of the split seal component.

45. A split seal as in claim 42, wherein said rotary holder half surface is a shoulder which contacts both a radially-extending abutment surface and an axially extending abutment surface of a stationary holder half to aid radial and axial alignment of elements of the split seal component.

46. A split seal as in claim 41, wherein the holder halves are configured to provide pre-installation retention of respective rotary holder halves prior to installation and until said rotary holder halves are axially displaced from pre-installation retention and fixed in operating position within the split seal during installation.

47. A split seal as in claim 41, additionally comprising a substantially non-compressible curved control component disposed within each stationary holder half to provide said abutment surface.

48. A split seal as in claim 47, wherein said curved control component is formed of one of: polytetrafluoroethylene; synthetic polymer.

49. A split seal as in claim 41, wherein said stationary holder halves comprise gland halves configured for attachment to equipment from which a shaft protrudes.

50. A split seal as in claim 40, wherein each of said first and second stationary holder halves includes a receptacle section configured to receive and provide said pre-installation retention of one of the rotary holder halves.

51. A split seal, comprising:

a rotary assembly comprising a first seal face including two seal face segments and first and second rotary holder halves each arranged to receive one of said first seal face segments;

a stationary assembly comprising a second seal face including two seal face segments and first and second stationary holder halves each arranged to receive one of said second seal face segments, the stationary holder halves configured to at least partially surround the first rotary assembly; and a curved control component interposed between a portion of an outer axially-extending surface of said rotary assembly and a portion of an inner axially-extending surface of each of said stationary holder halves.

52. A split seal as in claim 51, wherein said curved control component comprises at least one strip configured for mounting contiguous to the complete circumference of the rotary holder halves.

53. A split seal as in claim 51, wherein said curved control component comprises at least one strip configured for mounting contiguous to the circumference of the rotary holder halves, with spacing at the ends of the at least one strip.

54. A split seal as in claim 51, wherein said curved control component comprises substantially non-compressible material.

55. A split seal as in claim 54, wherein said curved control component is formed of one of: polytetrafluoroethylene; synthetic polymer.

56. A split seal as in claim 51, wherein said curved control component is configured to at least partially restrict fluid flow between said axially-extending surfaces.

57. A split seal as in claim 51, wherein said curved control component is configured to at least partially prevent migration of solids between said axially-extending surfaces.

58. A method of assembly of a seal face, comprising:
   (a) inserting seal face segments of a first seal face into first and second rotary halves to provide a rotary assembly;
   (b) inserting seal face segments of a second seal face into first and second stationary holder halves to provide a stationary assembly;
   (c) inserting one of said rotary holder halves into each of said stationary holder halves with a surface of the rotary half contacting an abutment surface of the stationary half provide pre-installation retention of the rotary holder halves; and
   (d) fastening the first and second stationary holder halves to each other in position around a shaft.

59. A method as in claim 58, wherein in step (c) a surface of the rotary holder halves contacts said abutment surface.

60. A method as in claim 58, wherein said step (c) contacting of surfaces also provides pre-installation alignment of said rotary assembly.

61. A method as in claim 58, additionally comprising:
   (e) displacing the stationary holder halves axially along the shaft to terminate said pre-installation retention of the rotary holder halves.

62. A method as in claim 61, wherein in step (c) a surface of the rotary holder halves contacts said abutment surface.

63. A method as in claim 61, wherein said step (c) contacting of surfaces also provides pre-installation alignment of said rotary assembly.

* * * * *